United States Patent
Imamura

(10) Patent No.: US 7,911,523 B2
(45) Date of Patent: Mar. 22, 2011

(54) AUTOMATIC ADJUSTER FOR IMAGE CAPTURE CIRCUIT

(75) Inventor: Kunihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 763 days.

(21) Appl. No.: 11/826,877

(22) Filed: Jul. 19, 2007

(65) Prior Publication Data

US 2008/0024637 A1 Jan. 31, 2008

(30) Foreign Application Priority Data

Jul. 26, 2006 (JP) .............................. 2006-203851
Mar. 23, 2007 (JP) .............................. 2007-076583

(51) Int. Cl.
*H04N 5/335* (2006.01)
(52) U.S. Cl. ...................................................... 348/312
(58) Field of Classification Search .................. 348/294, 348/302, 308, 311–319
See application file for complete search history.

(56) References Cited

U.S. PATENT DOCUMENTS

| | | | | |
|---|---|---|---|---|
| 6,618,090 | B1* | 9/2003 | Kidono et al. | 348/362 |
| 6,940,553 | B1 | 9/2005 | Katoh | |
| 7,335,638 | B2* | 2/2008 | Higuchi | 514/2.8 |
| 7,385,638 | B2* | 6/2008 | Parks | 348/311 |
| 2003/0189657 | A1* | 10/2003 | Hammadou | 348/294 |
| 2006/0198624 | A1* | 9/2006 | Ono et al. | 396/133 |
| 2006/0244856 | A1* | 11/2006 | Tagami et al. | 348/312 |
| 2007/0086067 | A1* | 4/2007 | Suemoto et al. | 358/482 |

FOREIGN PATENT DOCUMENTS

| JP | 5-37850 | | 2/1993 |
|---|---|---|---|
| JP | 2005-151081 | A | 6/2005 |

* cited by examiner

*Primary Examiner* — Lin Ye
*Assistant Examiner* — Trung Diep
(74) *Attorney, Agent, or Firm* — McDermott Will & Emery LLP

(57) ABSTRACT

A reference charge generator provided on an image capture element generates reference charge. The reference charge is transferred through a vertical transfer section as is signal charge of a pixel which is generated by a photoelectric converter. A reference signal corresponding to the reference charge is output from the image capture element. Data of a digital value obtained by conversion from the reference signal and a digital value which is obtained from the reference signal when the image capture element ideally operates are compared to estimate the state of a pulse for driving the image capture element. The state of the pulse is adjusted such that the pulse has optimum phase and duty.

37 Claims, 54 Drawing Sheets

TIME

TRANSFER DIRECTION
(TO HORIZONTAL TRANSFER SECTION)

◎ ◎ ◎ CHARGES

AUTOMATIC ADJUSTER FOR IMAGE CAPTURE CIRCUIT

BACKGROUND OF THE INVENTION

The present invention relates to an automatic adjuster for an image capture circuit and specifically to a technique for adjusting the phase or duty of a pulse for the purpose of image capture with an additional reference signal generator on an image capture element.

Digital cameras (digital still cameras, digital video cameras, camera phones, etc.) convert an analog image capture signal captured by an image capture element, for example, CCD (Charge Coupled Device) or MOS (Metal Oxide Semiconductor) sensor, to a digital image capture signal, which is then subjected to predetermined processes before it is stored. To capture an image of an object using an image capture element, a pulse for driving the image capture element, a pulse for detecting a signal level, and the like, are necessary. The phase and duty (timing) of these pulses are difficult to adjust in the stage of hardware designing because of variations caused by manufacture. Hence, in common procedure for timing adjustment, an engineer carries out a timing adjustment after manufacture and stores information representing the adjusted timing in a memory region.

According to the first conventional technique disclosed in Japanese Laid-Open Patent Publication No. 2005-151081, an image is captured within a minimum exposure time, and the phases of pulses supplied to a CDS (Correlated Double Sampling) circuit, in particular, the phase of a pulse used for sampling the feed-through level and the phase of a pulse used for sampling the level of a photoelectrically-converted image capture signal, are adjusted such that noise components, i.e., high-frequency components, are minimized. Also, the phase of a clock pulse used for A/D (Analog/Digital) conversion is adjusted in the same way at the stage subsequent to the CDS circuit.

According to the second conventional technique disclosed in Japanese Laid-Open Patent Publication No. H5-37850, a test signal generator circuit for generating a test signal in synchronization with a horizontal transfer control pulse is provided at the stage immediately before an analog circuit (including CDS circuit) which processes an output signal of an image capture element, such that the test signal is processed via the same signal route as that employed in normal mode. In the test mode, the test signal is superposed on part of the output of the CCD with stopped vertical transfer which corresponds to the image capture signal level, and the phase of the test signal supplied to an image processor is shifted by adjusting at least one of the phase of the horizontal transfer control pulse and the phase of the sampling pulse of the CDS circuit such that the sampling timing at a video camera section and the timing of A/D conversion at the image processor coincide with each other, whereby the phase of the clock pulse used for A/D conversion is adjusted.

In recent years, especially in the fields of medical cameras, replacement of an image capture element after manufacture of a digital camera has been more probable. Using a different image capture element naturally requires a pulse of different timing for driving the element, and hence, readjustment of timing. However, readjustment of timing by an engineer increases the difficulty in achieving simple replacement of the image capture element.

The above-described first conventional technique offers relatively low accuracy because the same method is applied to all of a plurality of pulses to be adjusted in determining the optimum phase with no consideration to the characteristics of the pulses.

The above-described second conventional technique cannot achieve optimization of driving timings necessary for different image capture elements because the test signal generator circuit for the timing adjustment is provided outside the image capture element.

SUMMARY OF THE INVENTION

The present invention was conceived in view of the above circumstances. The present invention achieves highly-accurate, automatic adjustment of the timing of a pulse used for image capture without manual readjustment.

To achieve this objective, an automatic adjuster for image capture circuit according to the present invention includes a reference signal generator provided on an image capture element for generating a reference signal. The phase or duty of a pulse used for driving an image capture element and an analog circuit which performs an analog signal process on an image capture signal is adjusted based on a digital reference signal value which is obtained by converting a reference signal output from the image capture element to a digital value.

This structure enables adjustment of pulses used for driving the image capture element and analog circuit based on the reference signal having a predetermined level. Therefore, the phase or duty of the pulses can be adjusted with high accuracy under preferable conditions with extremely small effects of external disturbance, which is different from adjustment based on an image capture signal actually obtained through an actual image capture process.

In the above structure, the reference signal is preferably output to at least one of a vertical transfer section, horizontal transfer section, or photoelectric converters. With such a feature, it is possible to specifically detect the effects of pulses input to a circuit through which an image capture signal passes before being output to the outside of the image capture element. Therefore, the phase or duty of the pulse can be adjusted with high accuracy.

In the above structure, the reference signal is preferably output to the photoelectric converters. With this feature, for example, it is possible to adjust the phase or duty of a pulse based on the reference signal equivalent to the saturation level of the photodiode. Further, the reference signal generators of the vertical transfer section and horizontal transfer section can be omitted.

In the above structure, the reference signal is preferably output to the horizontal transfer section. With this feature, it is possible to adjust the phase or duty of a pulse relevant to the horizontal transfer section without being affected by adjustment accuracy in the vertical transfer section.

In the above structure, the reference signal is preferably output to the vertical transfer section. With this feature, it is possible to simplify the structure as compared with a structure where the photoelectric converter includes a reference signal generator. Further, the reference signal generators of the horizontal transfer section can be omitted.

In the above structure, the reference signal is preferably output to a shaded photoelectric converter. With this feature, for example, it is possible to adjust the phase or duty of a pulse based on the reference signal equivalent to the saturation level of the photodiode. Further, the reference signal generators of the vertical transfer section and horizontal transfer section can be omitted. Furthermore, a mechanical light blocking mechanism, such as a mechanical shutter, or the like, can be omitted, and adjustment can be carried out in parallel with photo shooting activities.

In the above structure, the reference signal is preferably output to part of the horizontal transfer section which is most distant from the signal converter. With this feature, it is possible to adjust the phase or duty of a pulse relevant to the horizontal transfer section without being affected by adjustment accuracy in the vertical transfer section. Further, it is possible to simplify the structure as compared with a structure where the reference signal generator is provided at a position other than an end of the horizontal transfer section.

In the above structure, the reference signal is preferably output to part of the horizontal transfer section which is closest to the signal converter. With this feature, it is possible to adjust the phase or duty of, for example, a pulse for controlling a reset gate, a pulse for sampling a feed-through level, and a pulse for sampling the level of a photoelectrically-converted image capture signal, without being affected by adjustment accuracy in the vertical transfer section and horizontal transfer section.

In the above structure, the reference signal is preferably output to part of the vertical transfer section which is most distant from the horizontal transfer section. With this feature, it is possible to simplify the structure as compared with a structure where the photoelectric converter includes a reference signal generator. Further, the reference signal generators of the horizontal transfer section can be omitted. Furthermore, it is possible to adjust the phase or duty of a pulse relevant to the vertical transfer section with high accuracy.

In the above structure, the reference signal generator preferably includes a plurality of reference signal generators, each of which outputs a reference signal to part of a corresponding vertical transfer section which is most distant from the horizontal transfer section. With this feature, adjustment errors resulting from variations in the structure of the vertical transfer section can be suppressed.

In the above structure, the reference signal generator preferably includes a plurality of reference signal generators, each of which outputs a reference signal to part of a corresponding vertical transfer section which is most distant from the horizontal transfer section, at least one of the vertical transfer sections corresponding to a shaded photoelectric converter. With this feature, adjustment errors resulting from variations in the structure of the vertical transfer section can be suppressed. Further, a mechanical light blocking mechanism, such as a mechanical shutter, or the like, can be omitted, and the phase or duty of a pulse can be adjusted with high accuracy in parallel with photo shooting activities.

In the above structure, the reference signal generator preferably includes an electrode. With such a feature, the reference signal can be externally controlled to reach a desired level at a desired timing.

In the above structure, the reference signal generator may not include an electrode. In this case, it is difficult to externally control the reference signal to reach a desired level at a desired timing, but the number of pins used for input of signals into the image capture element can be reduced.

In the above structure, the reference signal is preferably output during a vertical blanking interval or horizontal blanking interval of an image capture signal. With this feature, adjustment can be carried out during photo shooting activities. Further, adjustment can be carried out while every output result is checked. Therefore, the phase or duty of a pulse can be adjusted with higher accuracy.

In the above structure, the reference signal and the image capture signal are preferably output in separate retrieval modes. With this feature, the phase or duty of a pulse can be adjusted with high accuracy without being affected by external disturbance, such as smear components, or the like.

In the above structure, the reference signal is preferably output at a predetermined timing. With this feature, deviation of a pulse due to external disturbance, such as variations in temperature, or the like, can be adjusted at a predetermined timing.

In the above structure, the reference signal is preferably output according to an external command. With this feature, deviation of a pulse can be adjusted as necessary, and a redundant adjustment process can be omitted.

In the above structure, the reference signal is preferably output at startup of the automatic adjuster. With this feature, deviation of a pulse which occurs after passage of a relatively long period, due to deterioration by aging, or the like, can be adjusted.

In the above structure, the reference signal is preferably output in a shaded state. With this feature, the phase or duty of a pulse can be adjusted with high accuracy without being affected by external disturbance, such as smear components, blooming, or the like.

In the above structure, the reference signal is preferably output when an image capture signal output from the image capture element is equal to or lower than a predetermined level. With this feature, the phase or duty of a pulse can be adjusted with high accuracy without being affected by external disturbance, such as smear components, blooming, or the like.

In the above structure, the signal level of the reference signal holder is preferably reset to a predetermined level at a predetermined timing. With this feature, it is possible to prevent noise generated by the reference signal holder, such as dark current components, or the like, from being mixed in an image capture signal. Thus, the phase or duty of a pulse can be adjusted without decreasing the quality of the image capture signal.

In the above structure, the signal level of the reference signal holder is preferably reset to a predetermined level according to an external command. With this feature, it is possible to prevent noise generated by the reference signal holder, such as dark current components, or the like, from being mixed in an image capture signal. Thus, the phase or duty of a pulse can be adjusted without decreasing the quality of the image capture signal.

In the above structure, the signal level of the reference signal holder is preferably reset to a predetermined level at startup of the automatic adjuster. With this feature, it is possible to prevent an indefinite signal of the reference signal holder immediately after the startup of the automatic adjuster from being mixed in the reference signal. Thus, the phase or duty of a pulse can be adjusted with high accuracy.

In the above structure, preferably, the image capture element is a CCD, and a subject of adjustment is a pulse for controlling horizontal transfer, a pulse for controlling vertical transfer, a pulse for controlling a reset gate, a pulse for sampling a feed-through level, a pulse for sampling the level of a photoelectrically-converted image capture signal, a reference pulse for A/D conversion, a gain for A/D conversion, or an offset level for A/D conversion. With this feature, optimization of horizontal transfer CCD driving is realized by adjusting the pulse for controlling horizontal transfer. Optimization of vertical transfer CCD driving is realized by adjusting the pulse for controlling vertical transfer. Optimization of the reset timing for a signal retriever of the CCD is realized by adjusting the pulse for controlling the reset timing of a photodiode. Optimization of a CDS operation is realized by adjusting the pulse for sampling a feed-through level and the pulse for sampling the level of a photoelectrically-converted image capture signal. Optimization of the timing and dynamic range of A/D conversion is realized by adjusting the reference pulse for A/D conversion, the gain for A/D conversion, and the offset level for A/D conversion.

In the above structure, preferably, the horizontal transfer section horizontally transfers the reference signal. The efficiency of horizontal transfer in the horizontal transfer section is calculated from a digital reference signal level which is obtained from a reference signal output from the image capture element, a digital reference signal expectancy level obtained when the reference signal is ideally output, and the number of transfer stages of the horizontal transfer section between a position at which the reference signal is input and the signal converter. The pulse for controlling horizontal transfer is adjusted such that the efficiency of horizontal transfer reaches a predetermined value. With this feature, the phase or duty of a pulse relevant to horizontal transfer can be adjusted.

In the above structure, preferably, the vertical transfer section vertically transfers the reference signal. The efficiency of horizontal transfer in the horizontal transfer section is calculated from a digital reference signal level which is obtained from a reference signal output from the image capture element, a digital reference signal expectancy level obtained when the reference signal is ideally output, and the number of transfer stages of the horizontal transfer section between a position at which the reference signal is input and the signal converter. Adjustment of the pulse for controlling vertical transfer is absent during adjustment of the pulse for controlling horizontal transfer such that the efficiency of horizontal transfer reaches a predetermined value. With this feature, the reference signal output from the vertical transfer section can have a constant value, and this can be treated as being equivalent to a reference signal generator which would be included in the horizontal transfer section. Thus, the reference signal generator of the horizontal transfer section can be omitted.

In the above structure, preferably, the horizontal transfer section horizontally transfers the reference signal. The efficiency of horizontal transfer in the horizontal transfer section is calculated from a digital reference signal level which is obtained from a reference signal output from the image capture element, a digital reference signal expectancy level obtained when the reference signal is ideally output, the number of transfer stages of the horizontal transfer section between a position at which the reference signal is input and the signal converter, and a horizontal defect signal obtained through horizontal transfer performed during a period when none of an image capture signal and reference signal exists. The pulse for controlling horizontal transfer is adjusted such that the efficiency of horizontal transfer reaches a predetermined value. With this feature, the phase or duty of a pulse relevant to horizontal transfer can be adjusted without being affected by noise components resulting from a crystal structure defect, or the like, in the horizontal transfer section.

In the above structure, preferably, the vertical transfer section vertically transfers the reference signal. The efficiency of vertical transfer in the vertical transfer section is calculated from a digital reference signal level which is obtained from a reference signal output from the image capture element, a digital reference signal expectancy level obtained when the reference signal is ideally output, and the number of transfer stages of the vertical transfer section between a position at which the reference signal is input and the horizontal transfer section. The pulse for controlling vertical transfer is adjusted such that the efficiency of vertical transfer reaches a predetermined value. With this feature, the phase or duty of a pulse relevant to vertical transfer can be adjusted.

In the above structure, preferably, the vertical transfer section vertically transfers the reference signal. The efficiency of vertical transfer in the vertical transfer section is calculated from a digital reference signal level which is obtained from a reference signal output from the image capture element, a digital reference signal expectancy level obtained when the reference signal is ideally output, and the number of transfer stages of the vertical transfer section between a position at which the reference signal is input and the horizontal transfer section. Adjustment of the pulse for controlling horizontal transfer is absent during adjustment of the pulse for controlling vertical transfer such that the efficiency of vertical transfer reaches a predetermined value. With this feature, the phase or duty of a pulse relevant to vertical transfer can be adjusted.

In the above structure, preferably, the vertical transfer section vertically transfers the reference signal. The efficiency of vertical transfer in the horizontal transfer section is calculated from a digital reference signal level which is obtained from a reference signal output from the image capture element, a digital reference signal expectancy level obtained when the reference signal is ideally output, the number of transfer stages of the vertical transfer section between a position at which the reference signal is input and the horizontal transfer section, and a vertical defect signal obtained through vertical transfer performed during a period when none of an image capture signal and reference signal exists. The pulse for controlling vertical transfer is adjusted such that the efficiency of vertical transfer reaches a predetermined value. With this feature, the phase or duty of a pulse relevant to vertical transfer can be adjusted without being affected by noise components resulting from a crystal structure defect, or the like, in the vertical transfer section.

In the above structure, the pulse is preferably adjusted such that at least one of the transfer efficiency of the vertical transfer section and the transfer efficiency of the horizontal transfer section is optimized. With this feature, convergence to an optimum point for the pulse is achieved fast as compared with the case of simultaneous optimization of the two transfer sections. Accordingly, the adjustment time can be shortened.

In the above structure, in the adjustment of the pulse such that at least one of the transfer efficiency of the vertical transfer section and the transfer efficiency of the horizontal transfer section is optimized, a vertical defect signal and horizontal defect signal which are produced as a result of transfer performed during the period when none of an image capture signal and reference signal exists in the vertical transfer section and horizontal transfer section are preferably considered. With this feature, convergence to an optimum point for the pulse is achieved fast as compared with the case of simultaneous optimization of the two transfer sections. Accordingly, the adjustment time can be shortened. Further, the phase or duty of the pulse can be adjusted without being affected by noise components resulting from a crystal structure defect, or the like.

In the above structure, preferably, the image capture element is a MOS sensor, and a subject of adjustment is a pulse for controlling a horizontal scan shift register, a pulse for controlling a vertical scan shift register, a pulse for controlling a reset timing of a photodiode, a pulse for sampling a feed-through level, a pulse for sampling the level of a photoelectrically-converted image capture signal, a reference pulse for A/D conversion, a gain for A/D conversion, and an offset level for A/D conversion. With this feature, optimization of horizontal address selection timing is realized by adjusting the pulse for controlling a horizontal scan shift register. Optimization of vertical address selection timing is realized by adjusting the pulse for controlling a vertical scan shift register. Optimization of the reset timing for a signal retriever of a photodiode is realized by adjusting the pulse for controlling the reset timing of a photodiode. Optimization of a CDS operation is realized by adjusting the pulse for sampling a feed-through level and the pulse for sampling the level of a photoelectrically-converted image capture signal. Optimization of the timing and dynamic range of A/D conversion is realized by adjusting the reference pulse for A/D conversion, the gain for A/D conversion, and the offset level for A/D conversion.

Preferably, the automatic adjuster having the above-described structure is installed in an image capture module. This enables, in an application in which an image capture element on the module is replaceable, generation of a pulse necessary for optimum image capture at any time. Thus, the versatility of the image capture module can be improved. Further, variations in characteristics of the image capture module due to deterioration by aging, or the like, is tolerable.

Preferably, the automatic adjuster having the above-described structure is installed in an electronic still camera. This enables generation of a pulse necessary for optimum image capture at any time. Thus, variations in characteristics of the electronic still camera due to deterioration by aging, or the like, is tolerable.

As described above, according to the present invention, a pulse for driving an image capture element, a pulse for a CDS circuit, and a pulse for A/D conversion are adjusted based on a reference signal output from a reference signal generator provided on the image capture element. Therefore, adjustment can be automatically performed in a detailed manner according to an environment in which the image capture element actually resides.

Thus, the optimum driving conditions can be achieved in the image capture element even when the image capture element itself is replaced or when the characteristics of the image capture element vary due to external factors (variations in temperature, voltage, etc.) or deterioration by aging.

Automatic adjustment with high resolution can be achieved by adjusting the phases of pulses in separate manners in consideration of the characteristics of respective pulses.

DESCRIPTION OF THE PREFERRED EMBODIMENTS

[1] Embodiment 1

An image capture system according to embodiment 1 of the present invention is described.

Figure 1:
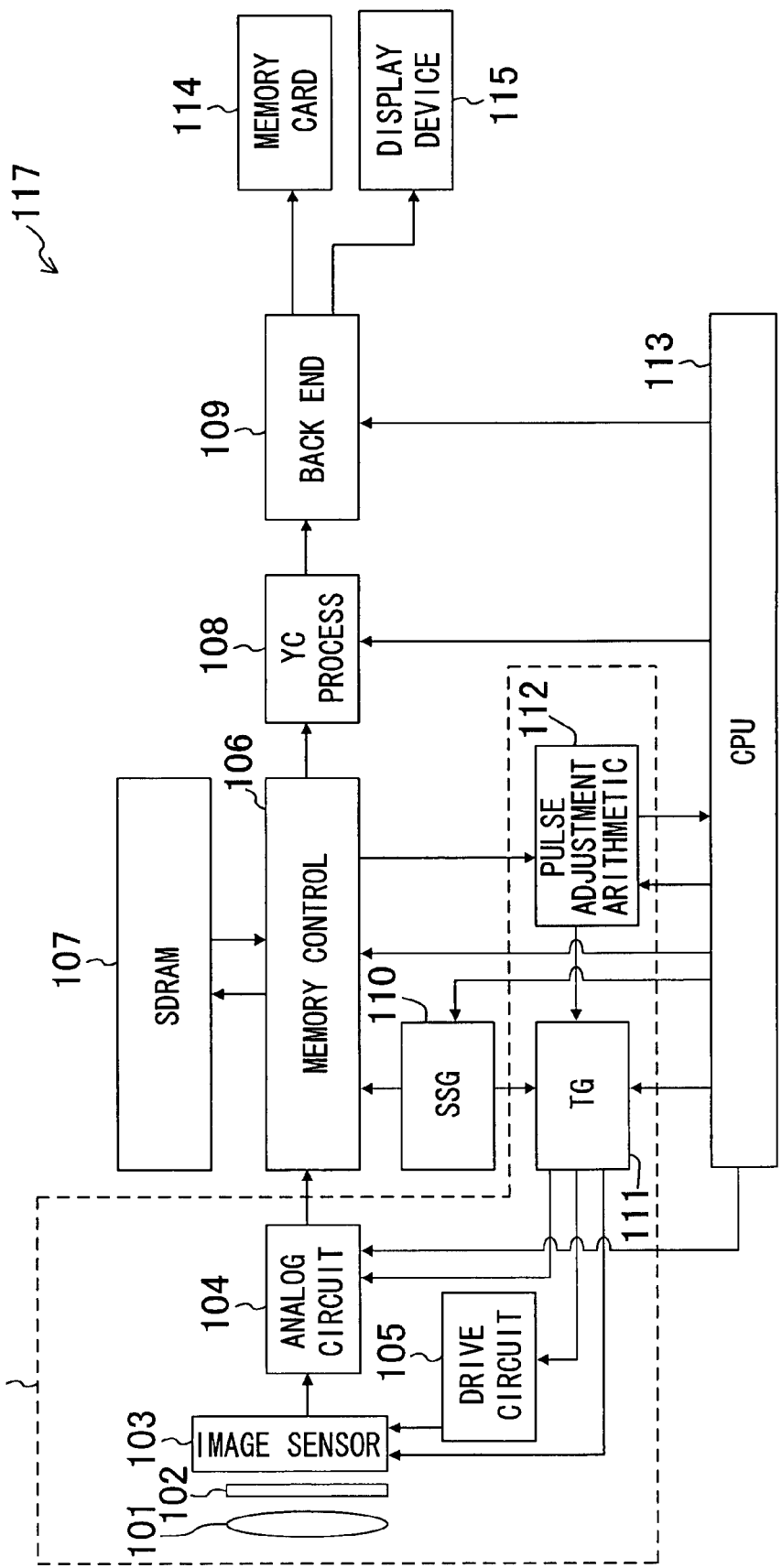
FIG. 1 is a block diagram showing a functional structure of an electronic still camera according to embodiment 1 of the present invention.

First, the structure of the image capture system of this embodiment is described. FIG. 1 is a block diagram showing a functional structure of the image capture system of this embodiment. As shown in FIG. 1, this image capture system includes an optical lens 101, an IR (Infrared Rays) cut filter 102, an image sensor 103, an analog circuit 104, a drive circuit 105, a memory control circuit 106, an SDRAM 107, a YC process circuit 108, a back end circuit 109, an SSG (Sync Signal Generator) 110, a TG (Timing Generator) 111, an arithmetic circuit for pulse adjustment (pulse adjustment arithmetic circuit 112), a CPU 113, a memory card 114, and a display device 115.

The components enclosed by broken line 116 constitute an image capture module. Reference numeral 117 refers to an electronic still camera.

The optical lens 101 focuses incoming light from an object to form an image of the object on the image sensor 103. The IR (Infrared Rays) cut filter 102 removes long-wavelength components of the light entering the image sensor 103.

The SSG 110 is a circuit for generating a synchronization signal based on which the image capture system operates. Specifically, the SSG 110 generates a system synchronization signal set by the CPU 113 and outputs the generated system synchronization signal to the memory control circuit 106 and the TG 111.

The TG 111 generates a pulse used for driving the image sensor according to the system synchronization signal of the SSG 110, a control signal of the CPU 113, and a control signal of the pulse adjustment arithmetic circuit 112. Part of the pulse generated by the TG 111 is output to the drive circuit 105, and another part of the pulse is output to the image sensor 103.

The drive circuit 105 converts the image sensor driving pulse generated by the TG 111 to a predetermined voltage necessary for driving the image sensor before it is output, such that the image sensor 103 is driven by this voltage.

The image sensor 103 is a so-called single plate CCD wherein each of photoelectric converters in a two-dimensional layout has a monotone filter for filtering incident light. The image sensor 103 retrieves the charge according to the driving signals received from the drive circuit 105 and TG 111 to output an analog image capture signal.

The analog circuit 104 performs predetermined processes, including CDS, signal amplification, etc., on the analog image capture signal output from the image sensor 103 to convert the analog image capture signal to a digital image capture signal before the converted signal is output.

The memory control circuit 106 writes the digital image capture signal output from the analog circuit 104 in the SDRAM 107, or retrieves the digital image capture signal from the SDRAM 107, based on the system synchronization signal input from the SSG 110.

The digital image capture signal retrieved from the SDRAM 107 via the memory control circuit 106 is input to the YC process circuit 108 and the pulse adjustment arithmetic circuit 112.

The YC process circuit 108 performs image processes, including synchronization, chrominance arithmetic process, etc., on the digital image capture signal to output a luminance signal and a chrominance signal to the back end circuit 109.

The back end circuit 109 performs a compressive encoding process on the luminance signal and the chrominance signal to output and write the result of the compressive encoding process into the memory card 114. Meanwhile, the back end circuit 109 increases or decreases the signals to a necessary size to output the result of this process as a video signal to the display device 115.

The CPU 113 outputs, as well as the above-described control signals output to the memory control circuit 106, the SSG 110 and the TG 111, the control signals used for image processes such that the YC process circuit 108 and the back end circuit 109 are allowed to perform desired image processing operations.

(1) Image Sensor 103

Figure 2:
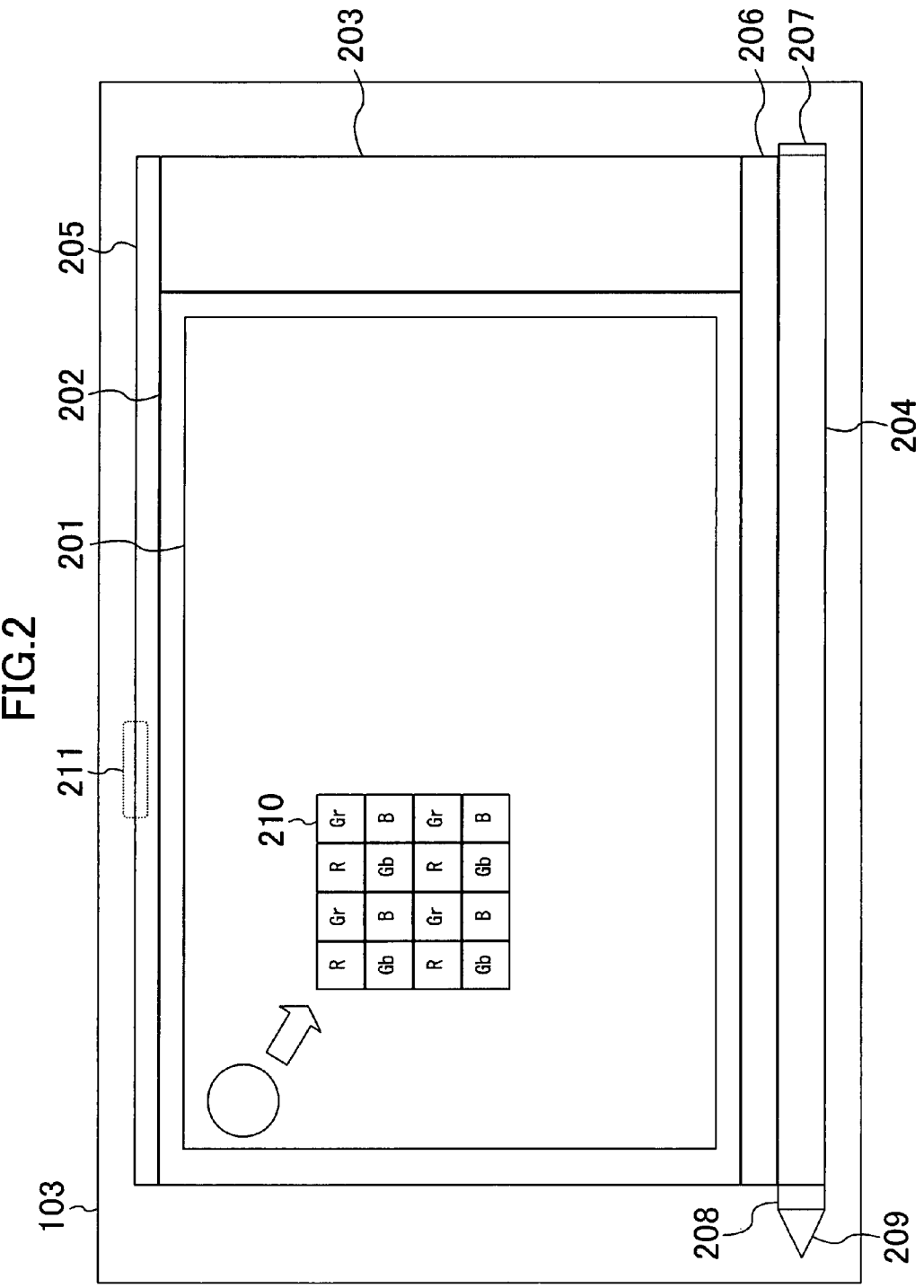
FIG. 2 is a plan view showing an image sensor according to embodiment 1 of the present invention.

Next, the structure of the image sensor 103 is described. FIG. 2 is a block diagram showing a general structure of the image sensor 103.

The image sensor 103 includes an effective pixel region 201, a transient region 202, a shaded pixel region 203, a horizontal transfer section 204, a dummy pixel region 205, a dummy vertical transfer section 206, dummy horizontal transfer sections 207 and 208, and a charge signal detector 209.

Enlarged segment 210 is a partial enlarged illustration of the effective pixel region 201, including R (red), G (green) and B (blue) color filters arranged in a Bayer layout on respective pixels. It should be noted that, in FIG. 2, "Gr" refers to a G filter horizontally sandwiched by R filters, and "Gb" refers to a G filter horizontally sandwiched by B filters.

Figure 3:
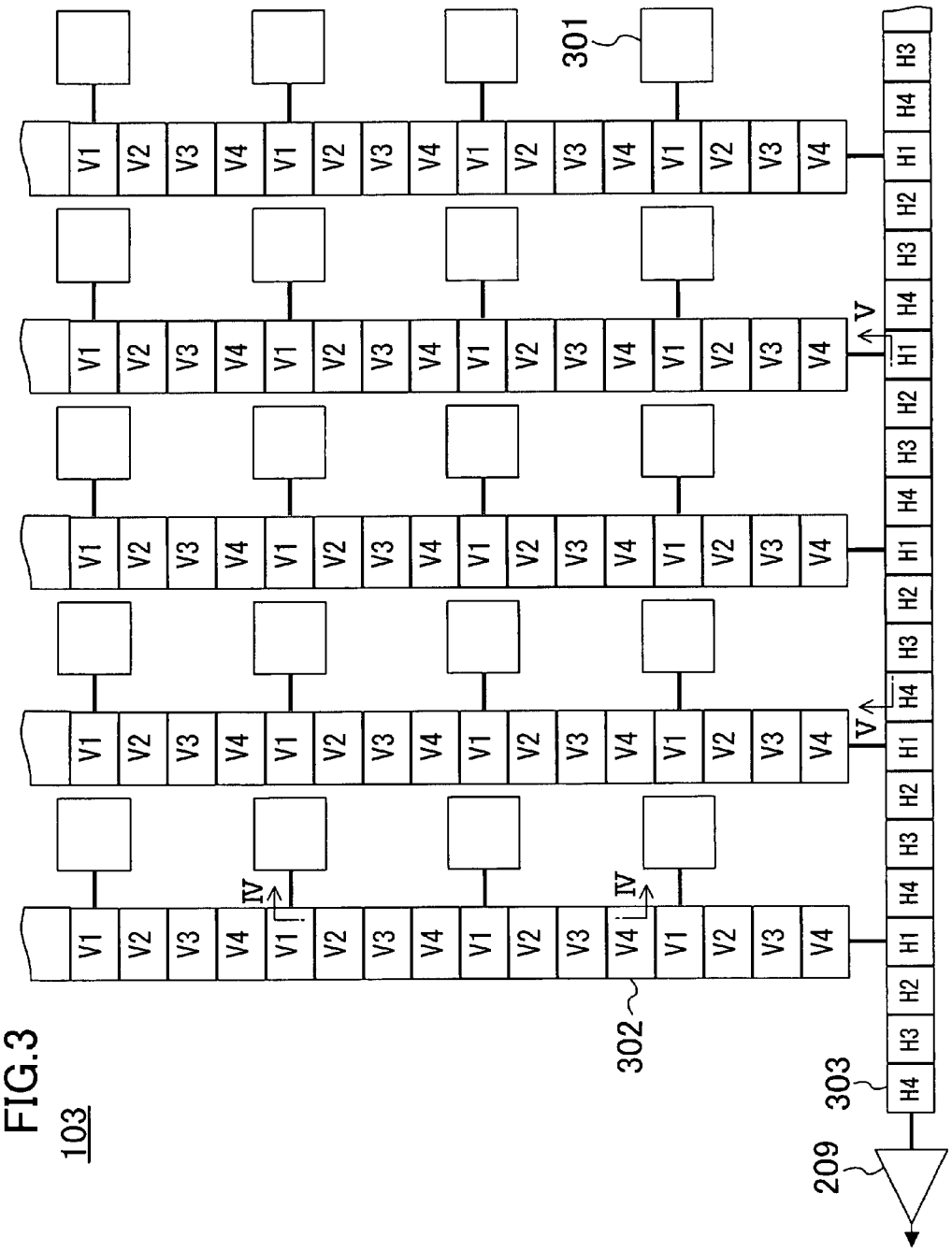
FIG. 3 is a partial enlarged view showing the image sensor according to embodiment 1 of the present invention.

FIG. 3 is a partial enlarged view of the image sensor 103. As shown in FIG. 3, the effective pixel region 201 of the image sensor 103 includes photoelectric converters 301 arranged in a two-dimensional layout and vertical transfer sections 302 provided in respective columns for retrieving image capture signals from the photoelectric converters 301. Each of the vertical transfer sections 302 is formed by gates of four phases V1 to V4. The effective pixel region 201 also includes, at the transfer terminal ends of the vertical transfer sections 302, a horizontal transfer section 303 for transferring the image capture signals, which have been output from the photoelectric converters 301 to the vertical transfer sections 302, to the charge signal detector 209. The horizontal transfer section 303 is formed by gates of four phases H1 to H4.

The shaded pixel region 203 of the image sensor 103 is shaded by an aluminum shade, or the like, such that light from the optical lens 101 is prevented from reaching the photoelectric converters 301.

Figure 4:
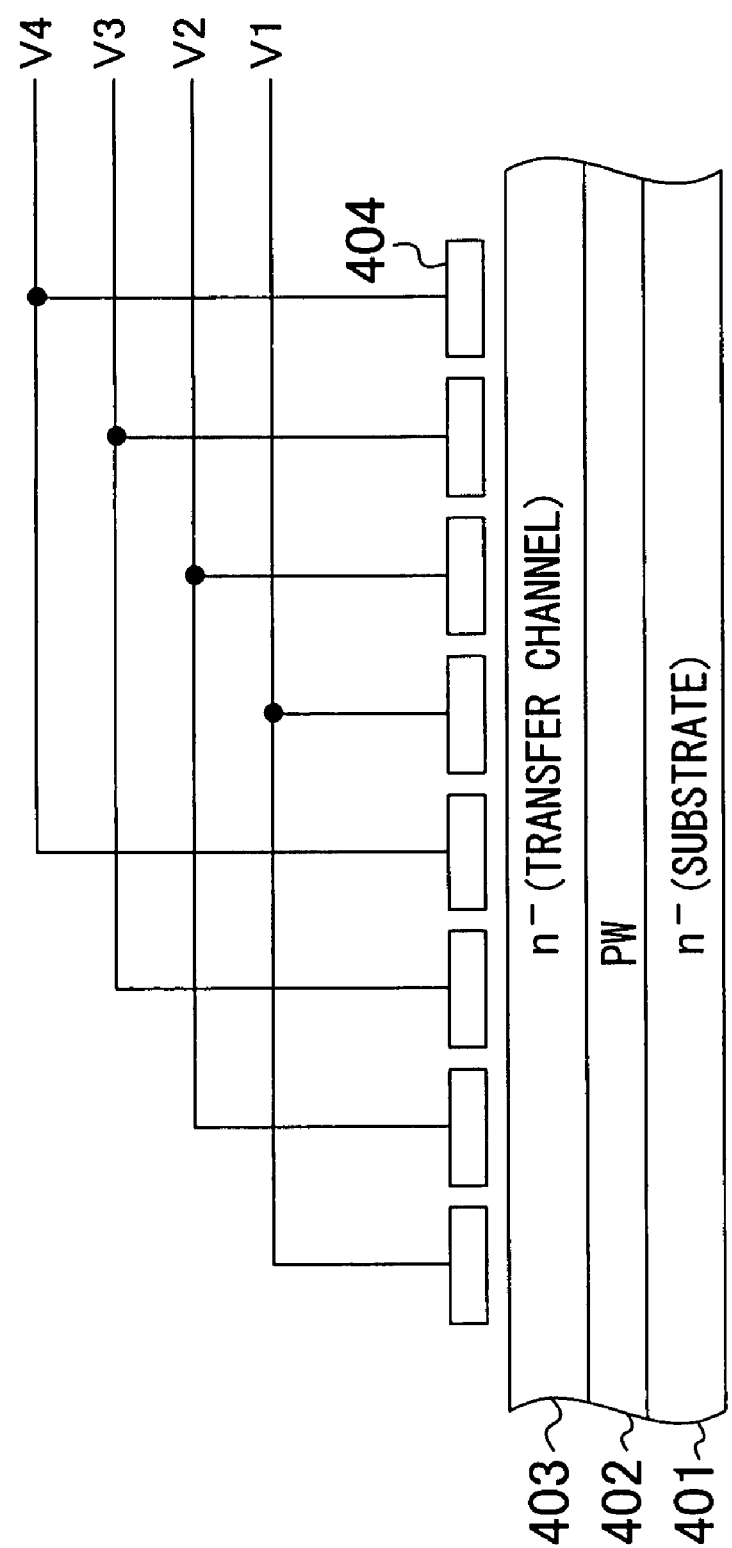
FIG. 4 is a cross-sectional view of a vertical transfer section of the image sensor according to embodiment 1 of the present invention taken along line IV-IV of FIG. 3.

FIG. 4 is a partial cross-sectional view of the vertical transfer section 302 of the image sensor 103 taken along vertical line IV-IV of FIG. 3. As shown in FIG. 4, the vertical transfer section 302 has a P-type well 402 provided on an $N^-$-type substrate 401 and an $N^-$-type diffusion layer 403 provided on the P-type well 402. The $N^-$-type diffusion layer 403 constitutes a transfer channel of the vertical transfer section 302. Further, electrodes 404 corresponding to the gates of four phases V1 to V4 are provided on the $N^-$-type diffusion layer 403.

Figure 5:
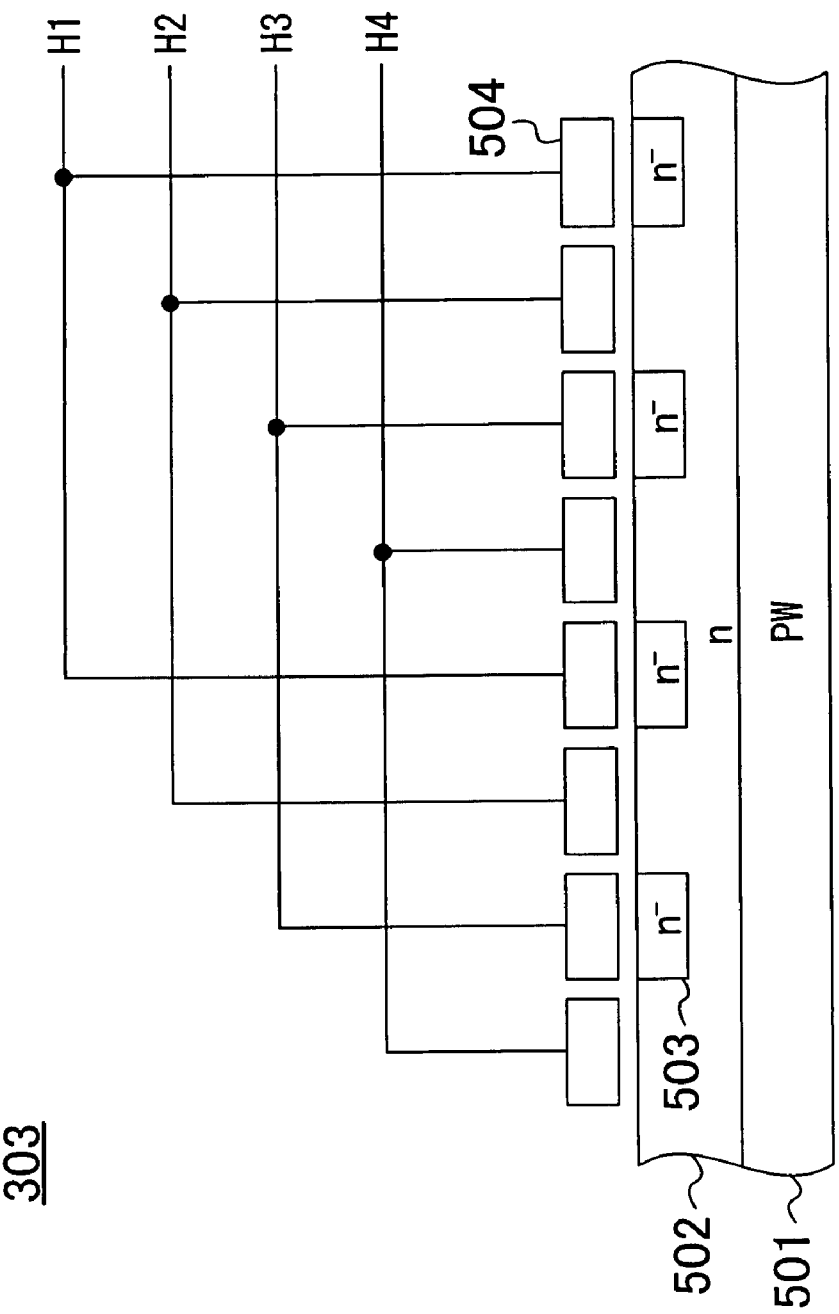
FIG. 5 is a cross-sectional view of a horizontal transfer section of the image sensor according to embodiment 1 of the present invention taken along line V-V of FIG. 3.

FIG. 5 is a partial cross-sectional view of the horizontal transfer section 303 of the image sensor 103 taken along horizontal line V-V of FIG. 3. As shown in FIG. 5, the horizontal transfer section 303 has an N-type diffusion layer 502 provided on a P-type well 501. The N-type diffusion layer 502 constitutes a transfer channel of the horizontal transfer section 303. $N^-$-type diffusion layers 503, which have an impurity concentration lower than that of the N-type diffusion layer 502, are buried in the N-type diffusion layer 502. Electrodes 504 corresponding to the gates of four phases H1 to H4 are provided on the N-type diffusion layer 502 and $N^-$-type diffusion layers 503. The electrodes 504 provided on the $N^-$-type diffusion layers 503 correspond to phases H1 and H3, while the electrodes 504 provided on the N-type diffusion layer 502 correspond to phases H2 and H4.

Figure 6:
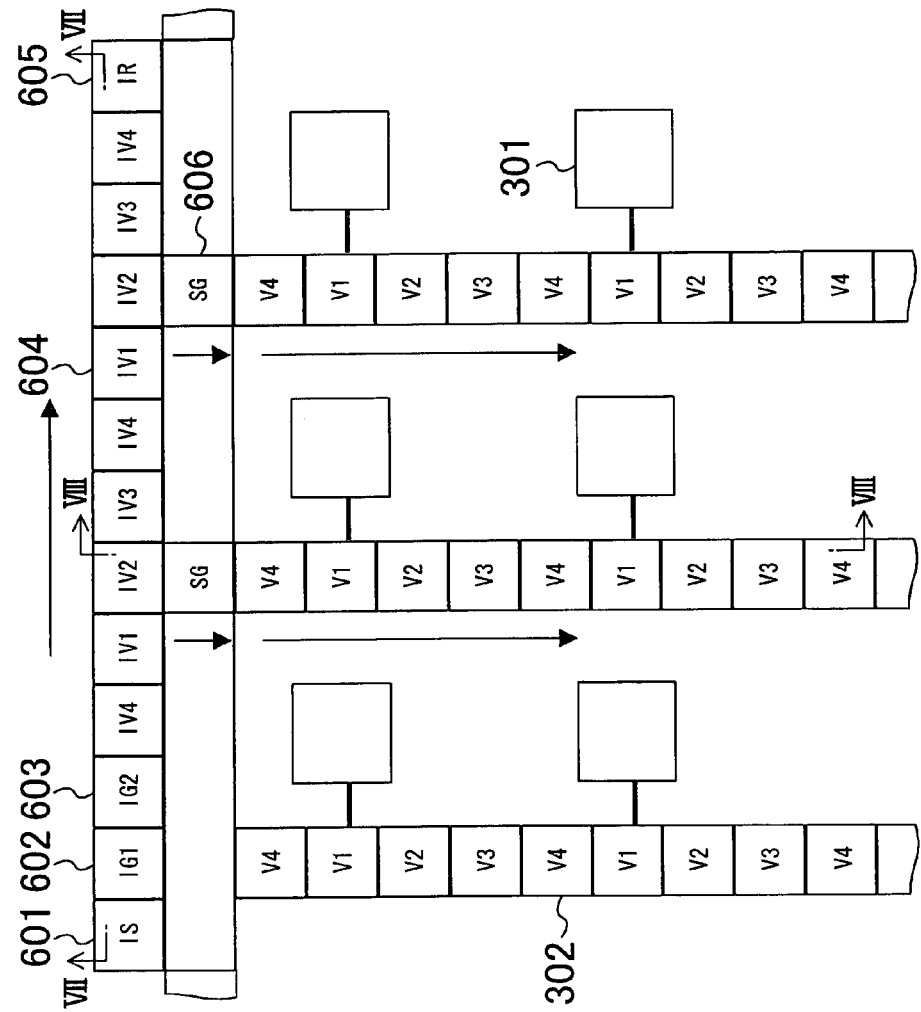
FIG. 6 is an enlarged plan view of a reference signal generator of the image sensor according to embodiment 1 of the present invention.

FIG. 6 is a partial enlarged view of a region (reference signal generator) 211 on the image sensor shown in FIG. 2. As shown in FIG. 6, the reference signal generator 211 includes a reference charge generator (IS) 601, reference charge transferrers (IG1, IG2, IV1, IV2, IV3, IV4, SG) 602, 603, 604 and 606, and a drain (IR) 605 for drainage of excessive charge. To achieve an operation at a timing different from the pulse used for driving the image sensor 103, the electrodes IG1 and IG2 are provided for the gates 602 and 603 used for transferring the reference charge, the electrodes IV1 to IV4 are provided for the transfer gate 604, and the electrodes SG are provided for the gate 606 used for transferring the reference charge from the electrode IS to the vertical transfer sections 302.

Figure 7:
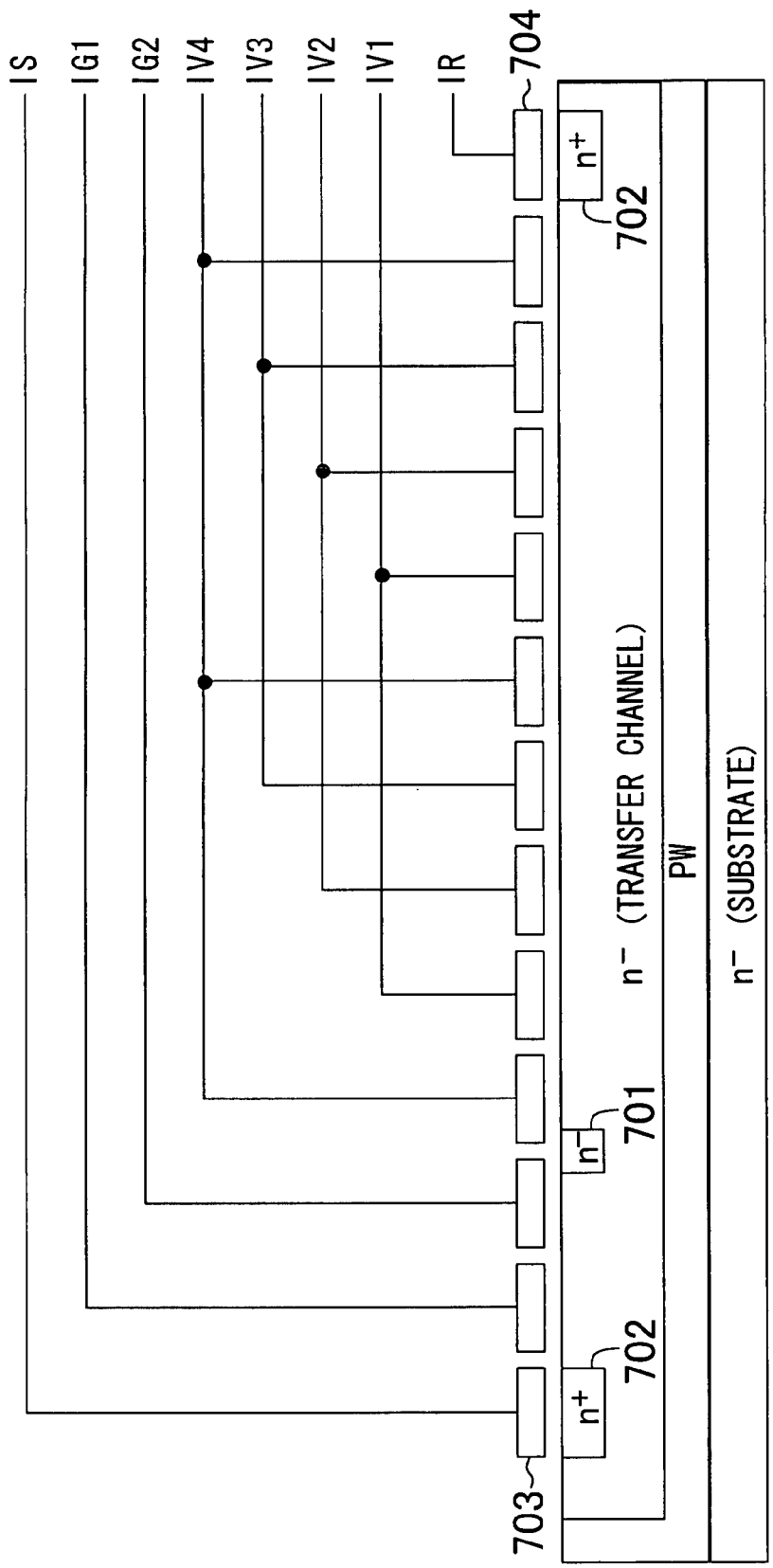
FIG. 7 is a cross-sectional view of the reference signal generator of the image sensor according to embodiment 1 of the present invention taken along line VII-VII of FIG. 6.

FIG. 7 is a partial cross-sectional view of the reference signal generator 211 of FIG. 6 taken along horizontal line VII-VII of FIG. 6. The structure shown in FIG. 7 is basically the same as that of the vertical transfer section 302 of FIG. 4, and therefore, only the differences are herein described. An $N^-$-type diffusion layer 701 having a lower impurity concentration is provided between the electrodes IG2 and IV4. $N^+$-type diffusion layers 702 are provided with an electrode (IS) 703 and an electrode (IR) 704, whereby an injection charge supply and a drain are respectively provided.

Figure 8:
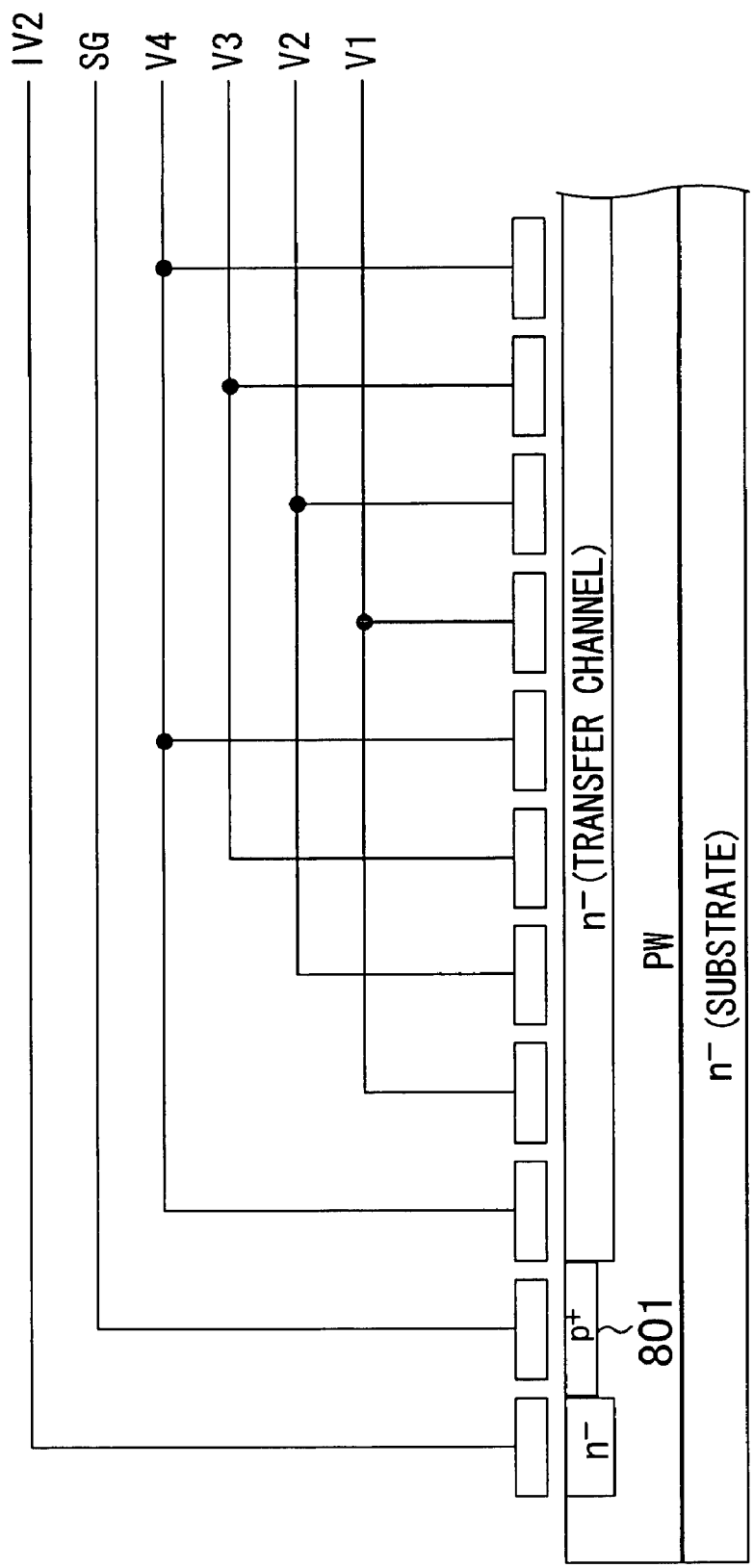
FIG. 8 is a cross-sectional view of the reference signal generator and vertical transfer section of the image sensor according to embodiment 1 of the present invention taken along line VIII-VIII of FIG. 6.

FIG. 8 is a partial cross-sectional view of the reference signal generator 211 and the vertical transfer section 302 of FIG. 6 taken along vertical line VIII-VIII of FIG. 6. The structure shown in FIG. 8 is basically the same as that of the vertical transfer section 302 of FIG. 4, and therefore, only the differences are herein described. A $P^+$-type diffusion layer 801 is provided between the electrodes IV2 and V4, and the electrode SG is wired as the gate electrode for the $P^+$-type diffusion layer 801.

The operation of the thus-structured image sensor 103 is now described.

Figure 9:
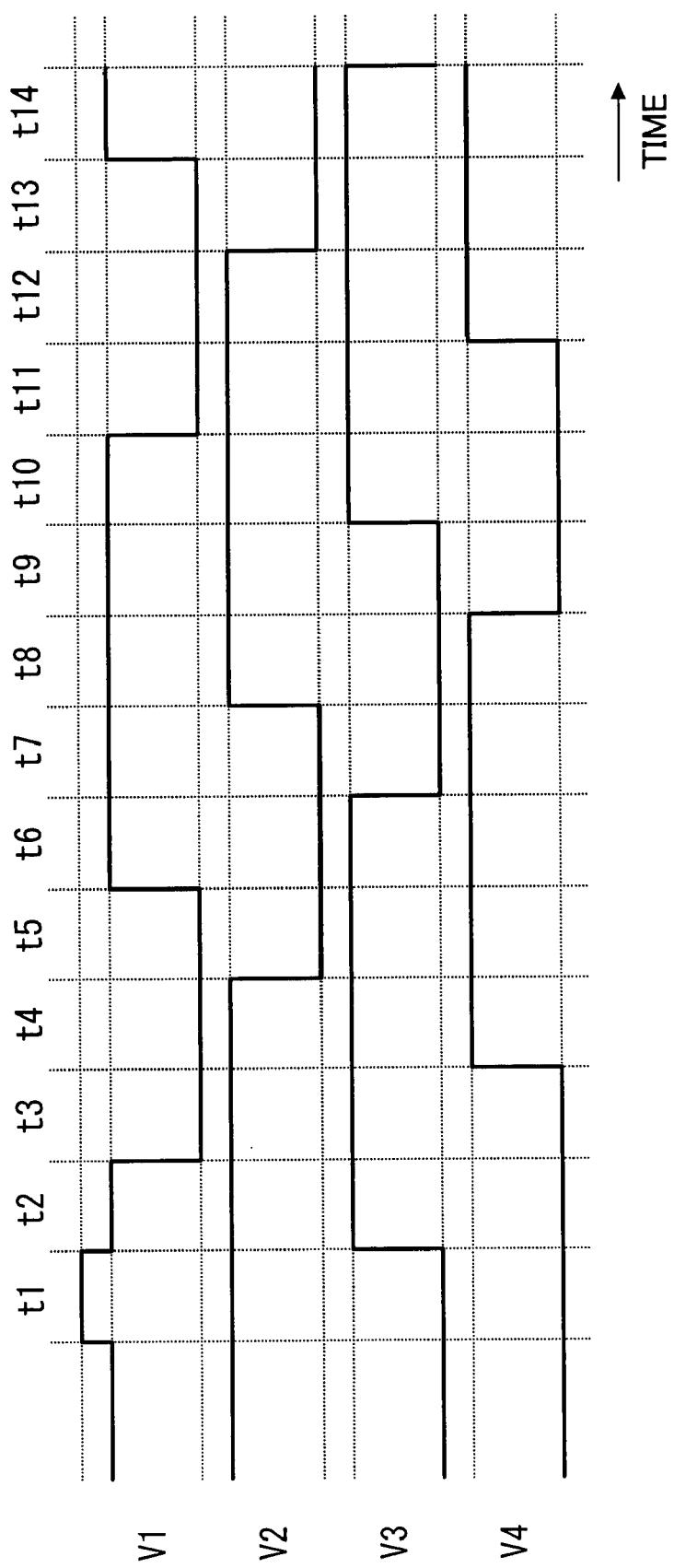
FIG. 9 shows the waveforms of pulses applied to the vertical transfer sections according to embodiment 1 of the present invention.

FIG. 9 shows driving pulses which are applied when the image sensor 103 retrieves the signal charges from the photoelectric converters 301 to the vertical transfer sections 302 for vertical transfer. Since the photoelectric converters 301 are connected to the vertical transfer gates V1 as shown in FIG. 3, application of a high voltage (about 15 V) to the gates V1 at time t1 of FIG. 9 causes the signal charges on the photoelectric converters 301 to be retrieved to the vertical transfer sections 302. After that, application of the pulses as shown in FIG. 9 causes the signal charges to be transferred via the vertical transfer sections 302.

Although not shown in FIG. 9, in the normal retrieval operation, at time t9 by which vertical transfer over four vertically-successive gates has been completed, the signal charge of one horizontal line stored in the horizontal transfer section 303 is horizontally transferred toward the charge signal detector 209, before an image capture signal is output from the image sensor 103. During this period, the vertical transfer is interrupted.

After the horizontal transfer for one horizontal line has been completed, the operation cycle of vertically transferring the signal charge over four gates and horizontally transferring the signal charge of one horizontal line is repeated till all the signal charges for the entire frame are output.

Figure 10:
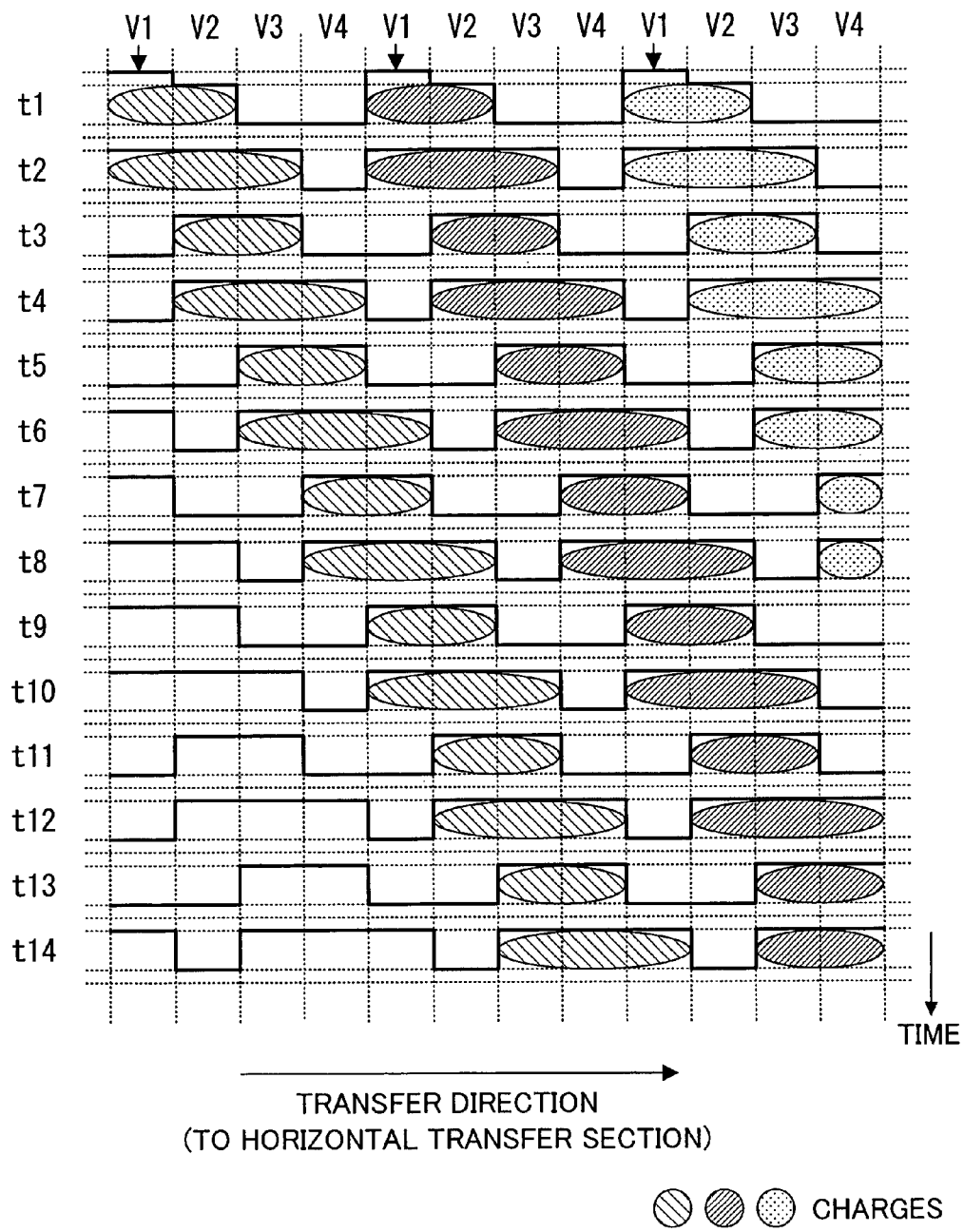
FIG. 10 shows the pulses applied to the vertical transfer section and the images of transferred charges according to embodiment 1 of the present invention.

FIG. 10 illustrates the transfer in the vertical transfer sections 302 of the charges retrieved from the photoelectric converters 301 when the driving pulses of FIG. 9 are applied. At time t1 of FIG. 10, a high-level (i.e., high-voltage) pulse is applied to the gates V1 while a high-level pulse is applied to the gates V2, so that the charges are retrieved from the photoelectric converters 301. At time t2, a high-level pulse is applied to the gates V3, so that the charges retrieved at time t1 of FIG. 10 are accumulated in the gates V1, V2 and V3. At time t3, a low-level pulse is applied to the gates V1, so that the charges retrieved at time t1 are accumulated in the gates V2 and V3. This means vertical transfer of the charges by one gate toward the horizontal transfer section 303. Subsequently, the charges are transferred toward the horizontal transfer section 303 in the same way.

It should be noted that, although not shown in FIG. 10, horizontal transfer occurs between time t9 and time t10 of FIG. 10 such that the charges accumulated in the horizontal transfer section 303 are transferred to the charge signal detector 209.

Figure 11:
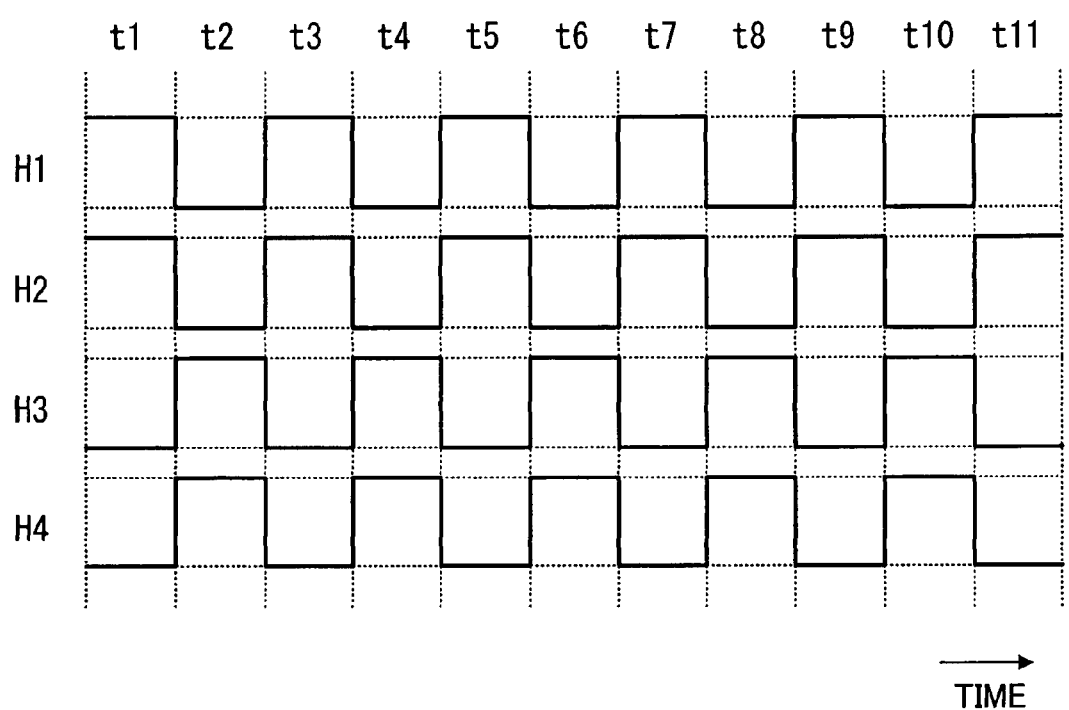
FIG. 11 shows the waveforms of pulses applied to the horizontal transfer section according to embodiment 1 of the present invention.

FIG. 11 is a timing chart illustrating the driving pulses which are applied when the signal charges transferred from the vertical transfer sections 302 to the horizontal transfer section 303 are horizontally transferred toward the charge signal detector 209. Although FIG. 11 shows only 11 unit time periods, the number of unit time periods actually necessary for the transfer corresponds to the total number of horizontal pixels and dummy pixels of the image sensor 103.

Figure 12:
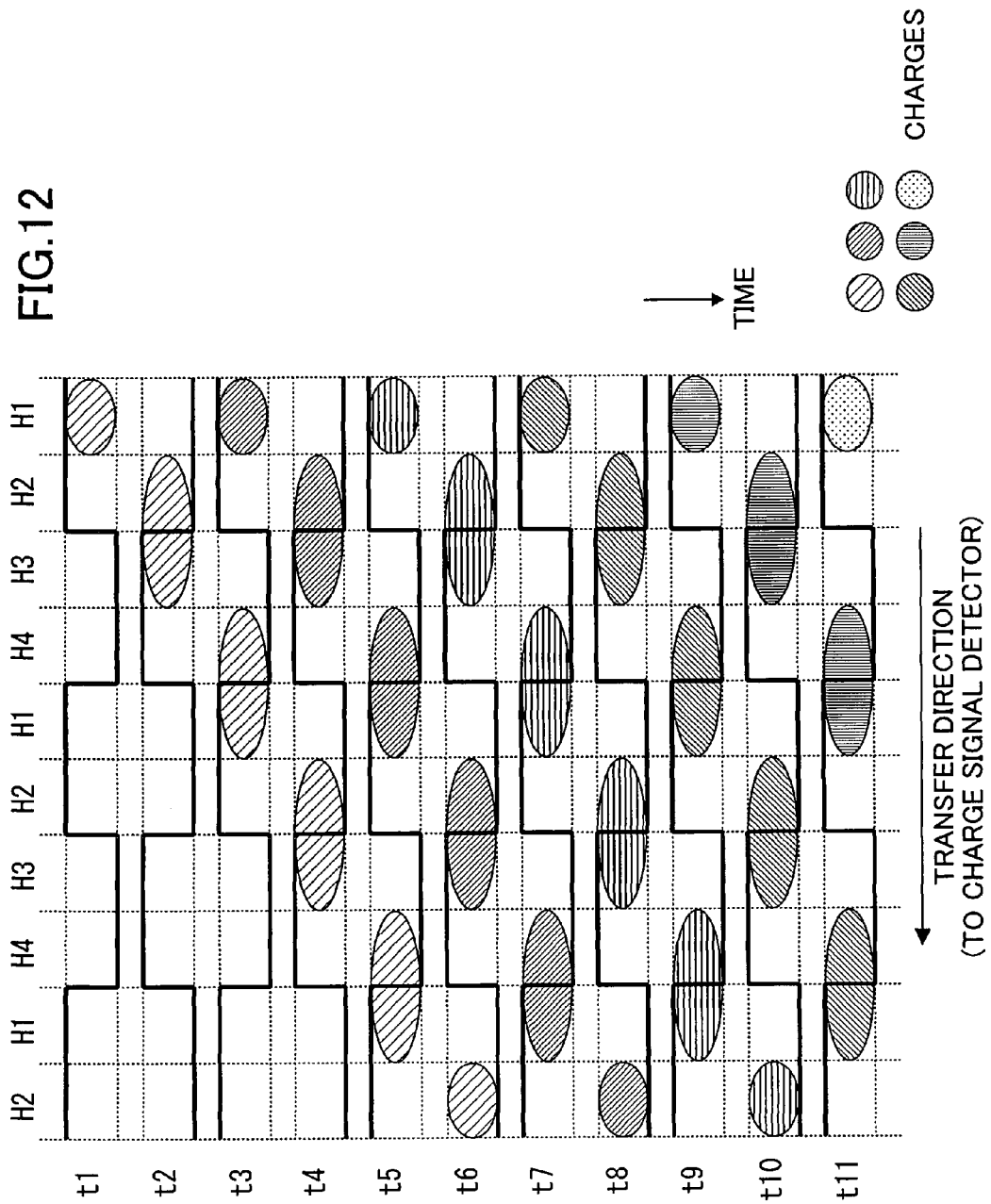
FIG. 12 shows the pulses applied to the horizontal transfer section and the images of transferred charges according to embodiment 1 of the present invention.

FIG. 12 illustrates the transfer of charges accumulated in the horizontal transfer section 303 which occurs when the driving pulses of FIG. 11 are applied. At time t1 of FIG. 12, a high-level pulse is applied to the gates H1 and H2 while a low-level pulse is applied to the gates H3 and H4, so that the charges transferred from the vertical transfer sections 302 are accumulated in the horizontal transfer section 303. At time t2, a low-level pulse is applied to the gates H1 and H2 while a high-level pulse is applied to the gates H3 and H4, so that the charges accumulated in the horizontal transfer section 303 at time t1 are transferred toward the charge signal detector 209. Subsequently, the charges are transferred toward the charge signal detector 209 in the same manner.

It should be noted that, although not shown in FIG. 12, the vertical transfer of charges illustrated in FIG. 9 and FIG. 10 occurs at every transfer of the number of stages corresponding to the total number of horizontal pixels and dummy pixels of the image sensor 103.

Figure 13:
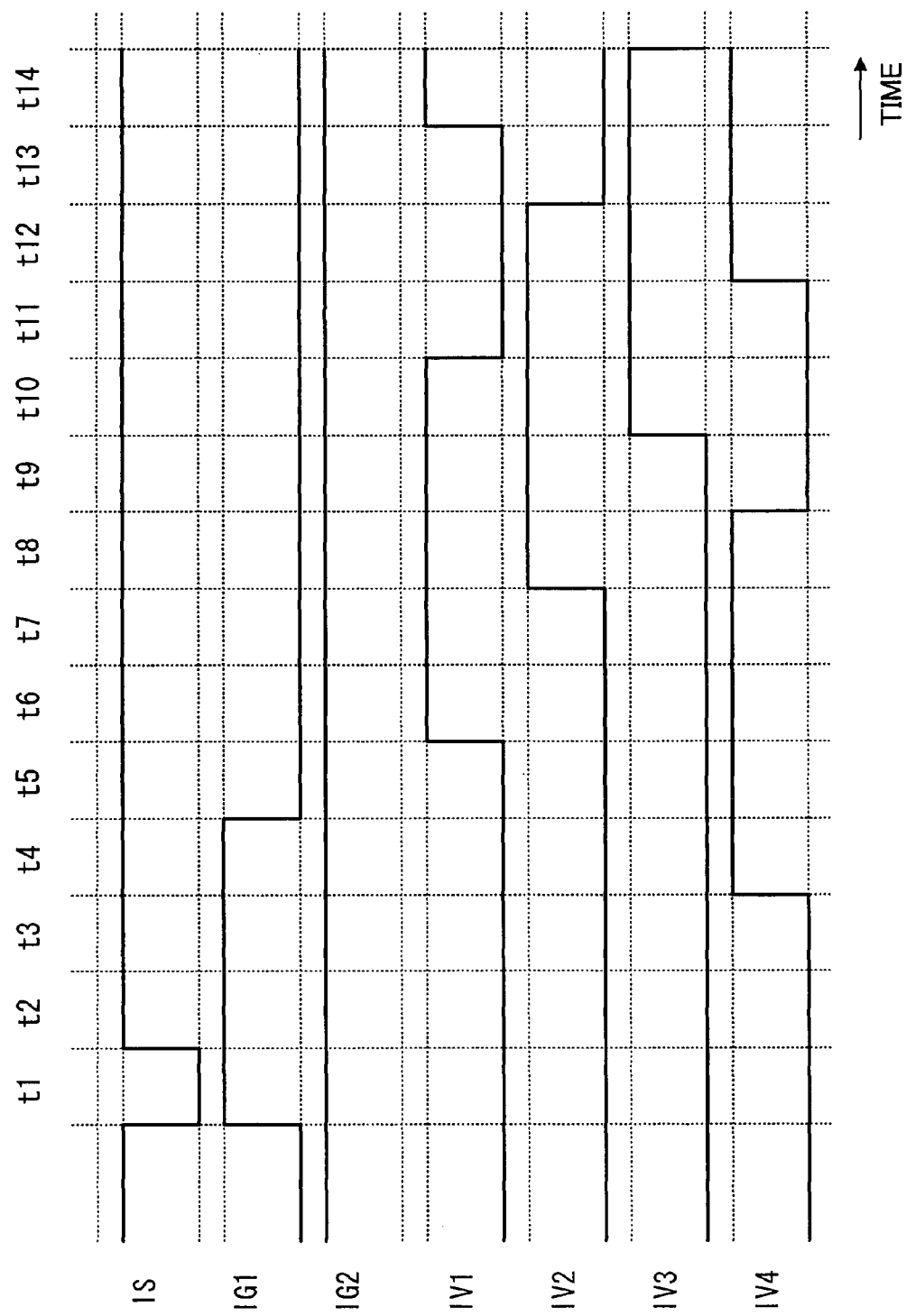
FIG. 13 shows the waveforms of pulses applied to the reference signal generator according to embodiment 1 of the present invention.

FIG. 13 is a timing chart illustrating the driving pulses which are applied when the reference signal generator 211 generates the reference charge and transfers the generated reference charge toward the gate electrode SG. At time t1 of FIG. 13, the electrode IS is decreased to a predetermined voltage, so that charge is injected to the electrode IS, and the charge is accumulated in the electrodes IG1 and IG2. Then, at time t2, the voltage of the electrode IS increases to a predetermined voltage, so that the potential of the electrode IS becomes shallow. As a result, part of the injected charge accumulated in the electrode IG1 returns to the electrode IS side, while another part of the injected charge remains in the electrode IG1. This operation causes a predetermined amount of charge, which corresponds to the potential difference among the electrodes IS, IG1 and IG2, to be accumulated in the electrodes IG1 and IG2. As a result of this predetermined voltage increase/decrease operation, the amount of charge as a reference signal is determined. Subsequently, the reference charge can be transferred toward the gate electrode SG by applying driving pulses to the electrodes IV1 to IV4 as in the vertical transfer sections 302.

Figure 14:
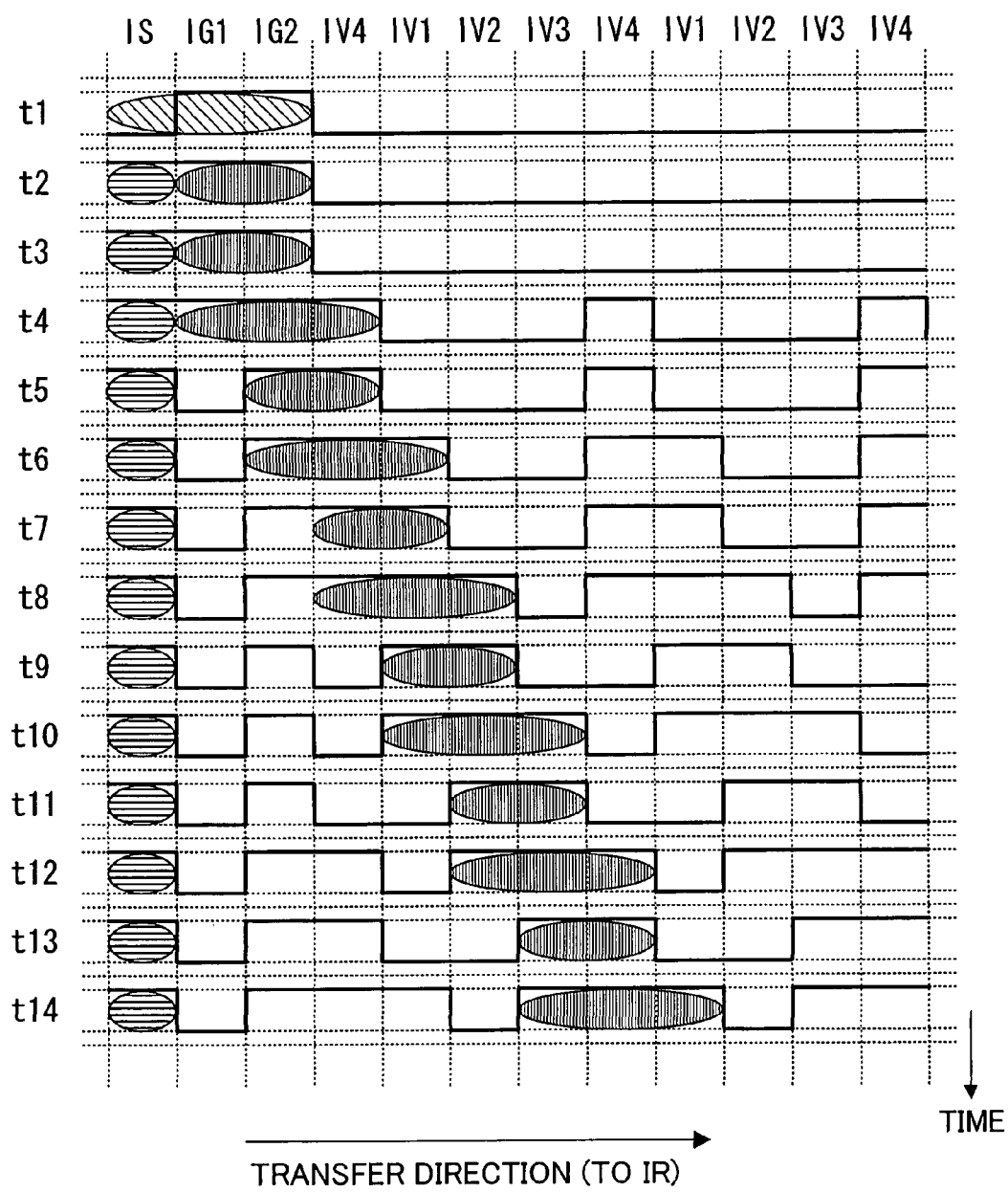
FIG. 14 shows the pulses applied to the horizontal transfer section and the images of transferred charges according to embodiment 1 of the present invention.

FIG. 14 illustrates the transfer of the reference charges output from the electrode IS when the driving pulses of FIG. 13 are applied. At time t1 of FIG. 14, a high-level pulse is applied to the electrodes IG1 and IG2. At the same time, the electrode IS is decreased to a predetermined voltage so that charge is injected, and the charge is accumulated in the electrodes IG1 and IG2. At time t2, the voltage of the electrode IS increases to a predetermined voltage, so that the potential of the electrode IS becomes shallow. As a result, part of the charge generated at time t1 is accumulated in the electrode IS side, while another part of the charge is accumulated in the electrodes IG1 and IG2. Subsequently, the reference charge can be transferred toward the gate electrode SG by applying driving pulses to the electrodes IV1 to IV4 as in the vertical transfer sections 302.

It should be noted that, although not shown in FIG. 14, after the reference charge is transferred to a predetermined position of the gate electrode SG, the operation of transferring this reference charge to the vertical transfer sections 302 is carried out.

Figure 15:
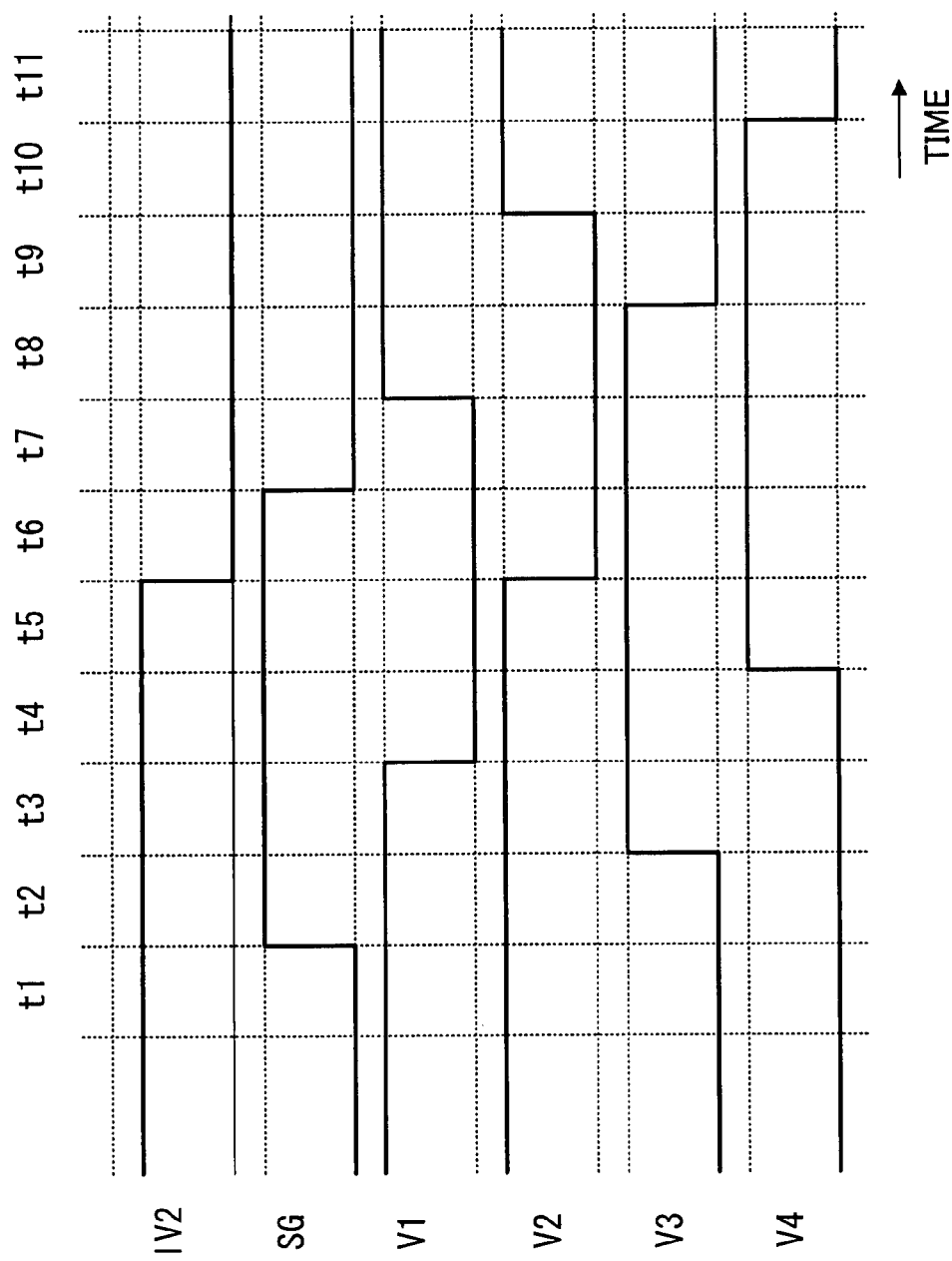
FIG. 15 shows the waveforms of pulses applied to the reference signal generator and vertical transfer section according to embodiment 1 of the present invention.

FIG. 15 is a timing chart illustrating the driving pulses which are applied when the reference charge is transferred to the vertical transfer sections 302 after the reference charge has been transferred to the predetermined gate electrode SG by the electrodes IG1, IG2, IV1, IV2, IV3 and IV4. Application of a high-level pulse to the gate electrode SG while the reference charge is accumulated in the electrode IV2 causes the charge accumulated in the electrode IV2 to be transferred to the gate electrode SG. Thereafter, a pulse for transferring the charges of the vertical transfer sections 302 is kept applied until time t6. Then, at time t7, a low-level pulse is applied to the gate electrode SG while a high-level pulse is applied to the electrode V4, whereby the charge is transferred from the gate electrode SG to the electrode V4. Subsequently, application of the pulses for vertical transfer shown in FIG. 9 and FIG. 10 enables transfer of the reference charge.

Figure 16:
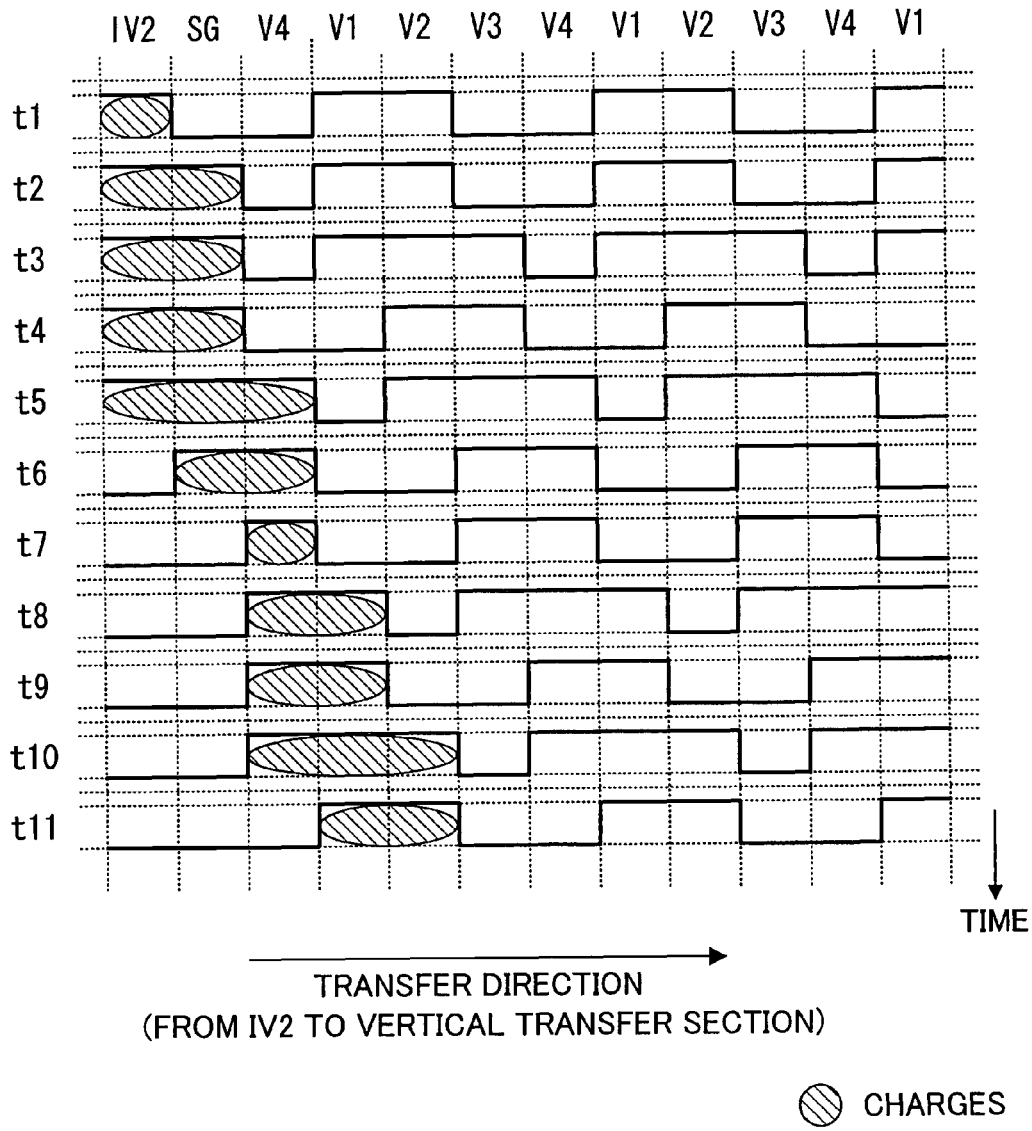
FIG. 16 shows the pulses applied to the reference signal generator and vertical transfer section and the images of transferred charges according to embodiment 1 of the present invention.

FIG. 16 illustrates the transfer of the reference charges to the vertical transfer sections 302 when the driving pulses of FIG. 15 are applied. At time t1 of FIG. 16, the reference charge is accumulated in the electrode IV2 adjacent to the gate electrode SG. At time t2, a high-level pulse is applied to the gate electrode SG, so that the charge accumulated in the electrode IV2 is transferred to the gate electrode SG. Thereafter, a pulse for transferring the charges of the vertical transfer sections 302 is kept applied until time t6. At time t7, a low-level pulse is applied to the gate electrode SG while a high-level pulse is applied to the electrode V4 so that the charge is transferred from the gate electrode SG to the electrode V4. Subsequently, application of the pulses for vertical transfer shown in FIG. 9 and FIG. 10 enables transfer of the reference charge.

(2) Analog Circuit 104

Figure 17:
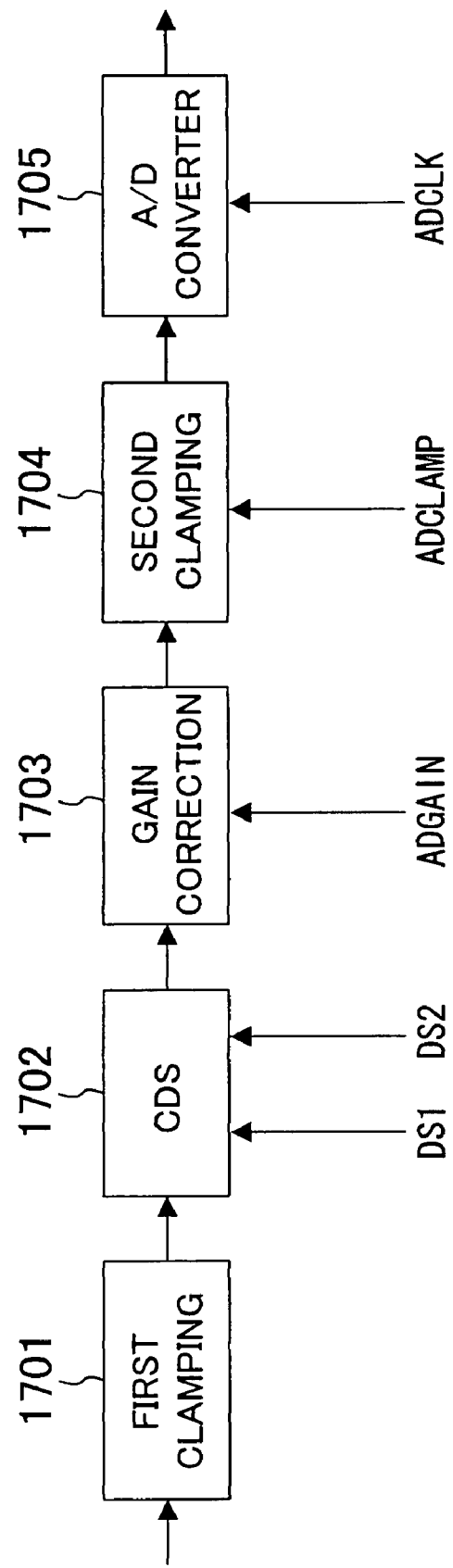
FIG. 17 is a block diagram showing a functional structure of an analog circuit according to embodiment 1 of the present invention.

Next, the structure of the analog circuit 104 is described. FIG. 17 is a block diagram showing a general structure of the analog circuit 104. As shown in FIG. 17, the analog circuit 104 includes a first clamping circuit 1701, a CDS circuit 1702, a gain correction circuit 1703, a second clamping circuit 1704 and an A/D converter circuit 1705.

The first clamping circuit 1701 removes dark current components included in an image capture signal input from the image sensor 103 and adjusts the DC level of the analog image capture signal.

The CDS circuit 1702 samples the level of the feed-though of the image capture signal and the level of the photoelectrically-converted image capture signal at the timings of rising edges of pulse DS1 (hereinafter, a pulse used for sampling the level of the feed-through of the image capture signal is referred to as "pulse DS1") and pulse DS2 (hereinafter, a pulse used for sampling the level of the photoelectrically-converted image capture signal is referred to as "pulse DS2"), respectively, whereby noise included in an image capture signal with corrected DC level, which has been produced by reset and mixed in at the charge signal detector 209, is removed.

In the case where the image capture signal does not reach a predetermined level, the gain correction circuit 1703 performs a gain correction on the image capture signal according to the value of preset value ADGAIN for correction of signal level. Further, the gain correction circuit 1703 adjusts the range for A/D conversion of the A/D converter circuit 1705 at the subsequent stage.

The second clamping circuit 1704 performs a clamping process to remove, according to the value of preset value ADCLAMP, part of the dark current components which has been left unremoved in the first clamping circuit 1701 at the previous stage and deviation in DC level which has been generated by any other circuit, such that A/D conversion can be carried out at an appropriate signal level.

The A/D converter circuit 1705 converts the analog signal with corrected clamp and signal levels to a digital signal in synchronization with clock signal ADCLK.

It should be noted that the timings of pulse DS1 and pulse DS2 and the timings of preset value ADGAIN and preset values ADCLAMP and ADCLK are set by the CPU 113.

(3) Drive Circuit 105

The drive circuit 105 synthesizes ternary pulse V1 and binary pulses V2 to V4, which are used for retrieving image capture charges from the photoelectric converters 301 and for driving the vertical transfer sections 302 based on a signal output from the TG 111.

(4) Memory Control Circuit 106

The memory control circuit 106 writes in the SDRAM 107 the digital image capture signals which have been A/D-converted at the analog circuit 104 based on the system synchronization signal output from the SSG 110. The memory control circuit 106 also retrieves the digital image capture signals stored in the SDRAM 107 based on the system synchronization signal output from the SSG 110 and outputs the retrieved digital image capture signals to the YC process circuit 108 and the pulse adjustment arithmetic circuit 112.

It should be noted that the settings for the writing and retrieval by the memory control circuit 106 are determined by the CPU 113.

(5) YC Process Circuit 108

Figure 18:
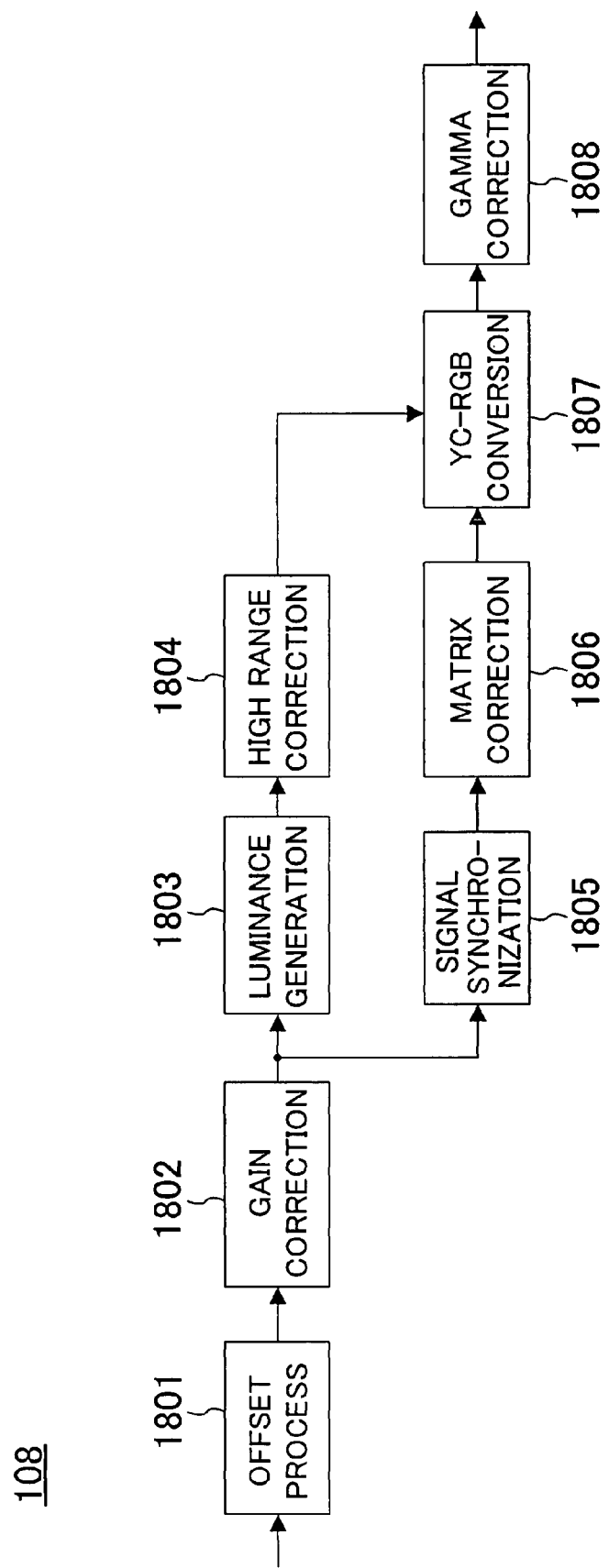
FIG. 18 is a block diagram showing a functional structure of a YC process circuit according to embodiment 1 of the present invention.

The structure of the YC process circuit 108 is now described. FIG. 18 is a block diagram showing a general structure of the YC process circuit 108. The YC process circuit 108 includes an offset process section 1801, a gain corrector 1802, a luminance generator 1803, a high range corrector 1804, a signal synchronizer 1805, a matrix corrector 1806, a YC-RGB converter 1807 and a gamma corrector 1808.

The offset process section 1801 corrects deviation in black level of the digital image capture signal by adding or subtracting a value set by the CPU 113.

The gain corrector 1802 multiplies the digital image capture signal by a value set by the CPU 113 such that the digital image capture signal reaches an appropriate level.

The luminance generator 1803 performs the arithmetic operation shown below on the digital image capture signal to generate a luminance signal:

Luminance signal=$0.3 \times (R$ signal$)+0.59 \times (G$ signal$)+0.11 \times (B$ signal$)$.

The high range corrector 1804 corrects high-frequency components of the luminance signal deteriorated by optics and signal processors. Specifically, the high range corrector 1804 corrects the acutance of edges in images.

The signal synchronizer 1805 synchronizes R-, G-, and B-signals arranged in Bayer layout to generate the R-, G-, and B-signals on a same pixel address.

The matrix corrector 1806 performs the arithmetic operations shown below on the R-, G-, and B-signals synchronized by the signal synchronizer 1805 to generate a B-Y signal and a R-Y signal:

($B$-$Y$ signal)=$-0.3 \times (R$ signal$)-0.59 \times (G$ signal$)+0.89 \times (B$ signal$)$; and ($R$-$Y$ signal)=$0.7 \times (R$ signal$)-0.59 \times (G$ signal$)-0.11 \times (B$ signal$)$.

The YC-RGB converter 1807 performs the arithmetic operations shown below on the luminance signal generated by the luminance generator 1803 and the B-Y and R-Y signals generated by the matrix corrector 1806 to generate R'-, G'-, and B'-signals:

($R'$ signal)=$a \times$(luminance signal)$+b \times (B$-$Y$ signal)$+c \times (R$-$Y$ signal);

($G'$ signal)=$d \times$(luminance signal)$+e \times (B$-$Y$ signal)$+f \times (R$-$Y$ signal); and ($B'$ signal)=$g \times$(luminance signal)$+h \times (B$-$Y$ signal)$+i \times (R$-$Y$ signal), where a, b, c, d, e, f, g, h, and i represent parameters The gamma corrector 1808 corrects the R'-, G'-, and B'-signals generated by the YC-RGB converter 1807 to have a characteristic inverse to the gamma characteristic of the CRT (Cathode Ray Tube) which is one example of the display device 115 for the purpose of correcting the gamma characteristic of the CRT. The corrected R'-, G'-, and B'-signals are output to the back end circuit 109 at the subsequent stage.

It should be noted that the settings for the image processes employed in the YC process circuit 108 are determined by the CPU 113.

(6) Back End Circuit 109

The back end circuit 109 performs processing, such as expansion/contraction, trimming, compressive encoding, or the like, on a video signal input from the YC process circuit 108 of the previous stage, and then, carries out recording of the processed video signal in the memory card 114 or reproduces the processed video signal on the display device 115.

(7) SSG 110

The SSG 110 generates the system synchronization signal based on which respective blocks of the electronic still camera 117 operate.

Figure 19:
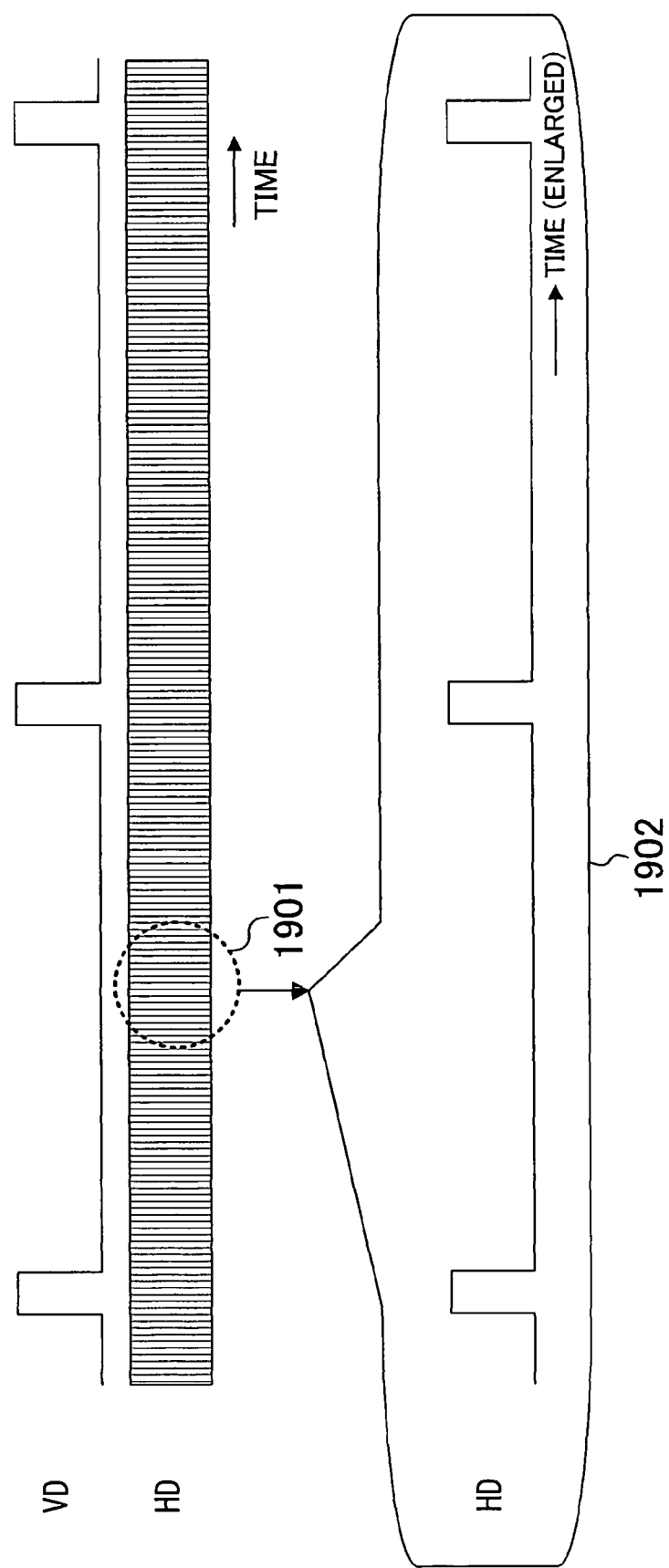
FIG. 19 shows the waveforms of a vertical synchronization signal and a horizontal synchronization signal according to embodiment 1 of the present invention.

FIG. 19 shows an example of the synchronization signal output by the SSG 110. Waveform 1902 is the enlarged illustration of part 1901 of horizontal synchronization signal HD. Vertical synchronization signal VD and horizontal synchronization signal HD are periodic signals. Vertical synchronization signal VD rises once every vertical blanking interval and falls after passage of a predetermined time interval. Horizontal synchronization signal HD rises once every horizontal blanking interval and falls after a predetermined timing is passed.

Each block of the electronic still camera 117 operates in synchronization with the timings of horizontal synchronization signal HD and vertical synchronization signal VD. It should be noted that the settings of the SSG 110 for the cycle and timing of the synchronization signal are determined by the CPU 113.

(8) TG 111

The TG 111 is a block which generates a pulse used for driving the image sensor 103 and the analog circuit 104. The TG 111 adjusts the timing of the operations of the vertical transfer sections 302, the horizontal transfer section 303, the reference signal generator 211, the CDS circuit 1702 and the A/D converter circuit 1705.

It should be noted that the settings of the TG 111 for the cycle and timing of the synchronization signal are determined by the CPU 113.

(9) Pulse Adjustment Arithmetic Circuit 112

The pulse adjustment arithmetic circuit 112 evaluates the pulse timing based on the reference signal retrieved from the image sensor 103 for pulse timing adjustment and the preset value of the pulse timing of the TG 111 which has been set at the time of outputting the reference signal. The pulse adjustment arithmetic circuit 112 then updates the pulse timing such that the result of the evaluation is improved and informs the TG 111 about the update.

(10) Actual Operation

The operations of the above-described function blocks are described.

Figure 20:
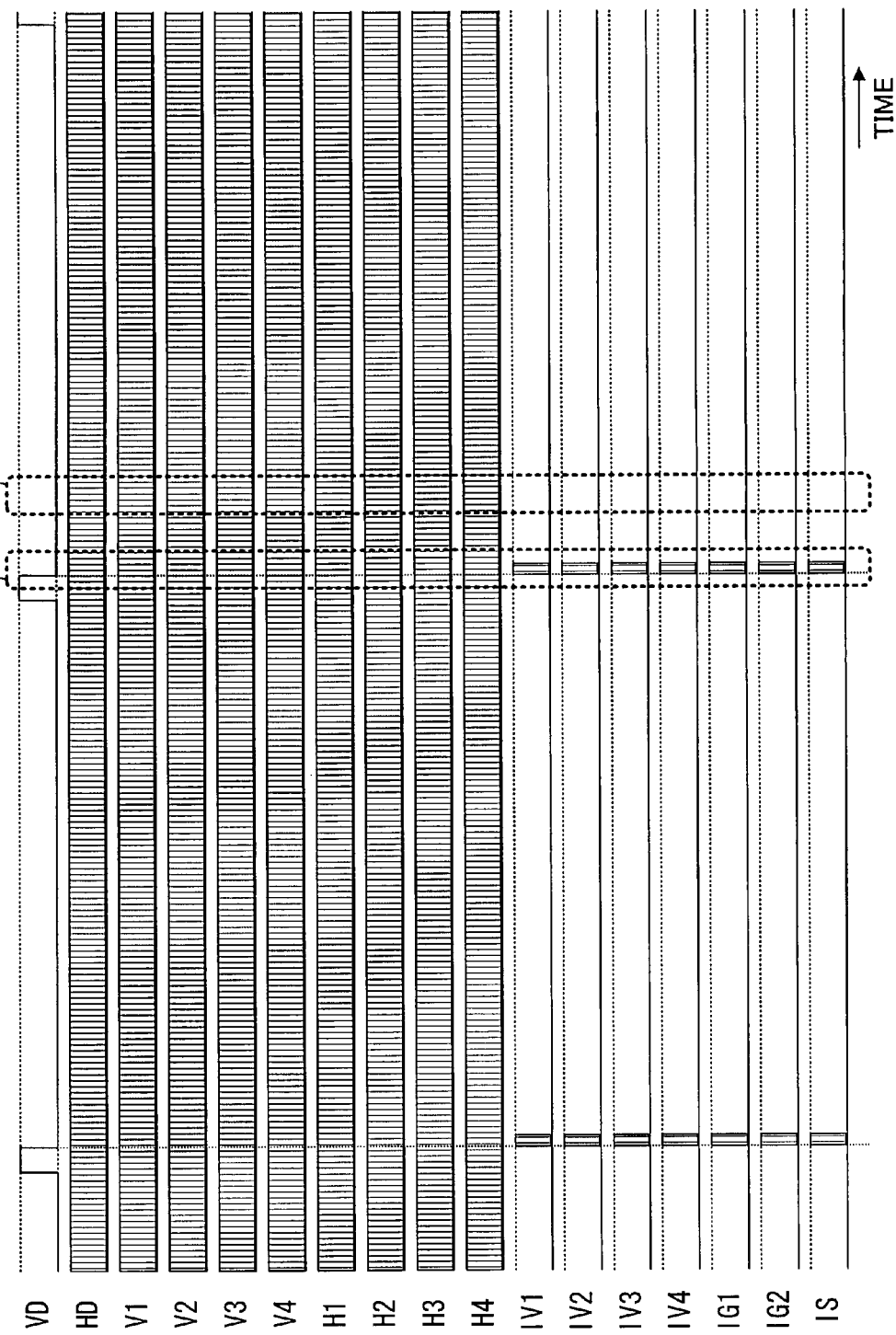
FIG. 20 shows the waveforms of image sensor driving pulses at the vertical blanking interval rate according to embodiment 1 of the present invention.

FIG. 20 is a timing chart illustrating vertical synchronization signal VD and horizontal synchronization signal HD at the vertical blanking interval rate and the pulses for driving the image sensor 103 and the analog circuit 104. It should be noted that the pulses other than signal VD have very short cycles as compared with signal VD and are therefore schematically illustrated in the form of rectangular lattices in FIG. 20.

Figure 21:
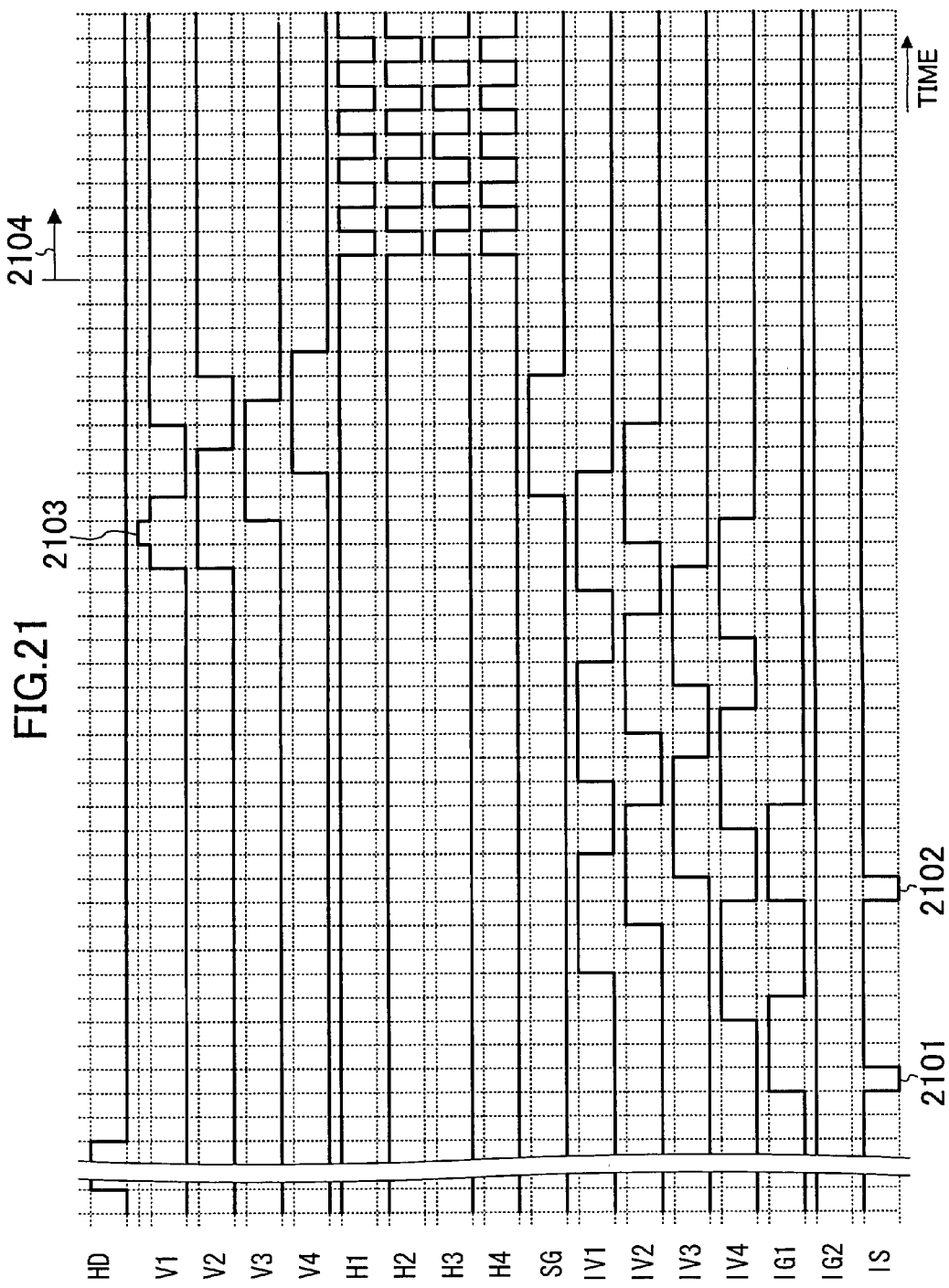
FIG. 21 shows the waveforms of image sensor driving pulses at the horizontal blanking interval rate, including retrieval of charges from the photoelectric converters, according to embodiment 1 of the present invention.

FIG. 21 is the enlarged illustration of part 2001 of FIG. 20, illustrating the driving pulses applied when signal charges are retrieved from the photoelectric converters 301 to the vertical transfer sections 302 and the driving pulses applied when the reference charge is output from the reference charge generator 601 and transferred to the vertical transfer sections 302 via the gate electrode SG.

Figure 22:
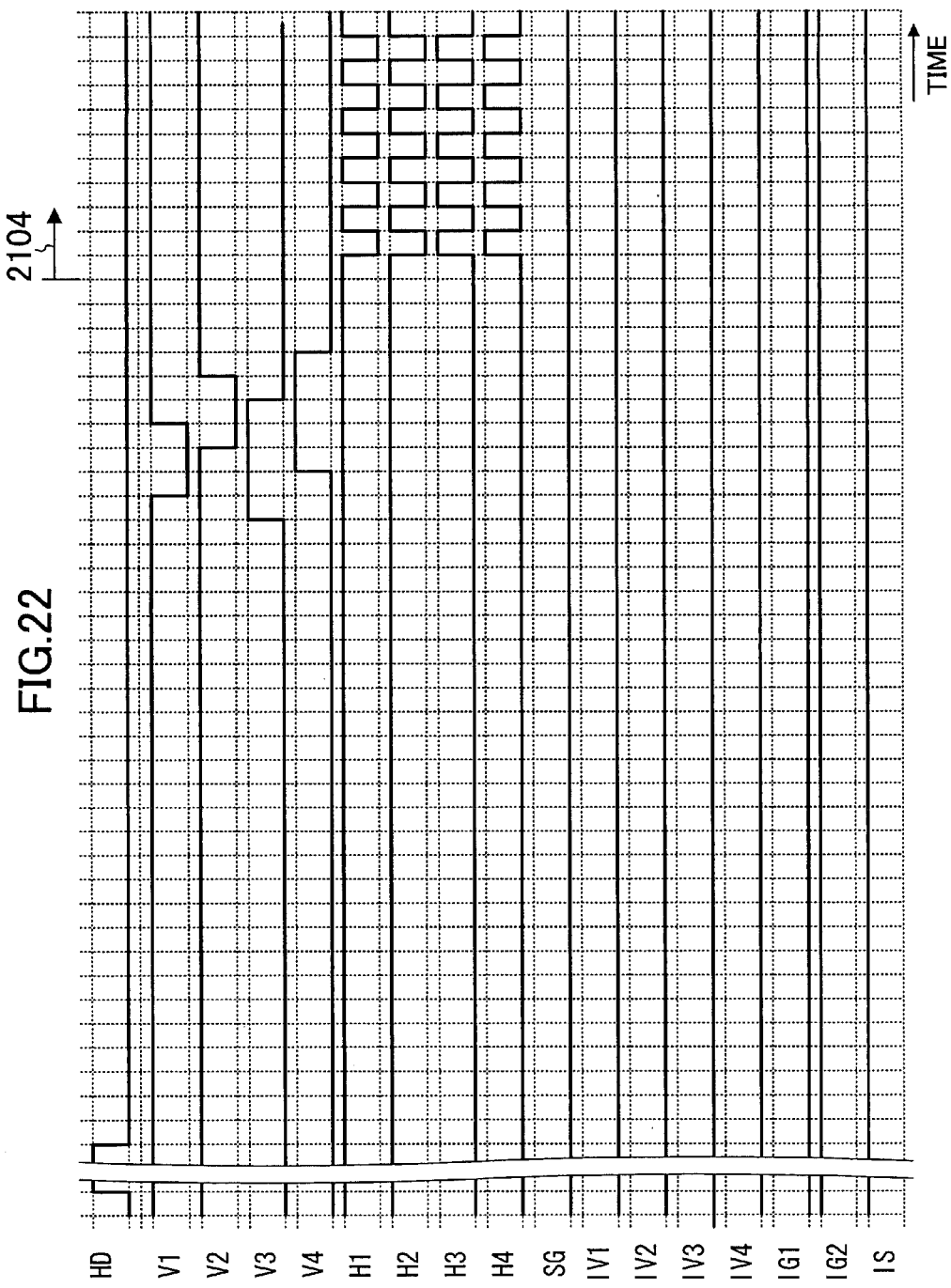
FIG. 22 shows the waveforms of image sensor driving pulses at the horizontal blanking interval rate, not including retrieval of charges from the photoelectric converters, according to embodiment 1 of the present invention.

FIG. 22 is the enlarged illustration of part 2002 of FIG. 20, illustrating the driving pulses applied when the signal charges accumulated in the vertical transfer sections 302 are transferred.

At time 2101 and time 2102 of FIG. 21, the reference charge equivalent to two data units is generated. At time 2103, the signal charges are retrieved from the photoelectric converters 301 to the vertical transfer sections 302. After time 2104, the chart illustrates the timings of the driving pulses for the transfer operation of the horizontal transfer section 303.

As described above, application of the driving pulses shown in FIG. 21 and FIG. 22 enables retrieval of all the signal charges and the reference charge equivalent to two data units every vertical blanking interval.

Then, the pulse adjustment arithmetic circuit 112 uses digital data obtained by A/D conversion of the reference charge to optimize the timing of pulses of signals H1, H2, H3, H4, V1, V2, V3, and V4.

Figure 23:
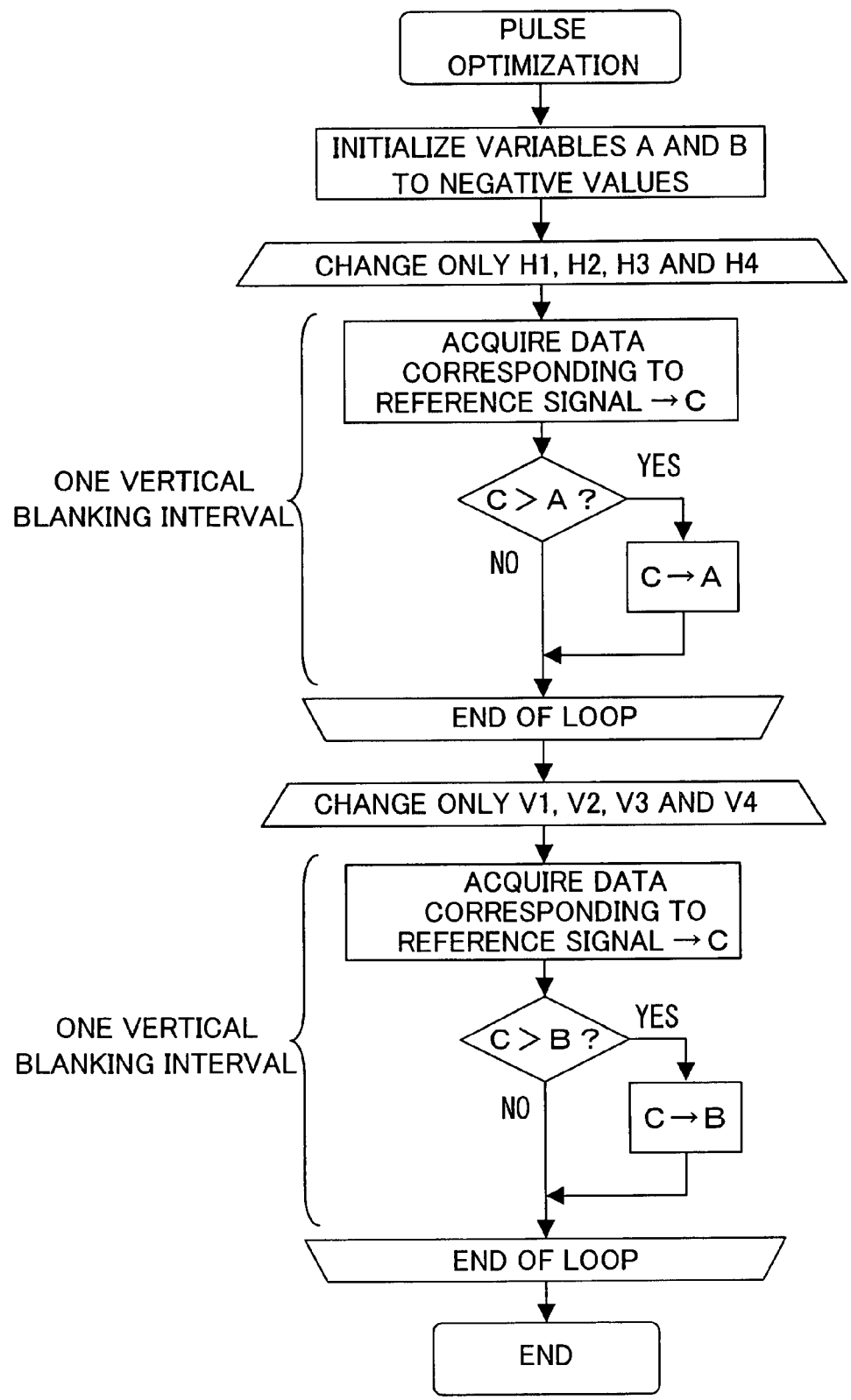
FIG. 23 is a flowchart illustrating the procedure of a pulse optimization process according to embodiment 1 of the present invention.

The optimization procedure is as shown in the flowchart of FIG. 23:

(a) Change all the timings and phases of signals H1, H2, H3 and H4 within allowable ranges to acquire a digital value corresponding to the reference charge for each preset value;

(b) Select one of the preset values with which the digital value corresponding to the reference charge is maximized;

(c) Change all the timings and phases of signals V1, V2, V3, and V4 within allowable ranges to acquire a digital value corresponding to the reference charge for each preset value; and (d) Select one of the preset values with which the digital value corresponding to the reference charge is maximized.

This procedure enables detection of deterioration in transfer efficiency which can occur when signals V1, V2, V3, and V4 relevant to vertical transfer and signals H1, H2, H3 and H4 relevant to horizontal transfer have unpreferable timings.

The transfer efficiency is the ratio expressed in percentages between the amount of signal charge accumulated in a transfer stage (=Q1) and the amount of signal charge in the next transfer stage after Q1 is transferred through a charge transfer operation (=Q2):

$$(\text{Transfer Efficiency}) = 100 \times Q2/Q1.$$

For example, in the case where the transfer efficiency is 90% at a certain preset value, every stage of transfer fails to transfer 10% of the charge, and therefore, the amount of charge decreases exponentially by a factor of the number of transfer stages. In other words, in the case where the value corresponding to the reference charge reaches the maximum value, the best transfer efficiency, namely, preferable transfer timing setting, is achieved.

It should be noted that although in FIG. 23 the driving pulses relevant to horizontal transfer are optimized before the driving pulses relevant to vertical transfer are optimized, the opposite order of optimization may be employed.

Further, the vertical and horizontal pulses may be optimized alternately or in an indefinite order.

To shorten the optimization period, only the driving pulses relevant to vertical transfer or only the driving pulses relevant to horizontal transfer may be optimized.

Although in the above-described example of this embodiment optimization of the driving pulses is carried out during the period of normal operation of the electronic still camera 117, optimization is preferably carried out at startup of the electronic still camera 117.

Figure 24:
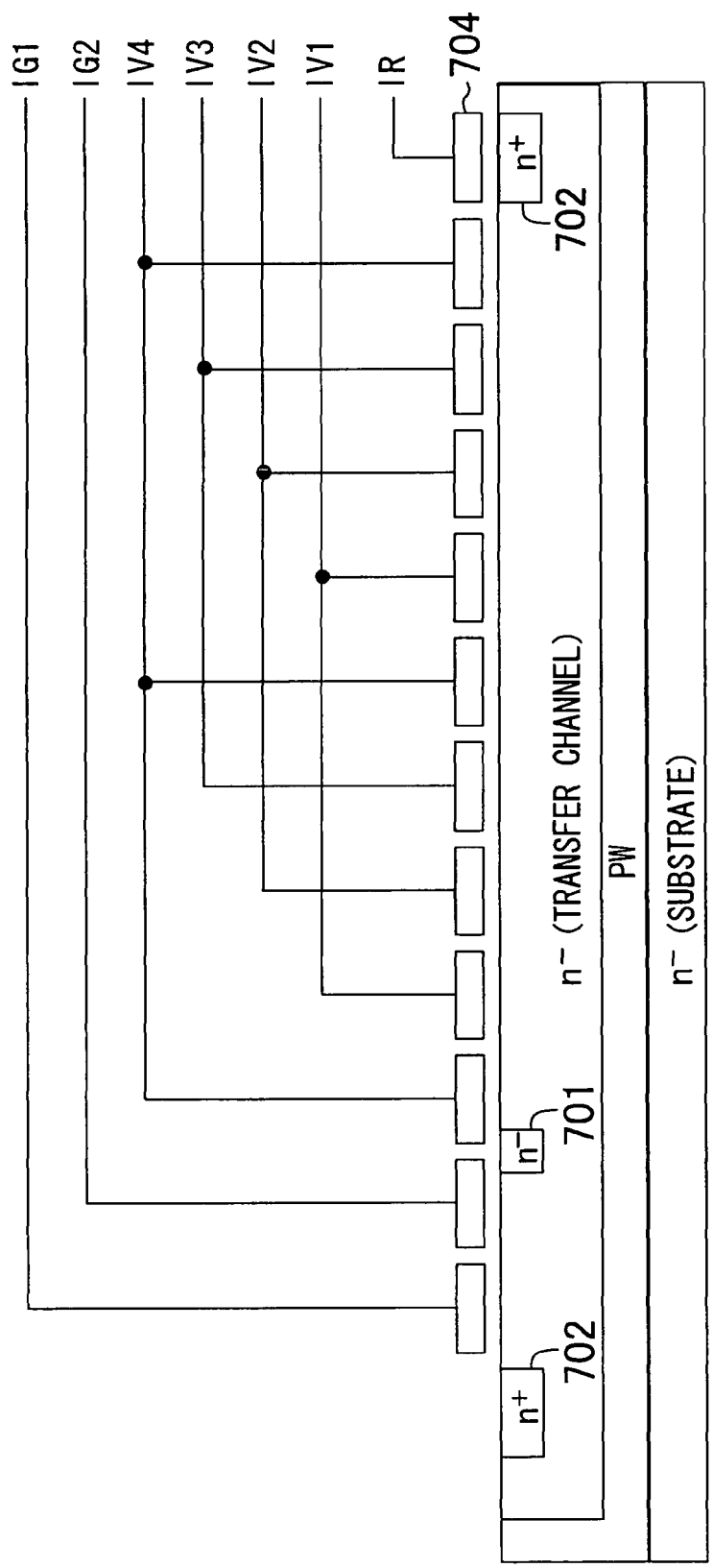
FIG. 24 is a cross-sectional view of a variation of the reference signal generator of the image sensor shown in FIG. 7 according to embodiment 1 of the present invention.

FIG. 24 illustrates a variation of the structure of FIG. 7 in the reference signal generator 211 of the image sensor 103. Referring to FIG. 24, the structure includes an electrode for drain of FIG. 7 (electrode (IR) 704) but does not include an electrode for supplying the reference charge (electrode (IS) 703). Herein, the reference charge is supplied by dark current components. With the structure of FIG. 24, it is difficult to externally control the reference signal to a desired level at a desired timing. However, the number of pins through which signals are input to the image sensor 103 can be reduced.

It should be noted that the feature of the structure of FIG. 24 is simply absence of the electrode for supplying the reference charge from the reference charge generator 601. However, an alternative form structured to enhance generation of dark currents is possible wherein, for example, the impurity concentration of the reference charge generator 601 is intentionally increased.

In the case where using only the dark current components cannot achieve a sufficient reference signal level, the interval of retrieval from the reference signal generator 211 may be extended as compared with the structure including the electrode for supplying the reference charge (electrode (IS) 703), such that the dark current components can be used as a reference signal of a sufficient level.

[2] Embodiment 2

An electronic still camera according to embodiment 2 of the present invention is now described. The electronic still camera of this embodiment has substantially the same structure as the electronic still camera 117 of embodiment 1 except that a reference signal generator is provided at a different position in the image sensor 103. Hereinafter, the focus of the descriptions is this difference.

Figure 25:
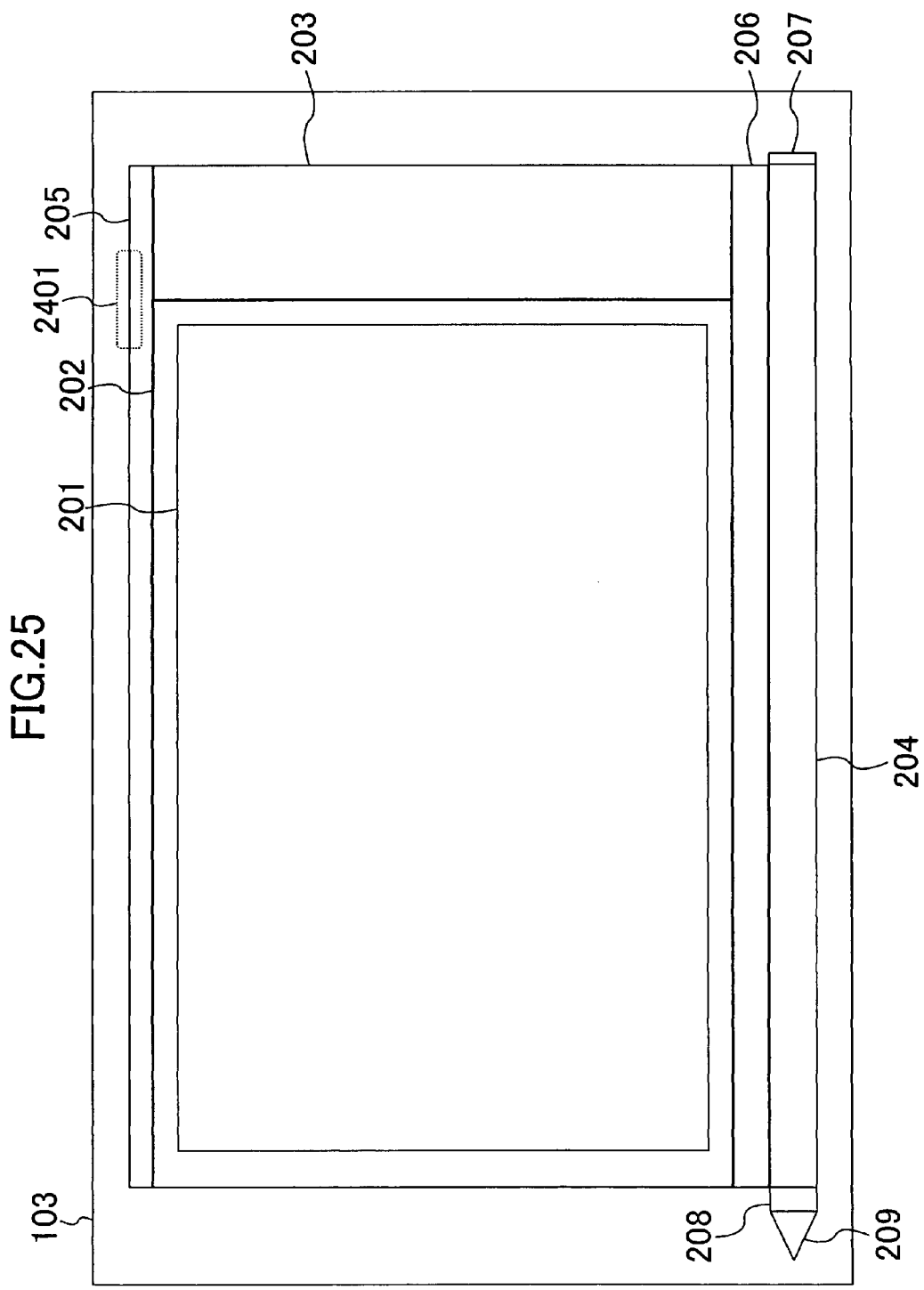
FIG. 25 is a plan view of an image sensor according to embodiment 2 of the present invention.

The image sensor 103 of this embodiment has the structure as shown in FIG. 25. The reference signal generator is provided at position 2401.

Figure 26:
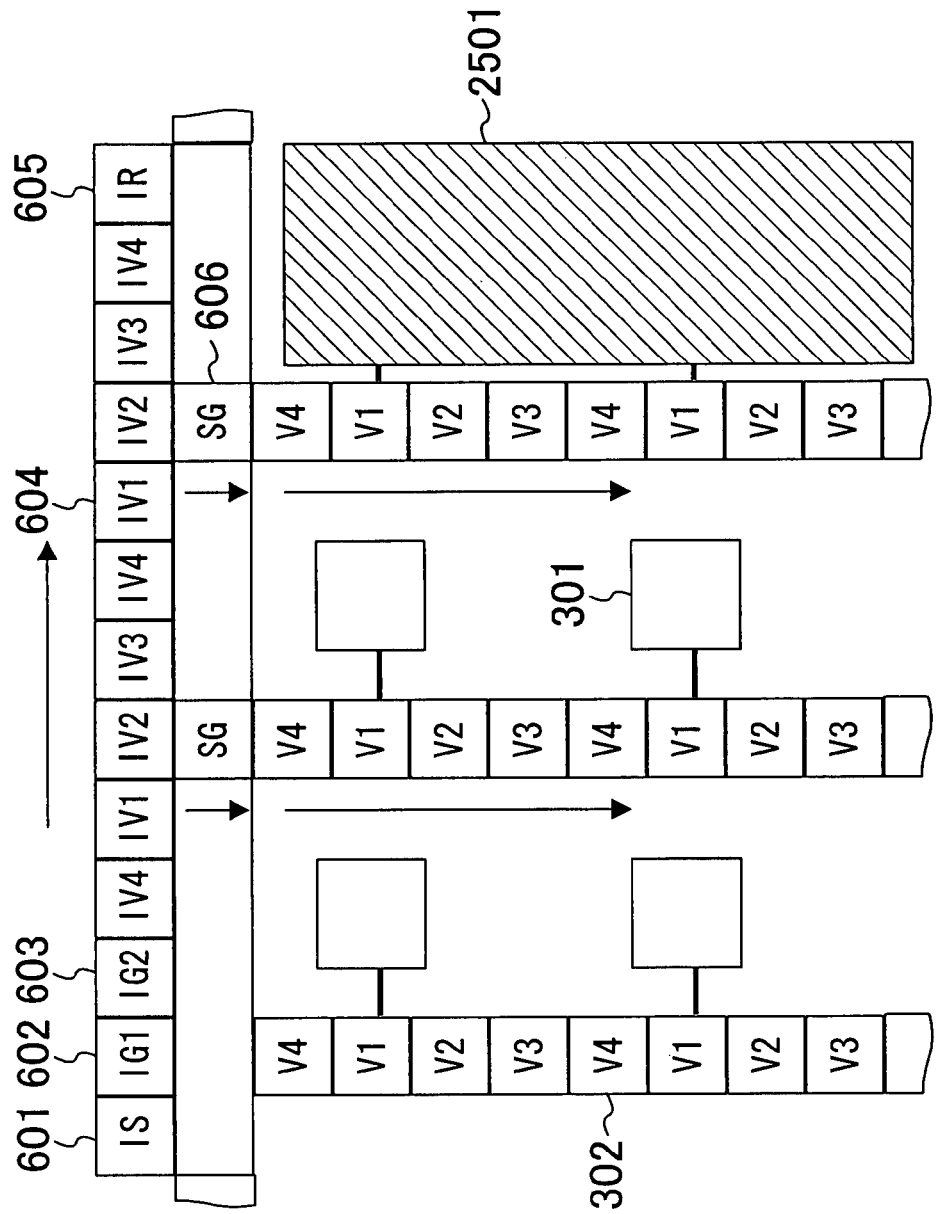
FIG. 26 is an enlarged plan view of a reference signal generator of the image sensor according to embodiment 2 of the present invention.

FIG. 26 is the enlarged illustration of the reference signal generator 2401. An aluminum light blocking film 2501 is provided over a photoelectric converter 301 adjacent to one of the two vertical transfer sections 302 through which the reference charge is transferred.

With this structure, a digital reference signal corresponding to the reference charge can be obtained without being affected by smear components which can be generated by excessive amount of light incident on the image sensor 103. The pulse optimization can be achieved even without using a mechanical light blocking element, such as a mechanical shutter, or the like, in the optical path of the electronic still camera 117.

It should be noted that, although in the above-described example of this embodiment the aluminum light blocking film 2501 is provided over the photoelectric converter 301 adjacent to one of the two vertical transfer sections 302 through which the reference charge is transferred, the aluminum light blocking film 2501 may be provided over both of the photoelectric converters 301.

[3] Embodiment 3

An electronic still camera according to embodiment 3 of the present invention is now described. The electronic still camera of this embodiment has substantially the same structure as the electronic still camera 117 of embodiment 1 except that a light blocking element is provided in the optical path and that the image sensor 103 is in a different exposure state when the driving pulses are optimized. Hereinafter, the focuses of the descriptions are these differences.

Figure 27:
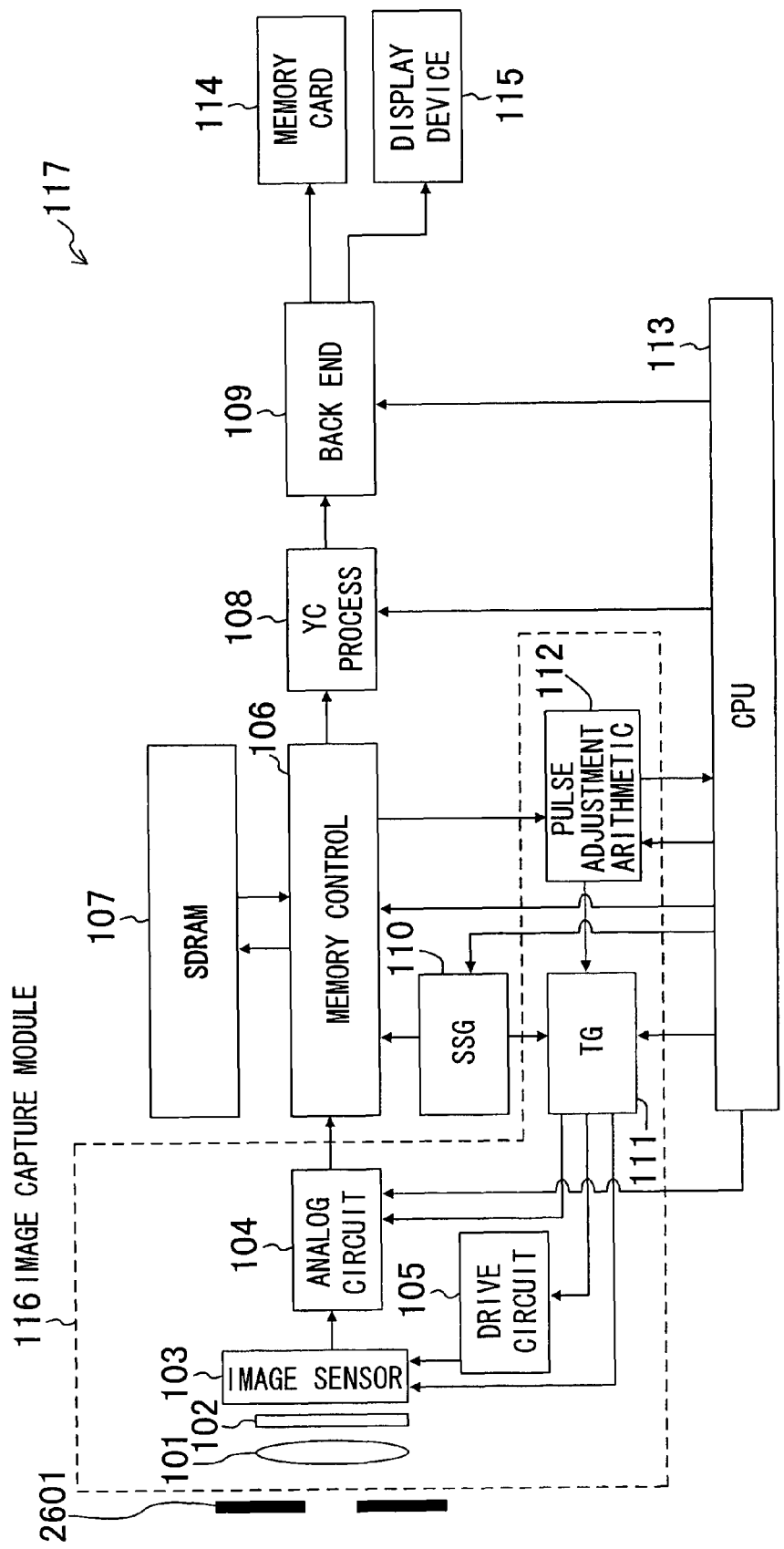
FIG. 27 is a block diagram showing a functional structure of an electronic still camera according to embodiment 3 of the present invention.

The electronic still camera 117 of this embodiment has the structure as shown in FIG. 27 wherein a mechanical shutter 2601 is in the optical path.

Figure 28:
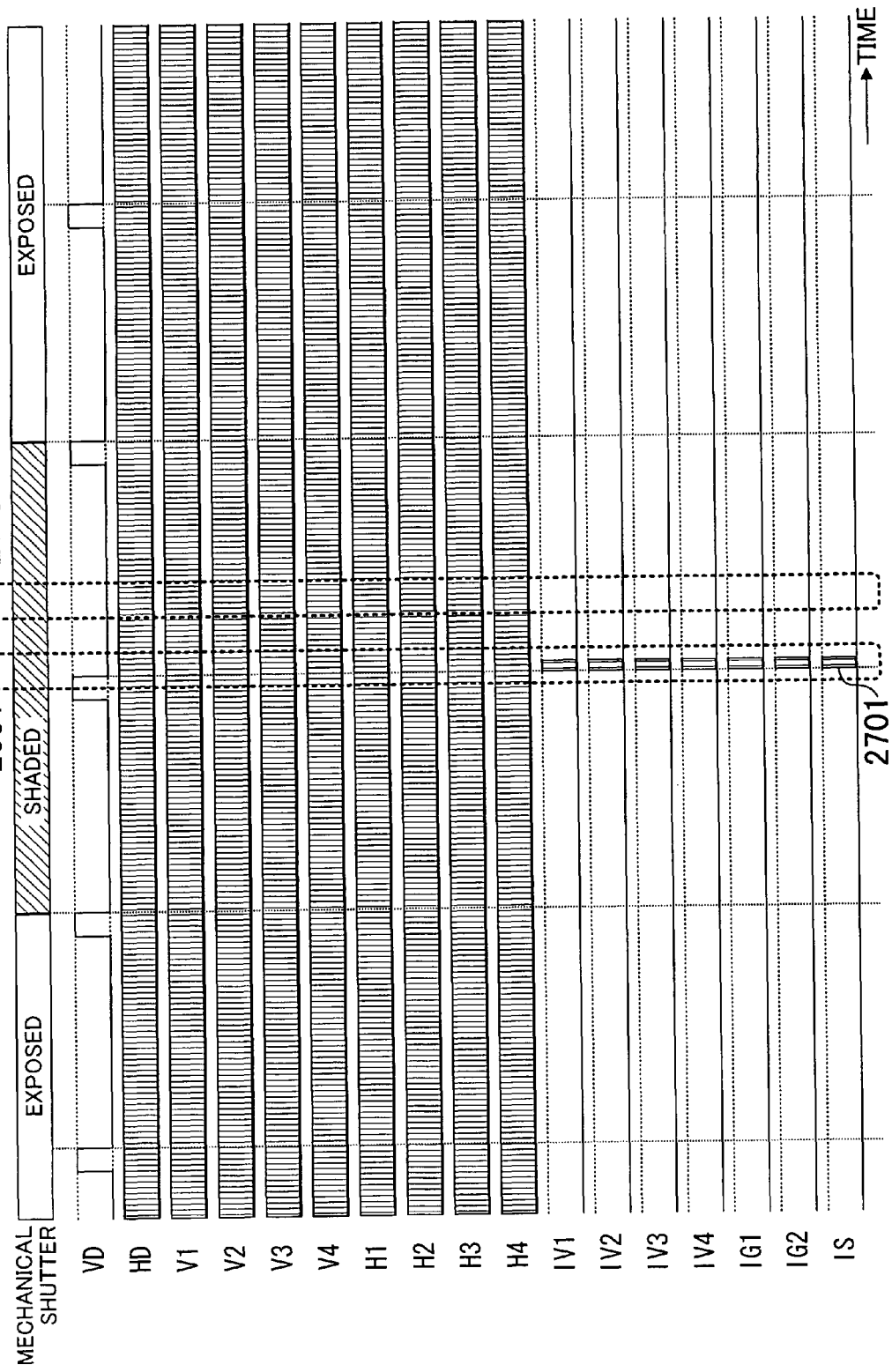
FIG. 28 shows the waveforms of image sensor driving pulses at the vertical blanking interval rate according to embodiment 3 of the present invention.

FIG. 28 is a timing chart illustrating vertical synchronization signal VD and horizontal synchronization signal HD at the vertical blanking interval rate, the pulses for driving the image sensor 103 and the analog circuit 104, and the operation state (open/closed) of the mechanical shutter 2601. It should be noted that the pulses other than signal VD have very short cycles as compared with signal VD and are therefore schematically illustrated in the form of rectangular lattices in FIG. 28.

According to this embodiment, optimization of the driving pulses is carried out in a vertical blanking interval which occurs after a frame of image data has been retrieved with the image sensor 103 shaded from light as illustrated in part 2701 of FIG. 28.

With such an optimization arrangement, optimization of the driving pulses can be achieved with high accuracy without being affected by smear components, blooming, etc., on the vertical transfer sections 302.

In this case, part of the image data to be displayed on a display device which corresponds to two vertical blanking intervals is lost. Therefore, preferably, the memory control circuit 106 retrieves part of the image data stored in the SDRAM 107 which corresponds to two vertical blanking intervals immediately before the shaded state and outputs the retrieved data as pseudo successive data.

Although in the above-described example of this embodiment the optimization is carried out in a completely shaded state, the optimization may be carried out after the mechanical shutter 2601 is half-closed to have a smaller aperture such that the amount of light entering the image sensor 103 is sufficiently reduced. In this case, low-level image data enters the image sensor 103 instead of the complete loss of the image data by complete shading. Therefore, in the case where an image signal corresponding to this interval is output, the level decreased by the half-closed mechanical shutter 2601 is preferably corrected by the analog circuit 104, the YC process circuit 108, or the like.

[4] Embodiment 4

An electronic still camera according to embodiment 4 of the present invention is now described. The electronic still camera of this embodiment has substantially the same structure as the electronic still camera 117 of embodiment 1 except that the driving pulses are optimized at different timings. Hereinafter, the focus of the descriptions is this difference.

Figure 29:
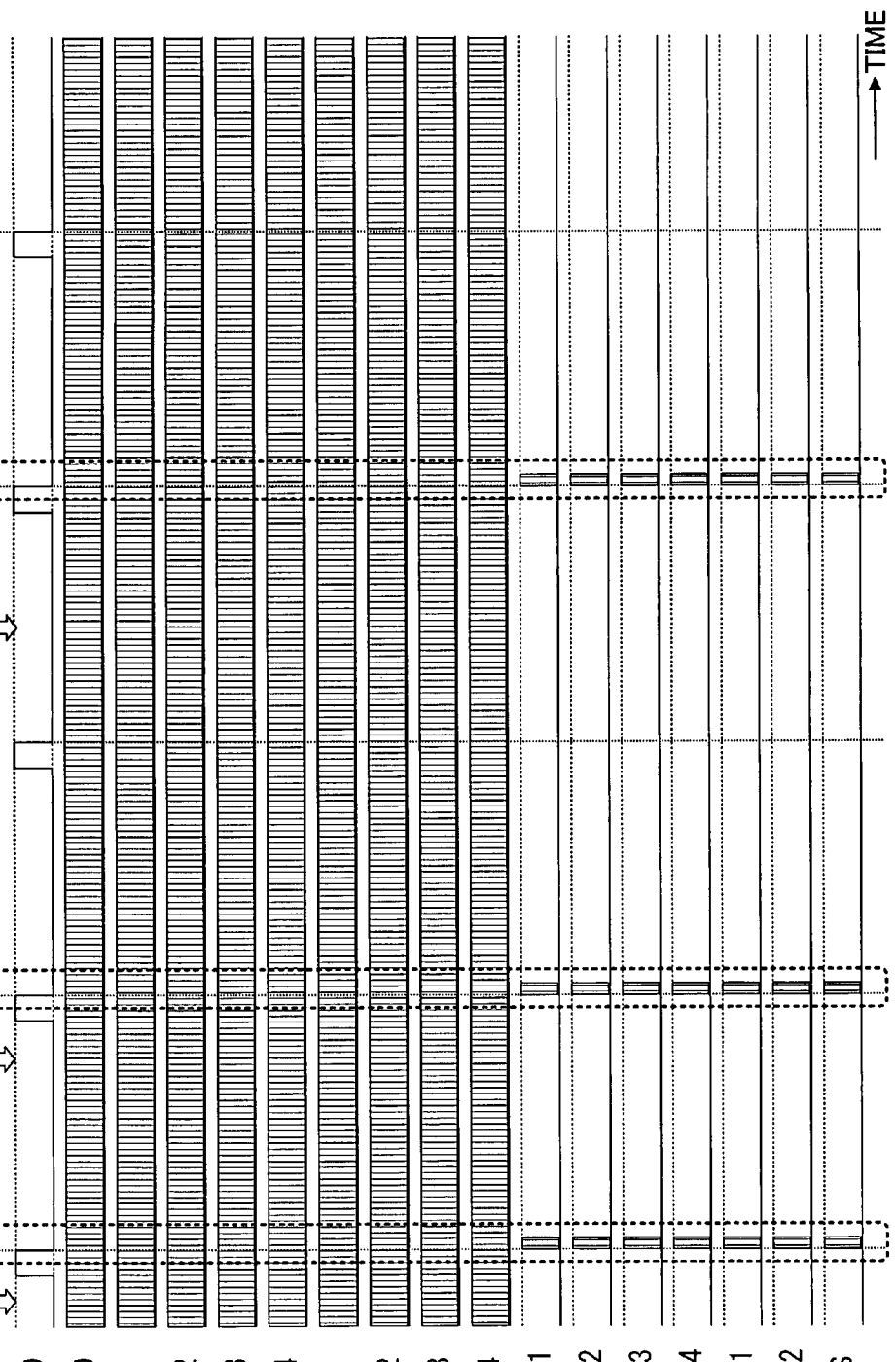
FIG. 29 shows the waveforms of image sensor driving pulses at the vertical blanking interval rate according to embodiment 4 of the present invention.

FIG. 29 is a timing chart illustrating vertical synchronization signal VD and horizontal synchronization signal HD at the vertical blanking interval rate and the pulses for driving the image sensor 103 and the analog circuit 104. It should be noted that the pulses other than signal VD have very short cycles as compared with signal VD and are therefore schematically illustrated in the form of rectangular lattices in FIG. 29.

Although in embodiment 1 optimization of the driving pulses is carried out at every vertical blanking interval, optimization of the driving pulses in this embodiment is carried out according to an optimization command issued by the CPU 113 to the pulse adjustment arithmetic circuit 112 as illustrated in part 2801 of FIG. 29.

This optimization arrangement enables the optimization to be carried out only at a necessary timing, e.g., when the image sensor 103 is replaced. Accordingly, the power consumption can be reduced.

[5] Embodiment 5

An electronic still camera according to embodiment 5 of the present invention is now described. The electronic still camera of this embodiment has substantially the same structure as the electronic still camera 117 of embodiment 1 except that the driving pulses are optimized through a different optimization procedure. Hereinafter, the focus of the descriptions is this difference.

Figure 30:
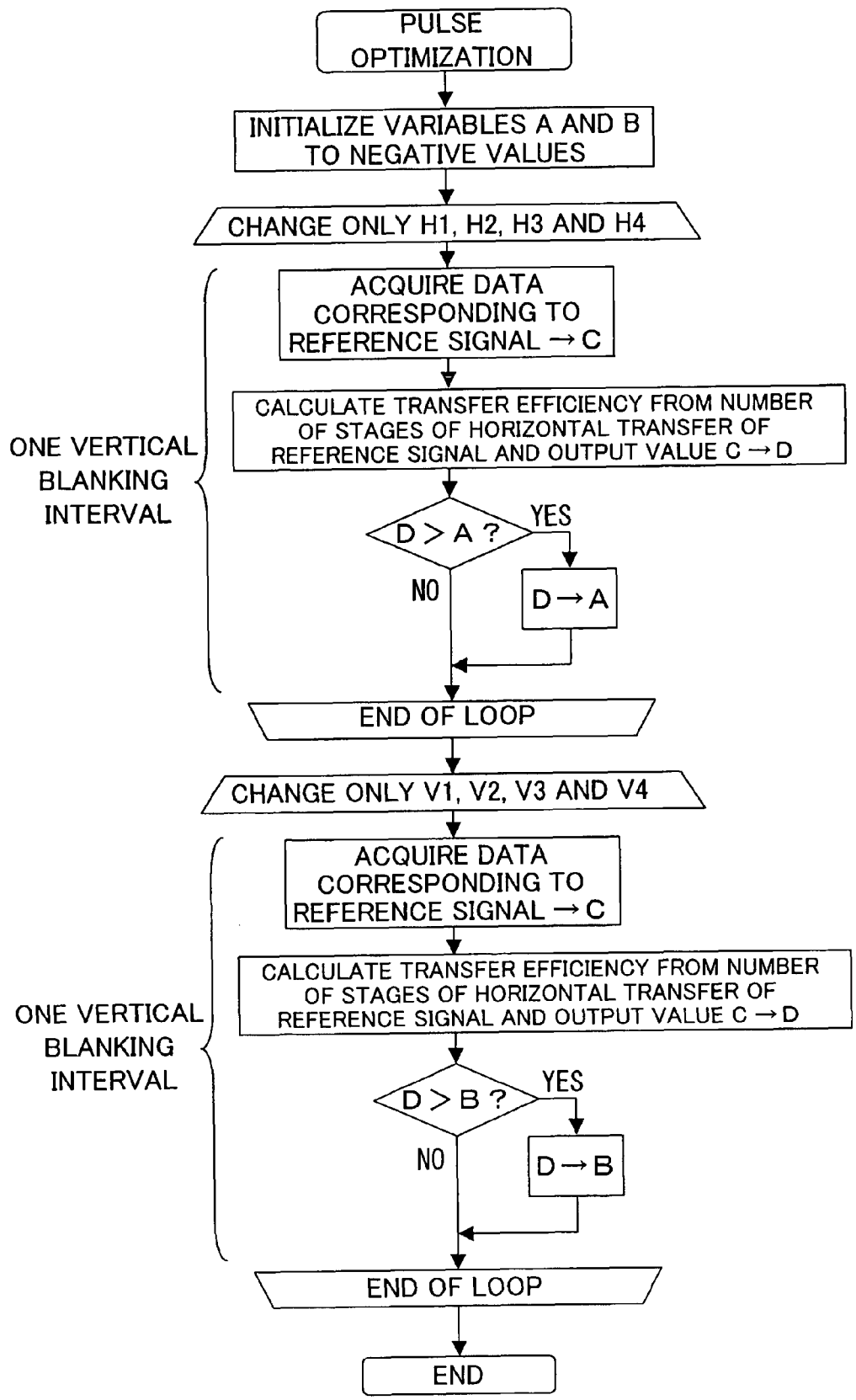
FIG. 30 is a flowchart illustrating the procedure of a pulse optimization process according to embodiment 5 of the present invention.

The optimization procedure of this embodiment is as illustrated in the flowchart of FIG. 30:

(a) Change all the timings and phases of signals H1, H2, H3 and H4 within allowable ranges to acquire a digital value corresponding to the reference charge for each preset value;
(b) Calculate the transfer efficiency from the number of stages over which the reference charge is horizontally transferred and the digital value corresponding to the reference charge;
(c) Select one of the preset values with which the transfer efficiency is maximized for horizontal transfer;
(d) Change all the timings and phases of signals V1, V2, V3, and V4 within allowable ranges to acquire a digital value corresponding to the reference charge for each preset value;
(e) Calculate the transfer efficiency from the number of stages over which the reference charge is vertically transferred and the digital value corresponding to the reference charge; and
(f) Select one of the preset values with which the transfer efficiency is maximized for vertical transfer.

This procedure enables detection of deterioration in transfer efficiency which can occur when signals V1, V2, V3, and V4 relevant to vertical transfer and signals H1, H2, H3 and H4 relevant to horizontal transfer have unpreferable timings. Thus, optimization of the driving pulses can be achieved in the same way as embodiment 1.

With such an optimization procedure, the optimization rate can be backcalculated from the transfer efficiency. Therefore, it is possible to interrupt the loop of the optimization process at a time point when the optimization rate exceeds a predetermined level. Thus, the redundant optimization loop can be reduced.

It should be noted that although in this embodiment the driving pulses relevant to horizontal transfer are optimized before the driving pulses relevant to vertical transfer are optimized, the opposite order of optimization may be employed.

Further, the vertical and horizontal pulses may be optimized alternately or in an indefinite order.

To shorten the optimization period, only the driving pulses relevant to vertical transfer or only the driving pulses relevant to horizontal transfer may be optimized.

[6] Embodiment 6

An electronic still camera according to embodiment 6 of the present invention is now described. The electronic still camera of this embodiment has substantially the same structure as the electronic still camera 117 of embodiment 1 except that the electronic still camera of embodiment 6 has a difference in the structure for generating reference charge which is provided on the image sensor 103. Hereinafter, the focus of the descriptions is this difference.

Figure 31:
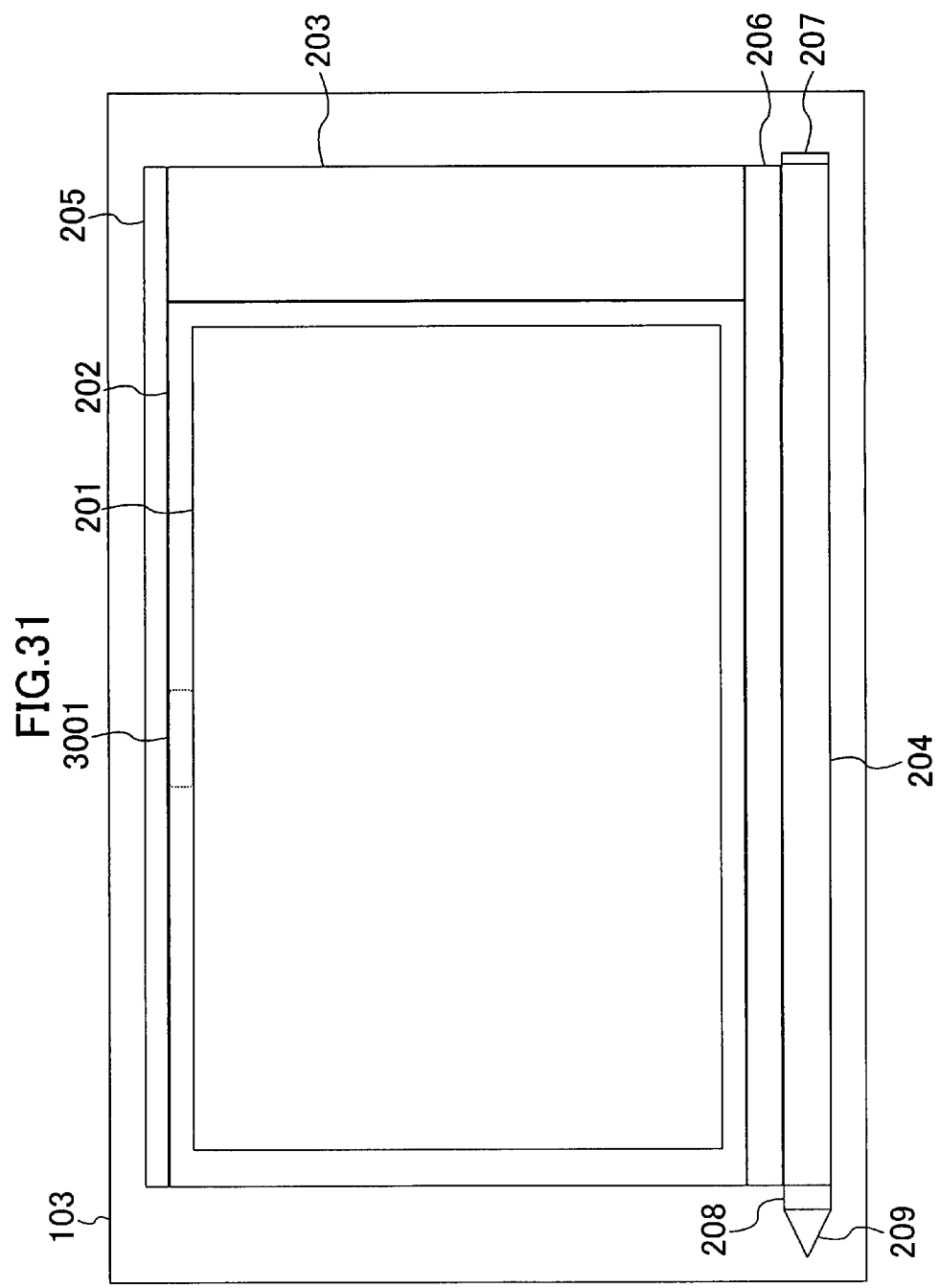
FIG. 31 is a plan view showing an image sensor according to embodiment 6 of the present invention.
Figure 32:
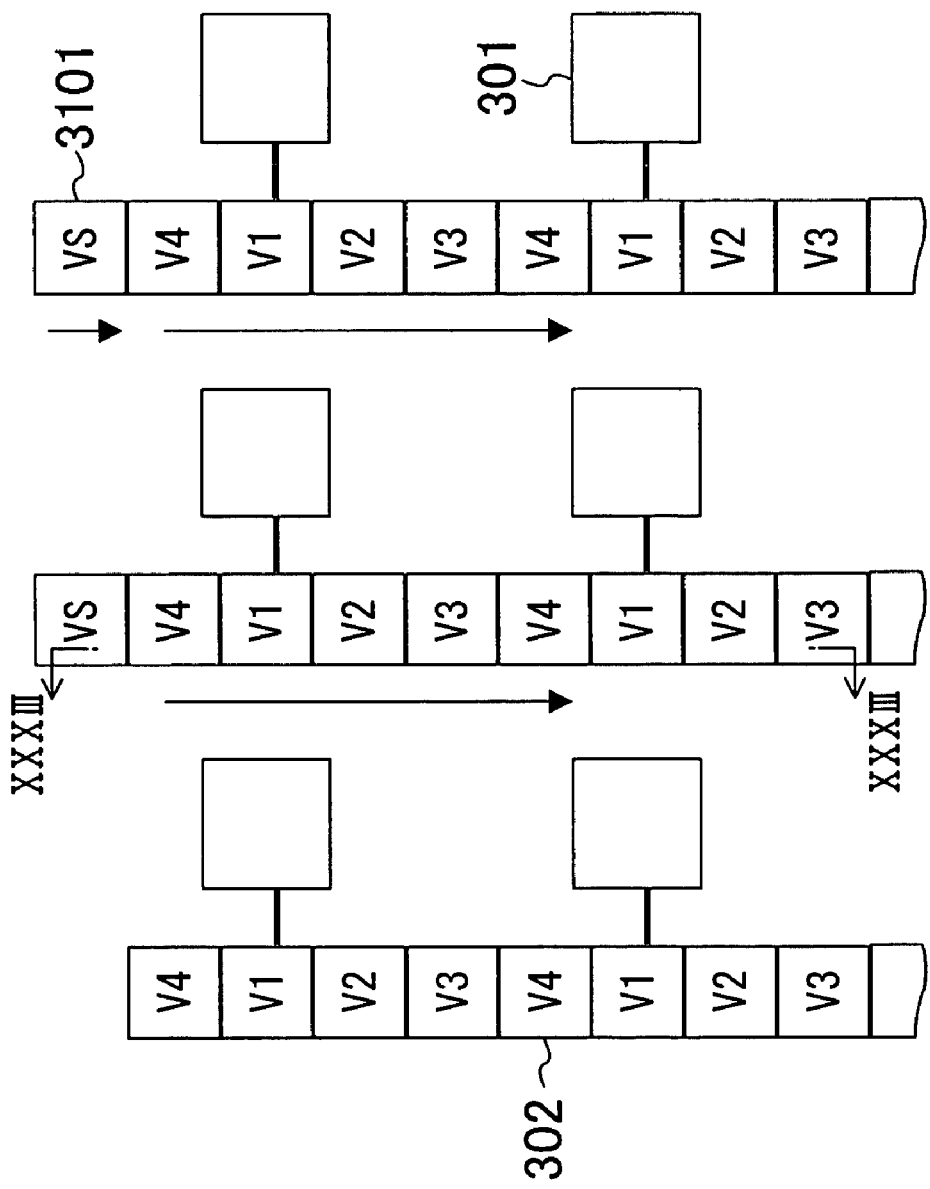
FIG. 32 is an enlarged plan view of a reference signal generator of the image sensor according to embodiment 6 of the present invention.

The image sensor 103 of this embodiment has the structure as shown in FIG. 31. FIG. 32 is the enlarged illustration of a reference signal generator 3001 shown in FIG. 31.

As shown in FIG. 32, a vertical transfer section 302 includes a reference charge generator 3101, from which reference charge is output to the vertical transfer sections 302.

Figure 33:
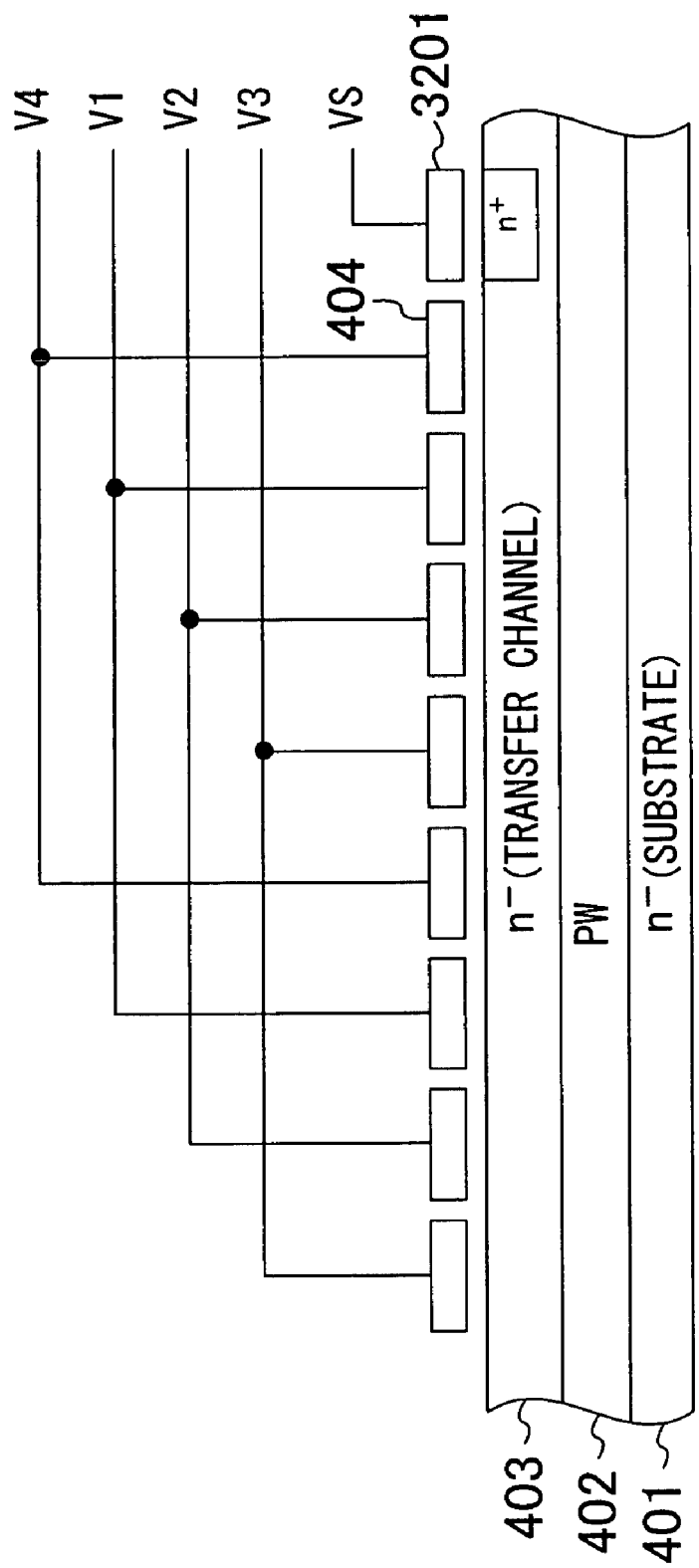
FIG. 33 is a cross-sectional view of a reference signal generator of the image sensor according to embodiment 6 of the present invention taken along line XXXIII-XXXIII of FIG. 32.

FIG. 33 is a partial cross-sectional view of the reference charge generator 3101 and the vertical transfer sections 302 taken along line XXXIII-XXXIII of FIG. 32. In addition to the components of the vertical transfer sections 302, the reference charge generator 3101 includes an N+-type diffusion layer which is connected to a corresponding electrode (VS) 3201.

Figure 34:
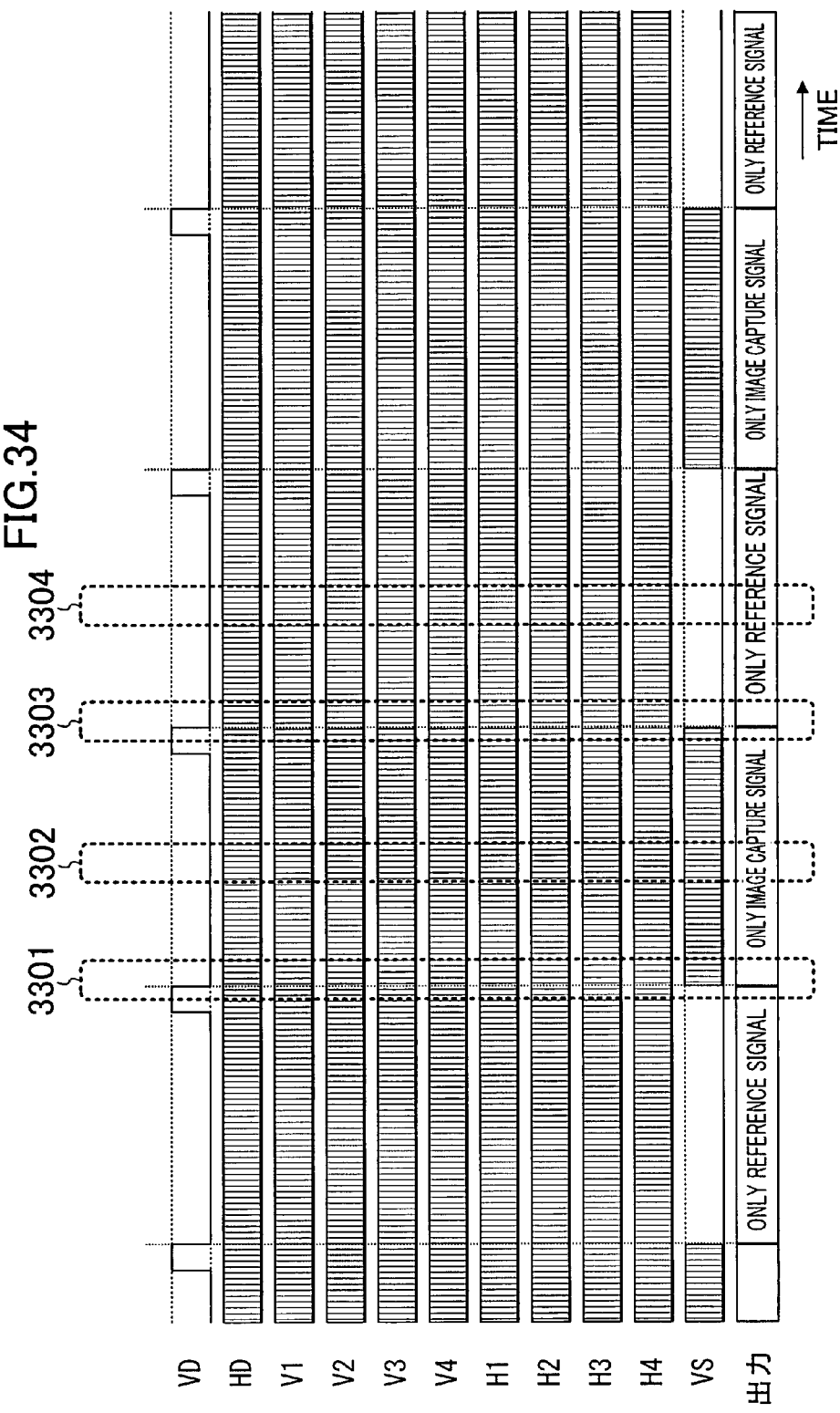
FIG. 34 shows the waveforms of image sensor driving pulses at the vertical blanking interval rate according to embodiment 6 of the present invention.

FIG. 34 is a timing chart illustrating vertical synchronization signal VD and horizontal synchronization signal HD at the vertical blanking interval rate and the pulses for driving the image sensor 103 and the analog circuit 104. It should be noted that the pulses other than signal VD have very short cycles as compared with signal VD and are therefore schematically illustrated in the form of rectangular lattices in FIG. 34.

In this embodiment, an image capture signal and a reference signal are output alternately at every vertical blanking interval.

Figure 35:
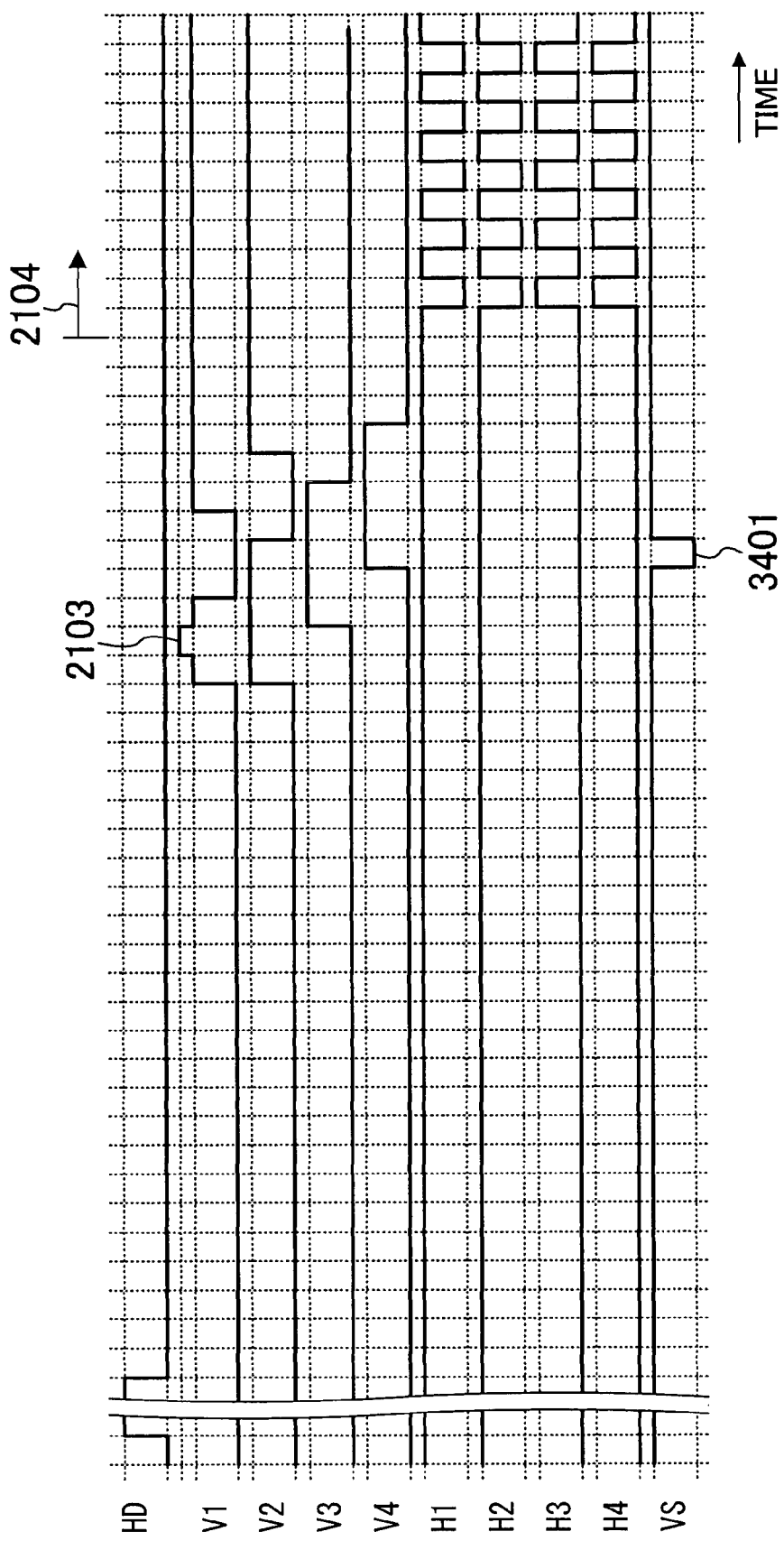
FIG. 35 shows the waveforms of image sensor driving pulses at the horizontal blanking interval rate, including retrieval of charges from the photoelectric converters, according to embodiment 6 of the present invention.

FIG. 35 is the enlarged illustration at the horizontal blanking interval rate of the first retrieval part 3301 of a vertical blanking interval in which only the image capture signal is output. At period 2103 of FIG. 35, the image capture signals accumulated in the photoelectric converters 301 are retrieved to the vertical transfer sections 302. Then, signals V1, V2, V3 and V4 are changed until period 3401 so that transfer by one stage of the vertical transfer section 302 is achieved. Thereafter, the voltage applied to the electrode (VS) 3201 decreases to a predetermined level, so that a predetermined reference charge is generated in the reference charge generator 3101 and transferred to the adjacent electrode V4 of the vertical transfer section 302. Then, the charge is transferred over three stages of the vertical transfer section 302, and thereafter, pulses H1, H2, H3 and H4 for horizontal transfer are applied to the horizontal transfer section 303.

Figure 36:
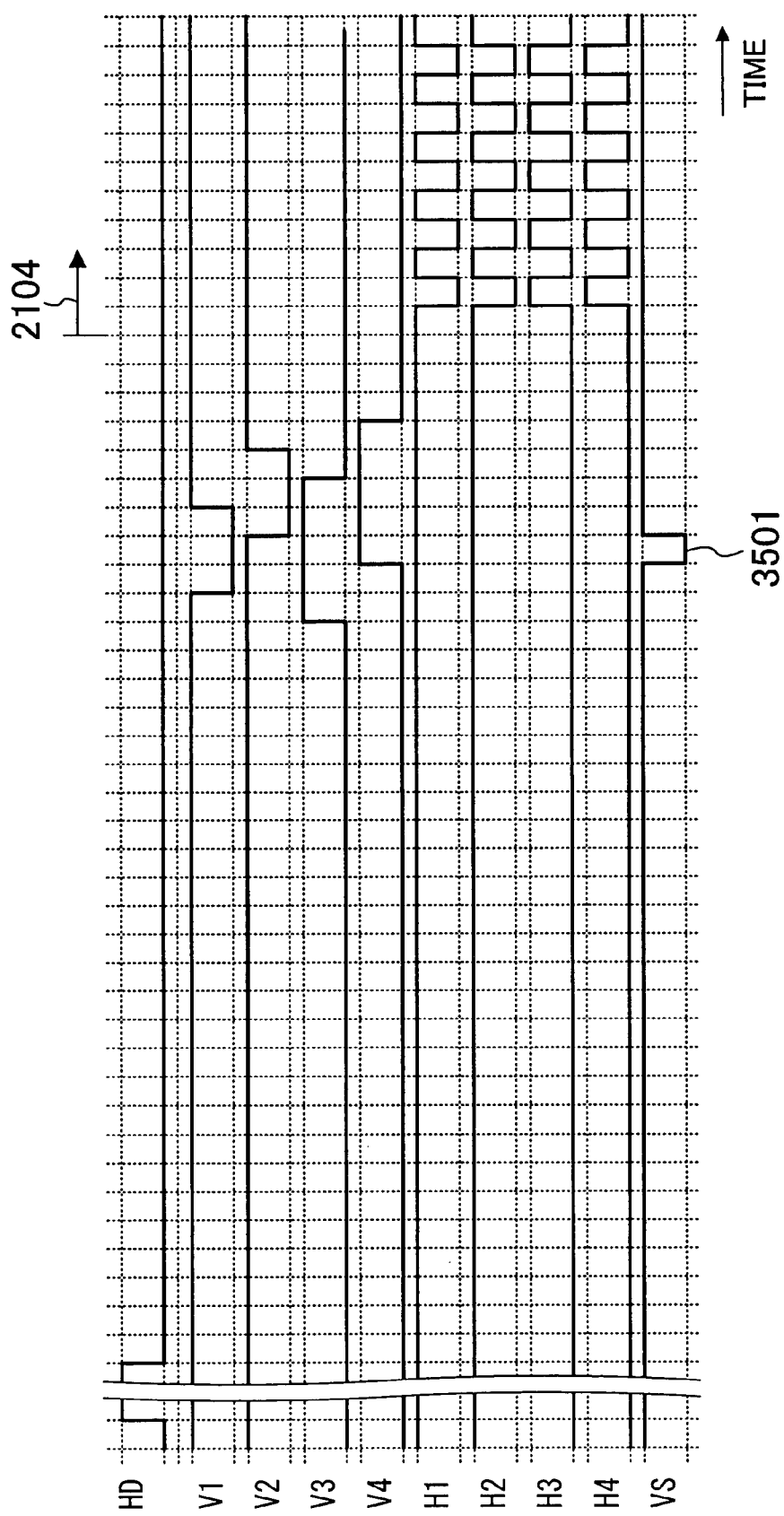
FIG. 36 shows the waveforms of image sensor driving pulses at the horizontal blanking interval rate, not including retrieval of charges from the photoelectric converters, according to embodiment 6 of the present invention.

FIG. 36 is the enlarged illustration at the horizontal blanking interval rate of part 3302 of the vertical blanking interval other than the first retrieval part 3301 in which only the image capture signal is output. Part 3302 of FIG. 36 is different from the first retrieval part 3301 of FIG. 35 in that, although signal charge is retrieved from the photoelectric converter 301 to the vertical transfer section 302 according to pulse 2103 in FIG. 35, FIG. 36 does not include this retrieval operation. It should be noted that reference numeral 3501 refers to a reference charge generation pulse.

Application of the driving pulses shown in FIG. 35 and FIG. 36 enables, in the present vertical blanking interval, retrieval of the signal charge of light which has reached the image sensor 103 in the immediately previous vertical blanking interval. Meanwhile, a pulse is applied to the electrode (VS) 3201 at every horizontal blanking interval, so that all the signal charges on the photoelectric converters 301 are retrieved. As a result, the reference charge is accumulated on the vertical transfer sections 302.

Figure 37:
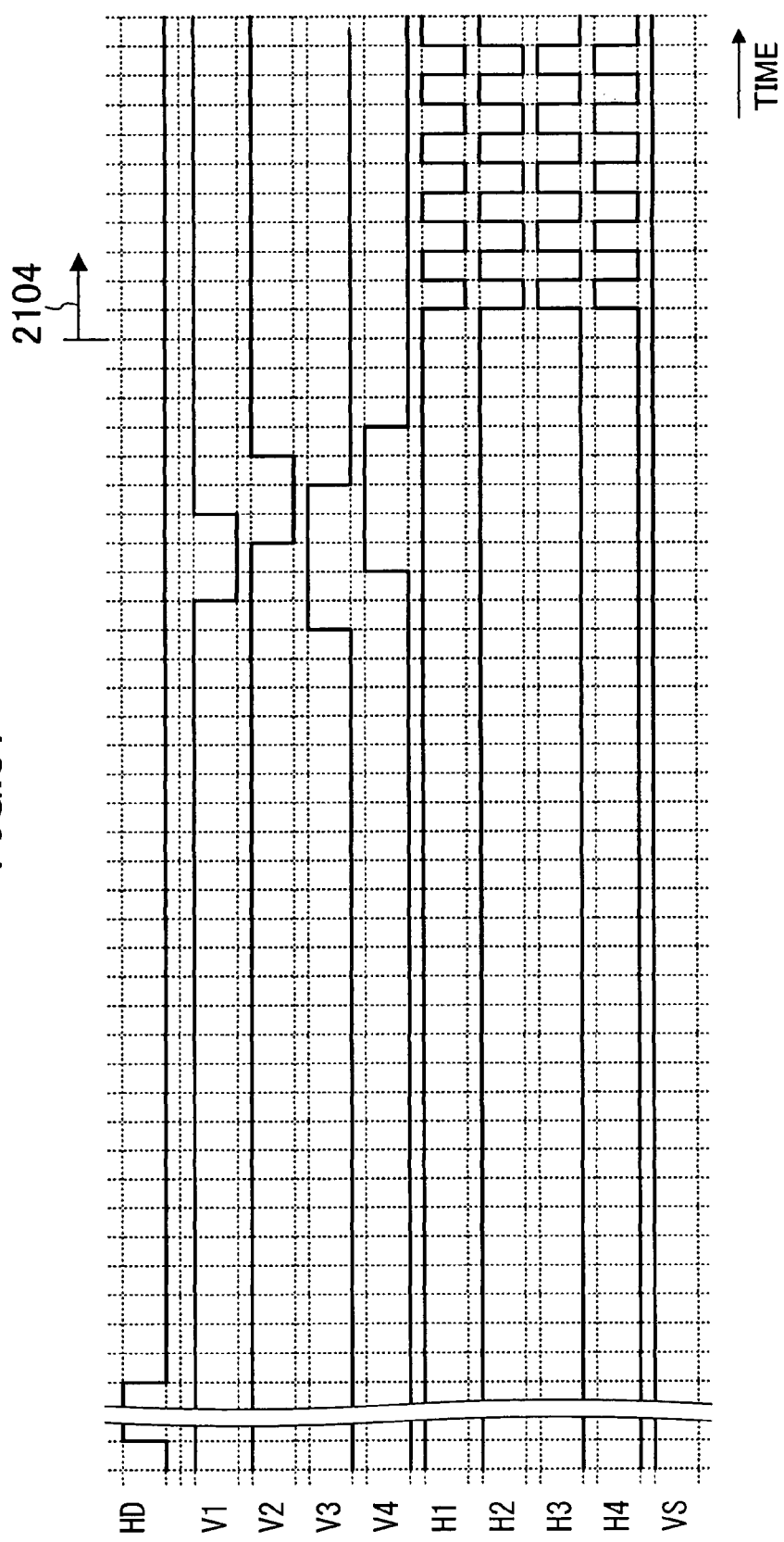
FIG. 37 shows the waveforms of image sensor driving pulses at the horizontal blanking interval rate, not including retrieval of charges from the photoelectric converters, according to embodiment 6 of the present invention.

FIG. 37 is the enlarged illustration at the horizontal blanking interval rate of the first retrieval part 3303 of a vertical blanking interval in which only the reference signal is output. As shown in FIG. 37, no signal charge is retrieved from the photoelectric converters 301 according to pulse 2103, only horizontal transfer of the horizontal transfer section 303 is carried out after vertical transfer of the vertical transfer sections 302. As a result, in the immediately previous vertical blanking period, only the reference charge accumulated in the vertical transfer sections 302 can be retrieved from the image sensor 103. Part 3304 is also subjected to the process illustrated in FIG. 37 as is part 3303.

The above-described operations enable sole output of the reference signal and sole output of the image capture signal at every vertical blanking interval.

With the above features, more reference charge can be utilized. Therefore, the resistance against the effects of noise mixed in the reference charge can be improved.

Although not specifically described in this embodiment, for the purpose of increasing the sensitivity, the image capture signals accumulated in the photoelectric converters 301 during a vertical blanking interval in which only image capture signals are retrieved may be retained there without being abandoned by using an electronic shutter, or the like, until the next vertical blanking interval in which subsequent image capture signals are read. Alternatively, such image capture signals may be abandoned in consideration of higher priority given to motion resolution.

Although in the above-described example of this embodiment vertical blanking intervals in which only image capture signals are retrieved and vertical blanking intervals in which only reference signals are retrieved alternatively occur, these intervals may occur in an indefinite order.

The reference charge generator 3101 is at the most distant position from the horizontal transfer section 303 in the above-described example of this embodiment but may be provided at a position near the horizontal transfer section 303. Specifically, the reference charge generator 3101 may be preferably provided at a position of 90° relative to the transfer direction in a vertical transfer section 302 in the vicinity of the horizontal transfer section 303.

[7] Embodiment 7

An electronic still camera according to embodiment 7 of the present invention is now described. The electronic still camera of this embodiment has substantially the same structure as the electronic still camera 117 of embodiment 1 except that the electronic still camera of embodiment 7 has a difference in the structure for generating reference charge which is provided on the image sensor 103. Hereinafter, the focus of the descriptions is this difference.

Figure 38:
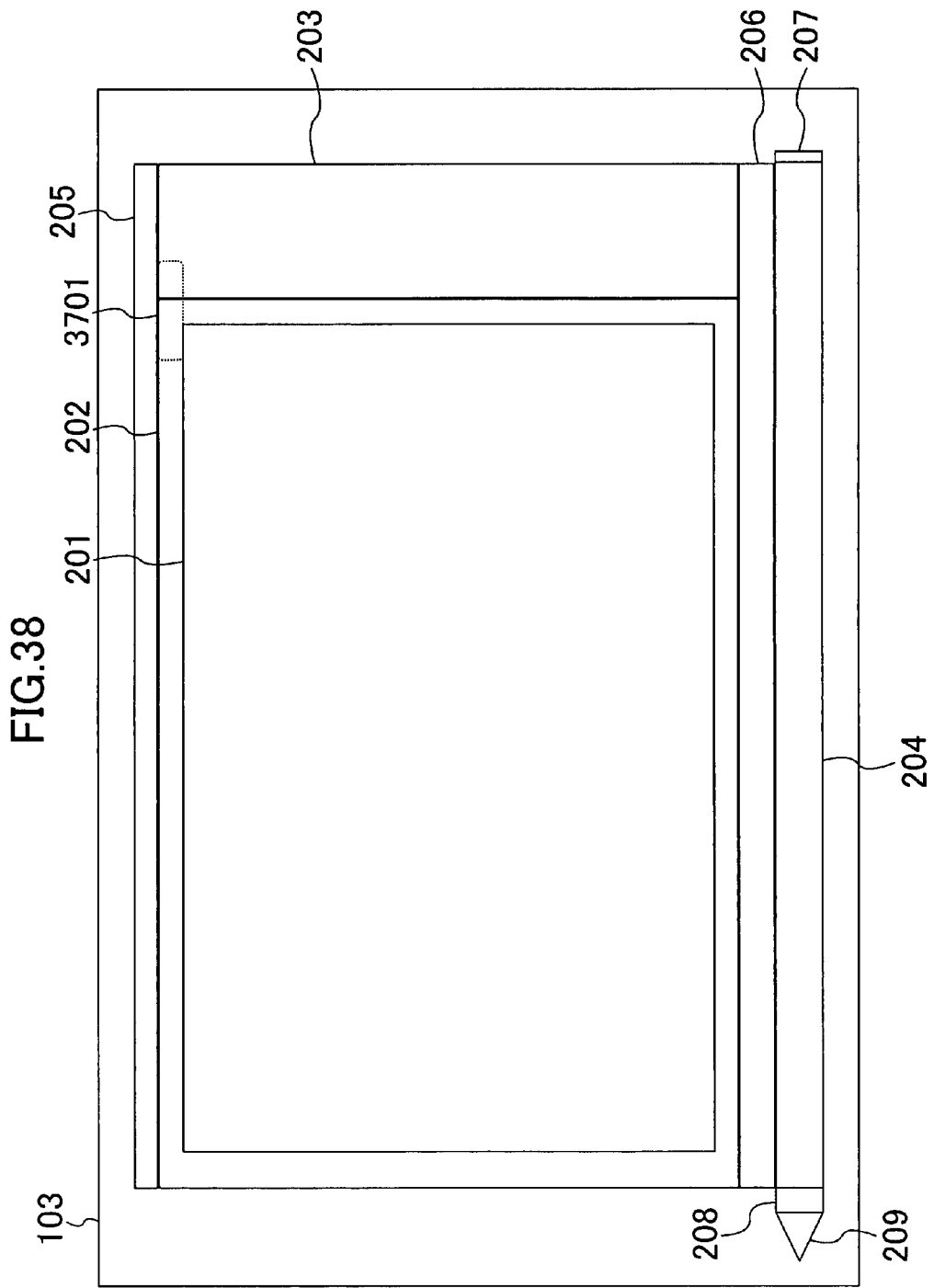
FIG. 38 is a plan view showing an image sensor according to embodiment 7 of the present invention.
Figure 39:
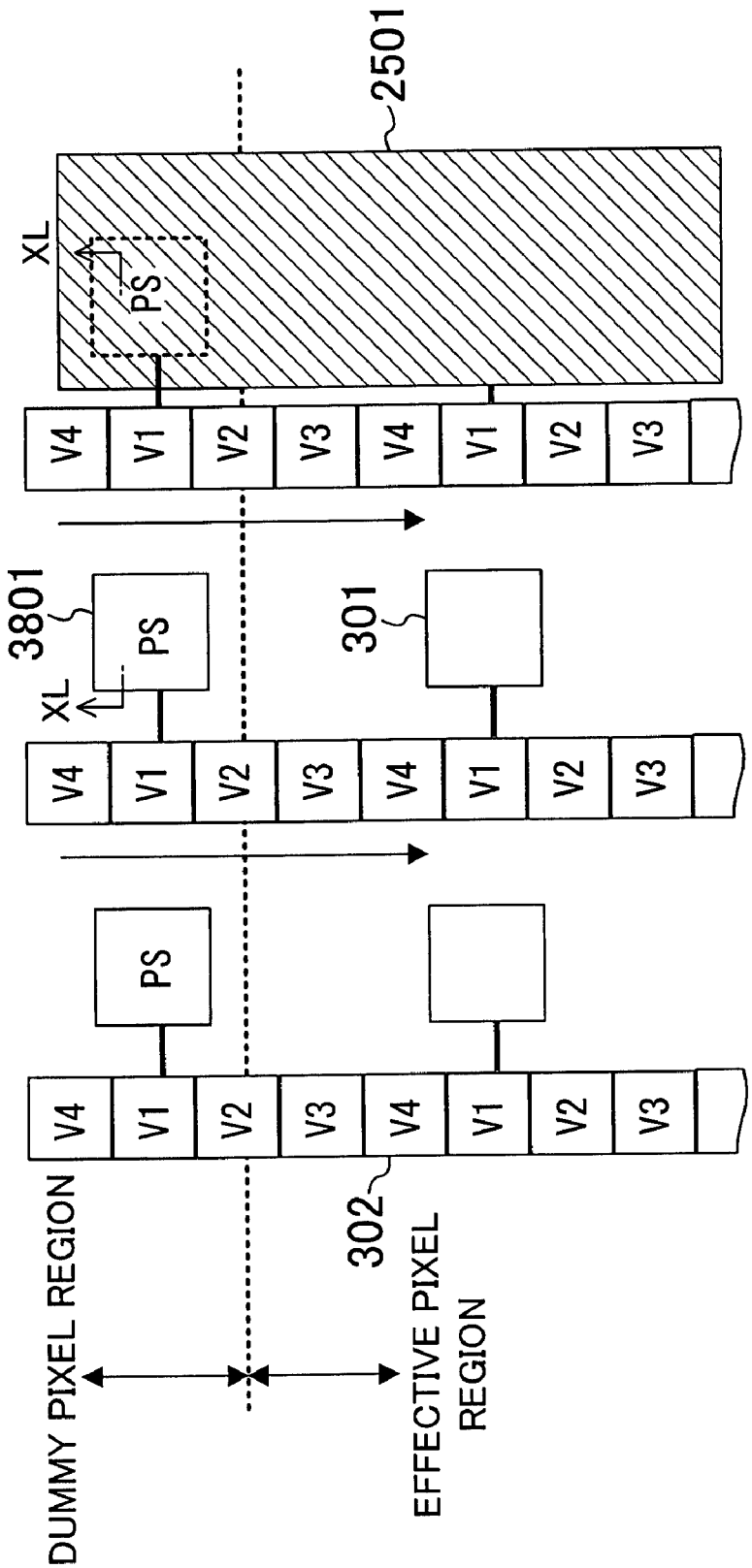
FIG. 39 is an enlarged plan view of a reference signal generator of the image sensor according to embodiment 7 of the present invention.

The image sensor 103 of this embodiment has the structure as shown in FIG. 38. FIG. 39 is the enlarged illustration of a reference signal generator 3701 shown in FIG. 38.

As shown in FIG. 39, the photoelectric converters 301 include reference charge generators 3801, from which reference charge is output to the vertical transfer sections 302 in synchronization with a retrieval signal. Some of the photoelectric converters 301 including the reference charge generators 3801 are covered with an aluminum light blocking film 2501 such that light does not reach the photoelectric converters 301.

Figure 40:
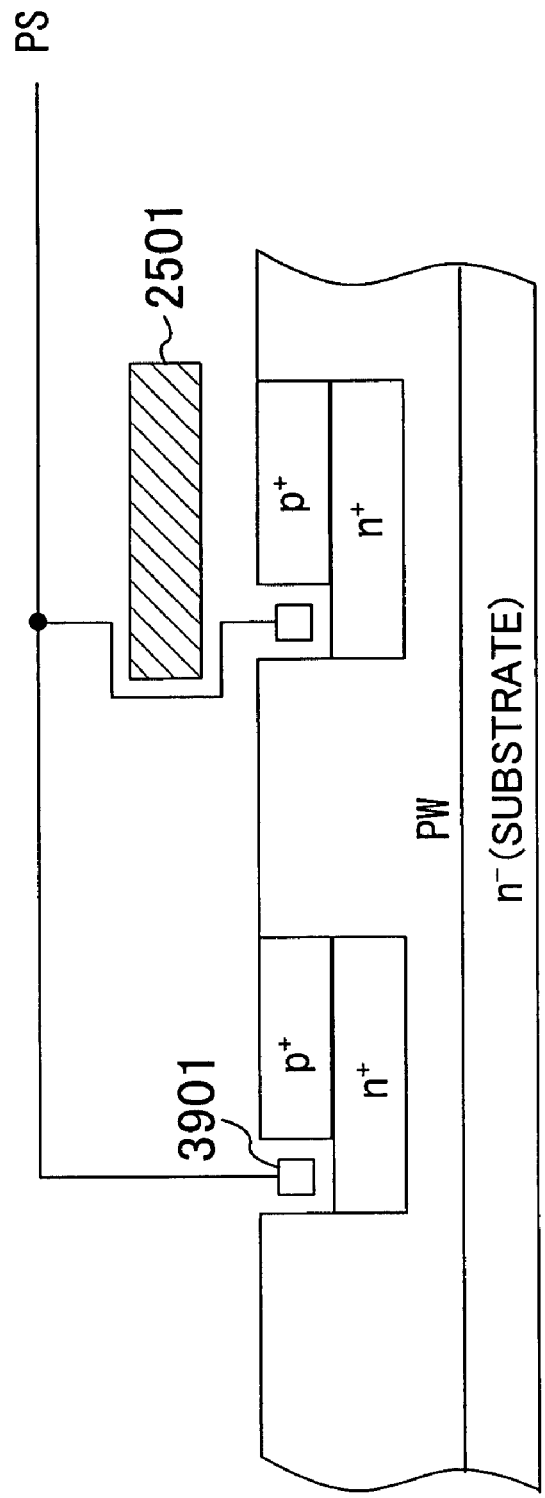
FIG. 40 is a cross-sectional view of a reference signal generator of the image sensor according to embodiment 7 of the present invention taken along line XL-XL of FIG. 39.

FIG. 40 is a partial cross-sectional view of the reference charge generators 3801 taken along line XL-XL of FIG. 39. The reference charge generator 3801 includes an electrode (PS) 3901 corresponding to an $N^+$-type diffusion layer in addition to the components of the photoelectric converters 301. It should be noted that the vertical transfer sections 302 are not shown in this cross-sectional view.

Figure 41:
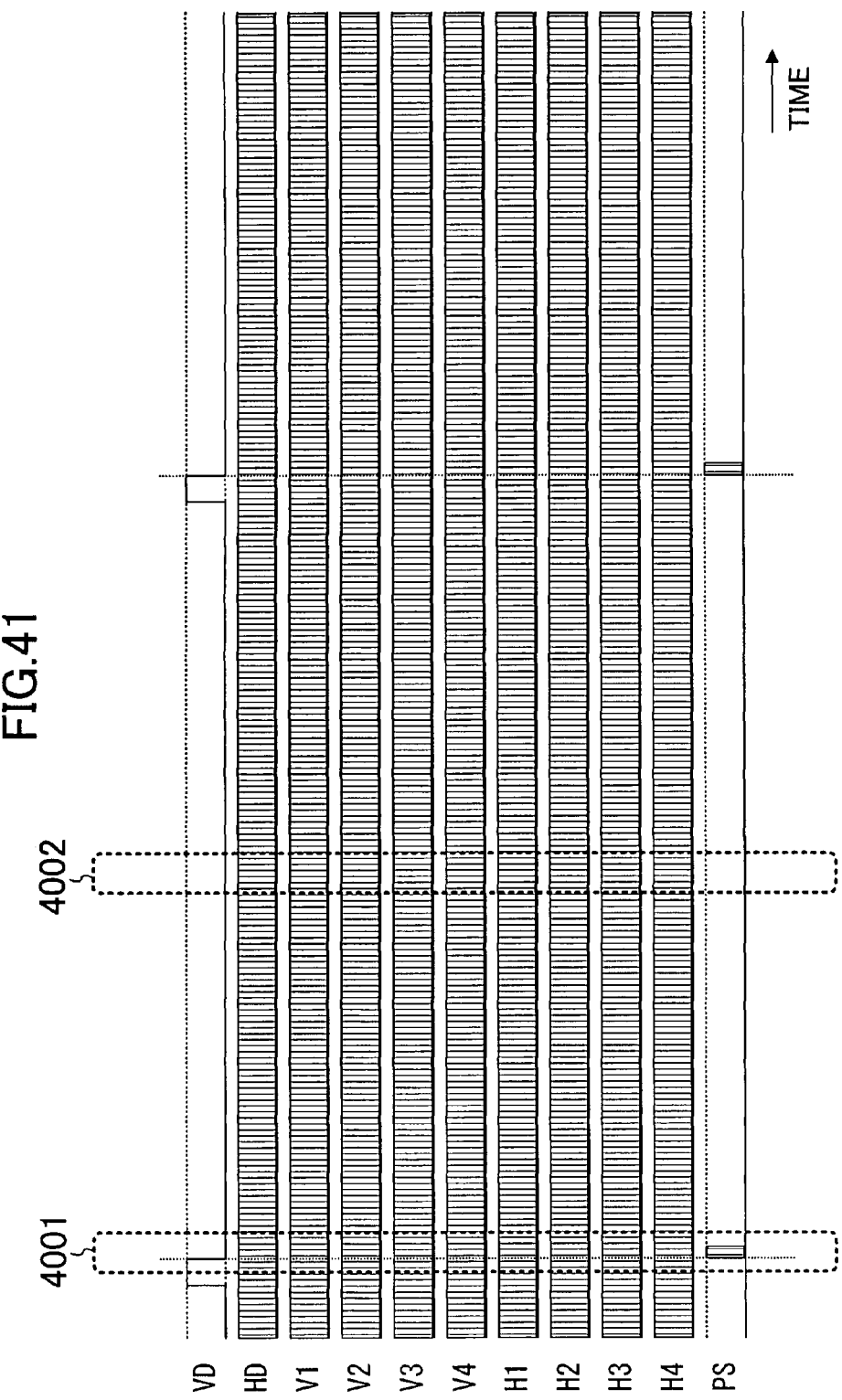
FIG. 41 shows the waveforms of image sensor driving pulses at the vertical blanking interval rate according to embodiment 7 of the present invention.

FIG. 41 is a timing chart illustrating vertical synchronization signal VD and horizontal synchronization signal HD at the vertical blanking interval rate and the pulses for driving the image sensor 103 and the analog circuit 104. It should be noted that the pulses other than signal VD have very short cycles as compared with signal VD and are therefore schematically illustrated in the form of rectangular lattices in FIG. 41.

Figure 42:
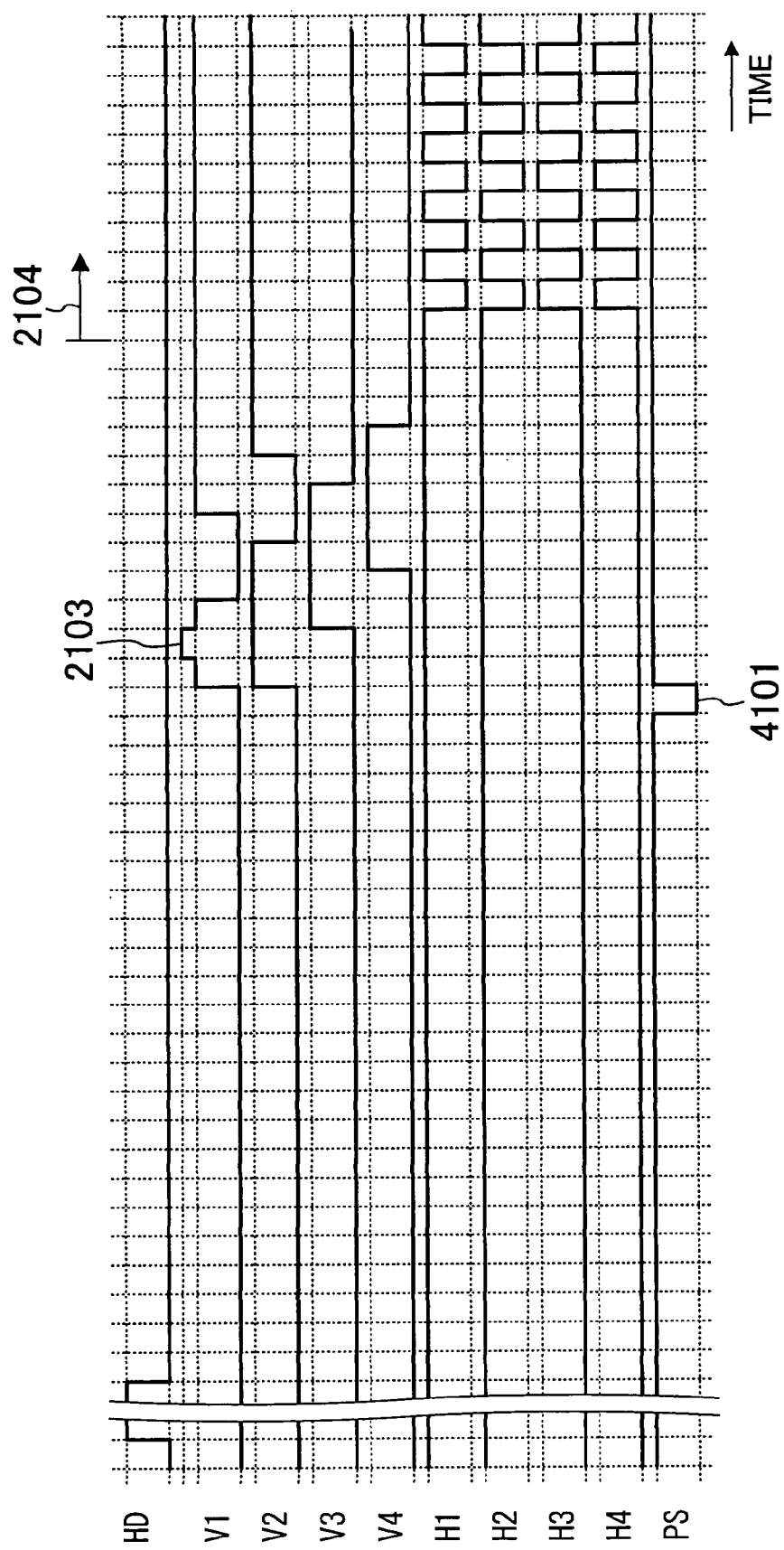
FIG. 42 shows the waveforms of image sensor driving pulses at the horizontal blanking interval rate, including retrieval of charges from the photoelectric converters, according to embodiment 7 of the present invention.

FIG. 42 is the enlarged illustration at the horizontal blanking interval rate of the first retrieval part 4001 of a vertical blanking interval. At period 4101 of FIG. 42, the voltage applied to the electrode (PS) 3901 decreases to a predetermined level, so that predetermined signal charge is accumulated only in the photoelectric converter 301 to which the electrode (PS) 3901 is connected. Then, at period 2103 of FIG. 42, the image capture signal accumulated in the photoelectric converters 301 is retrieved to the vertical transfer sections 302. Then, the charge is transferred over four stages of the vertical transfer section 302, and thereafter, pulses H1, H2, H3 and H4 for horizontal transfer are applied to the horizontal transfer section 303.

Figure 43:
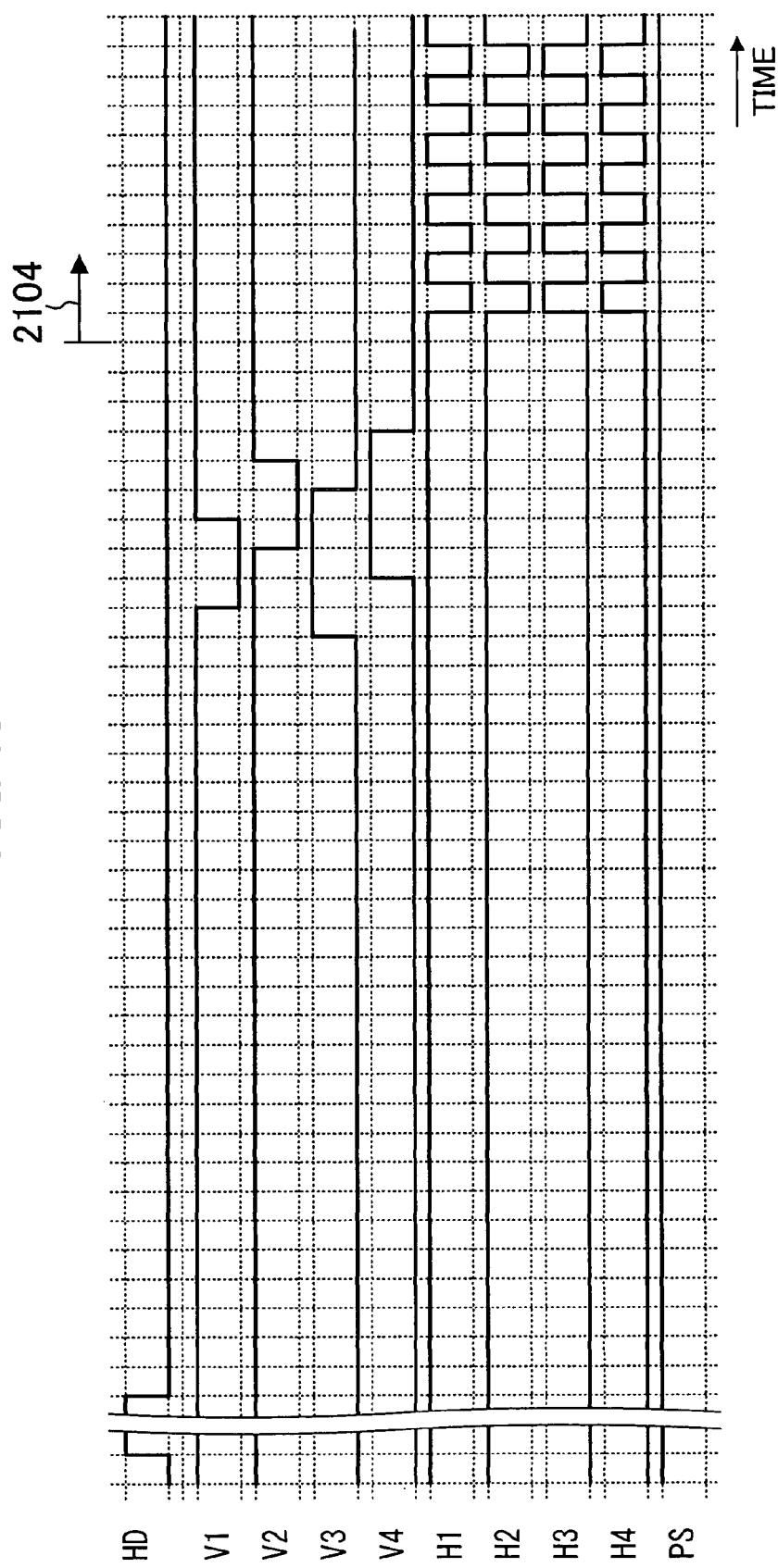
FIG. 43 shows the waveforms of image sensor driving pulses at the horizontal blanking interval rate, not including retrieval of charges from the photoelectric converters, according to embodiment 7 of the present invention.

FIG. 43 is the enlarged illustration at the horizontal blanking interval rate of part 4002 of the vertical blanking interval other than the first retrieval part 4001. Part 4002 of FIG. 43 is different from the first retrieval part 4001 of FIG. 42 in that, although signal charge is retrieved from the photoelectric converter 301 to the vertical transfer section 302 according to pulse 2103 in FIG. 42, FIG. 43 does not include this retrieval operation.

Application of the driving pulses shown in FIG. 42 and FIG. 43 enables, in the present vertical blanking interval, retrieval of the signal charge of light which has reached the image sensor 103 in the immediately previous vertical blanking interval and retrieval of the reference charge produced by application of a pulse to the electrode (PS) 3901.

The above-described operations enable output of the reference signal and image capture signal at every vertical blanking interval.

With the above features, the reference charge corresponding to the saturation level of the photoelectric converters 301 can be generated. Therefore, pulses can be optimized according to the behavior of an actual image capture signal.

Although in this embodiment the reference charge generator 3801 is provided in respective one of a shaded photoelectric converter 301 and a dummy, unshaded photoelectric converter 301, the reference charge generator 3801 may be provided in any of these converters 301. Alternatively, more than one reference charge generators 3801 may be provided.

Reset operation may be performed in the reference charge generator 3801 by periodically applying a predetermined voltage to the electrode (PS) 3901 in order to prevent excessive charge generated by a dark current from affecting the vertical transfer sections 302 even when the reference charge is not generated for a long period of time or even immediately after startup of the image sensor 103.

Although the above-described example of this embodiment uses only one type of electrodes (PS) 3901, different types of electrodes may be used such that each of them can be independently set to a predetermined voltage. Alternatively, one type of electrodes may be used such that the voltages set on a time series basis can be changed.

When use at a high temperature is under consideration, the above-described reset operation may be carried out periodically or according to an externally-input reset command.

[8] Embodiment 8

An electronic still camera according to embodiment 8 of the present invention is now described. The electronic still camera of this embodiment has substantially the same structure as the electronic still camera 117 of embodiment 1 except that the electronic still camera of embodiment 8 has a difference in the structure for generating reference charge which is provided on the image sensor 103. Hereinafter, the focus of the descriptions is this difference.

Figure 44:
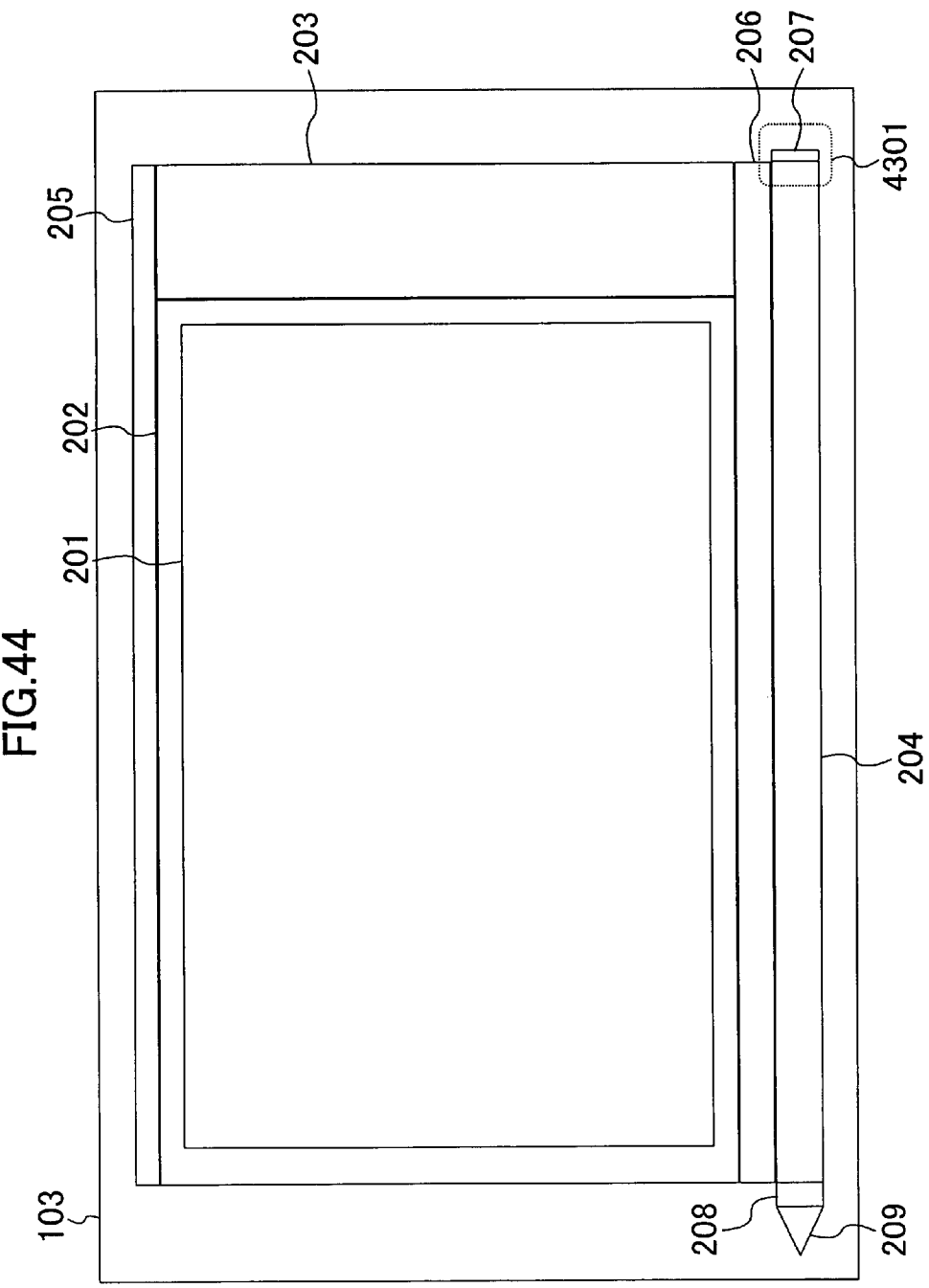
FIG. 44 is a plan view showing an image sensor according to embodiment 8 of the present invention.
Figure 45:
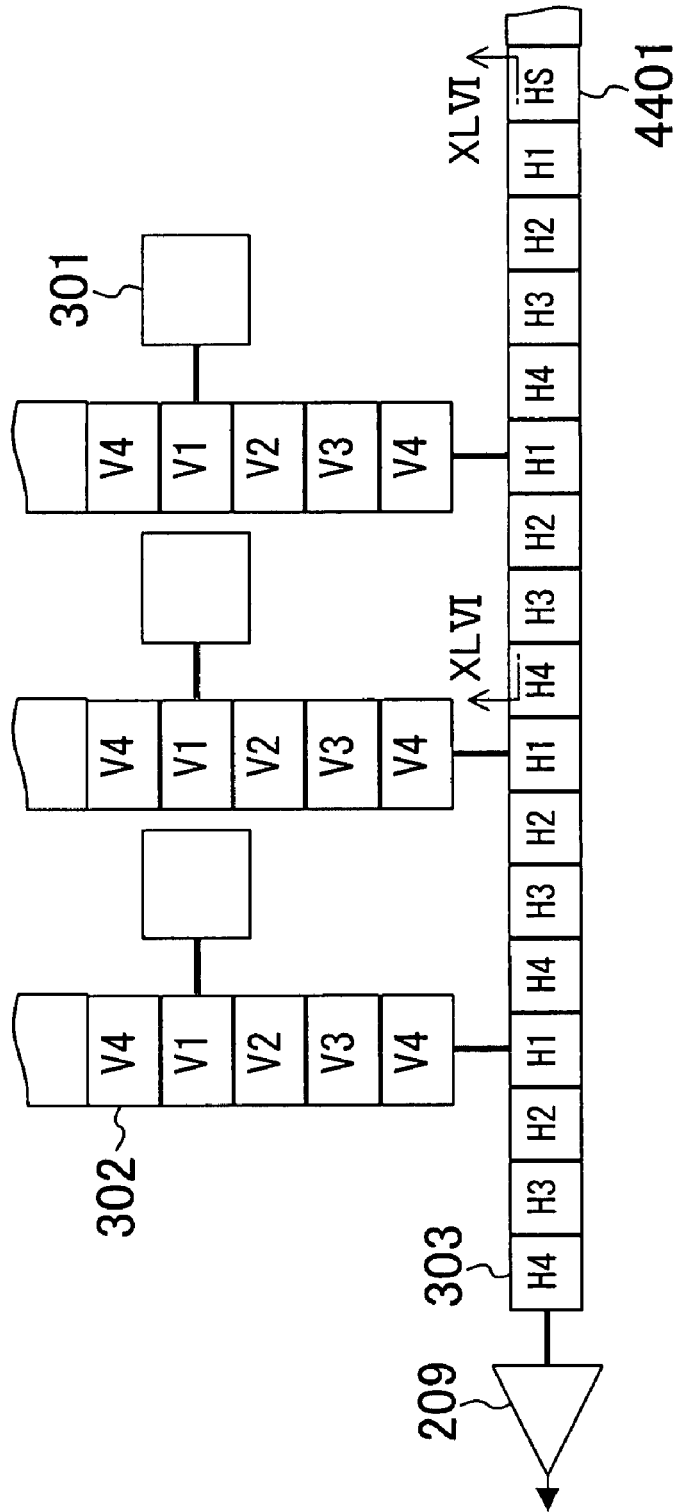
FIG. 45 is an enlarged plan view of a reference signal generator of the image sensor according to embodiment 8 of the present invention.

The image sensor 103 of this embodiment has the structure as shown in FIG. 44. FIG. 45 is the enlarged illustration of a reference signal generator 4301 shown in FIG. 44.

As shown in FIG. 45, the horizontal transfer section 303 includes a reference charge generator 4401, from which reference charge is output to the horizontal transfer section 303 in synchronization with a retrieval signal. It should be noted that FIG. 45 shows only three horizontally-successive pixels for explanation, but an actual structure may have a different arrangement.

Figure 46:
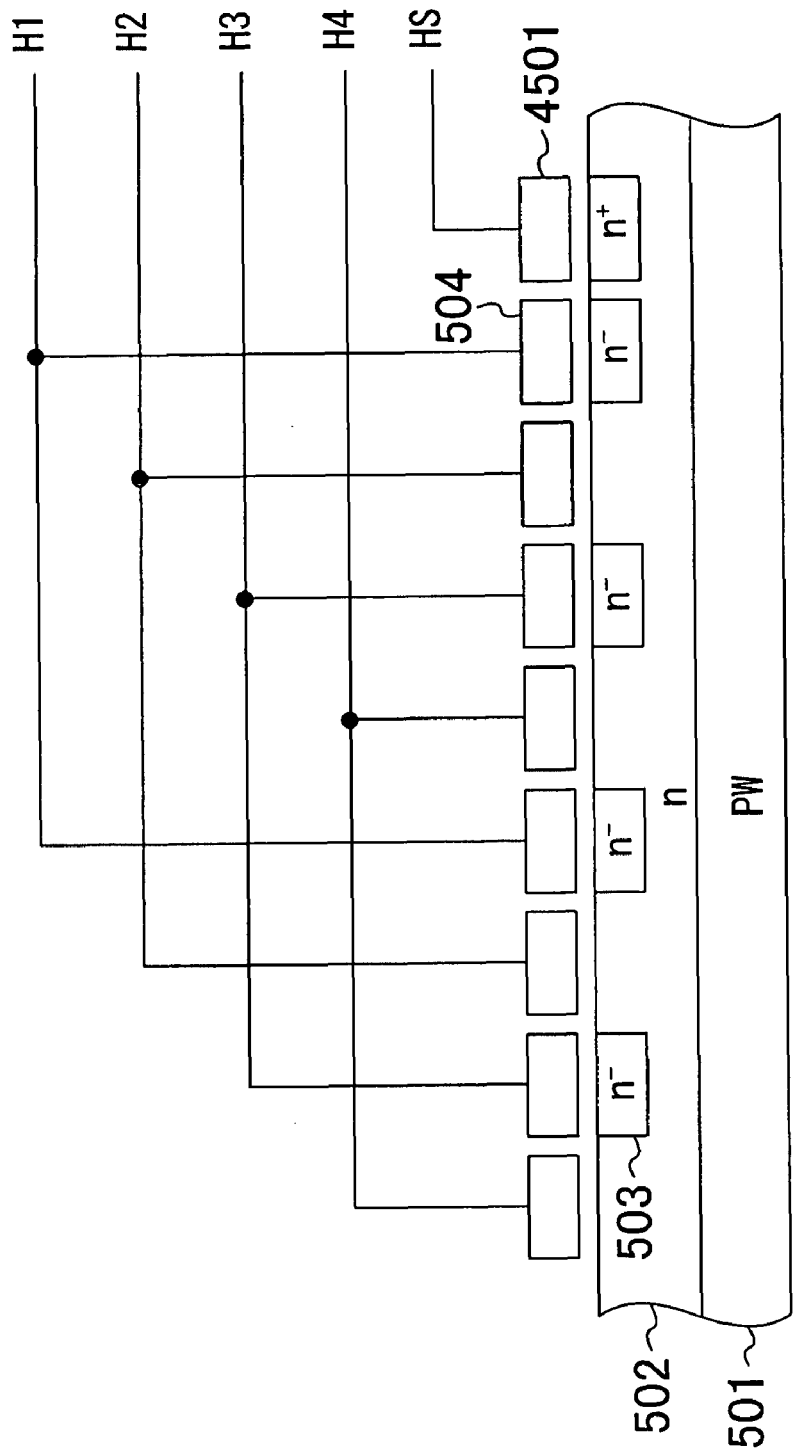
FIG. 46 is a cross-sectional view of a reference signal generator of the image sensor according to embodiment 8 of the present invention taken along line XLVI-XLVI of FIG. 45.

FIG. 46 is a partial cross-sectional view of the reference charge generator 4401 and the horizontal transfer section 303 taken along line XLVI-XLVI of FIG. 45. The reference charge generator 4401 includes an electrode (HS) 4501 corresponding to an $N^+$-type diffusion layer in addition to the components of the horizontal transfer section 303.

Figure 47:
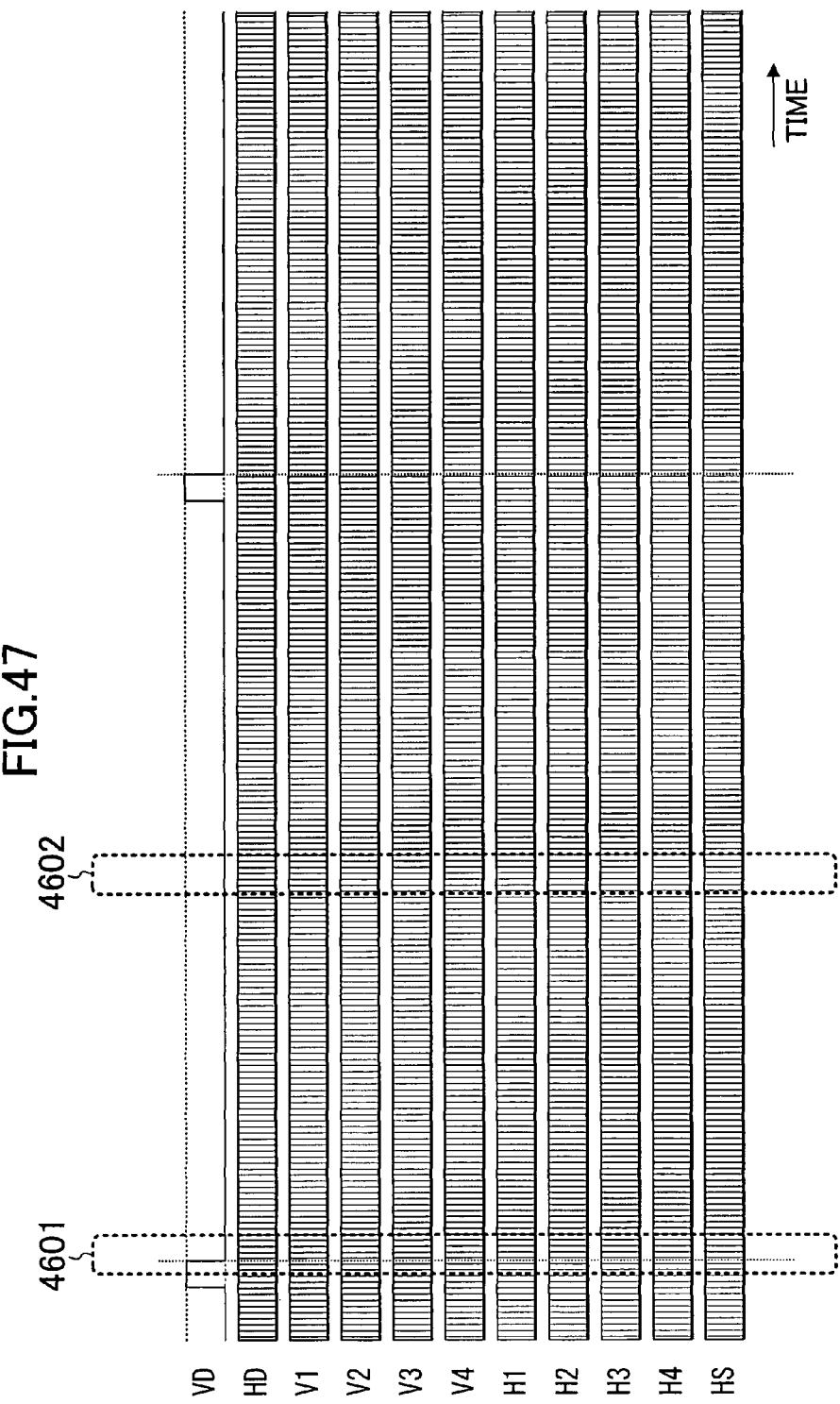
FIG. 47 shows the waveforms of image sensor driving pulses at the vertical blanking interval rate according to embodiment 8 of the present invention.

FIG. 47 is a timing chart illustrating vertical synchronization signal VD and horizontal synchronization signal HD at the vertical blanking interval rate and the pulses for driving the image sensor 103 and the analog circuit 104. It should be noted that the pulses other than signal VD have very short cycles as compared with signal VD and are therefore schematically illustrated in the form of rectangular lattices in FIG. 47.

Figure 48:
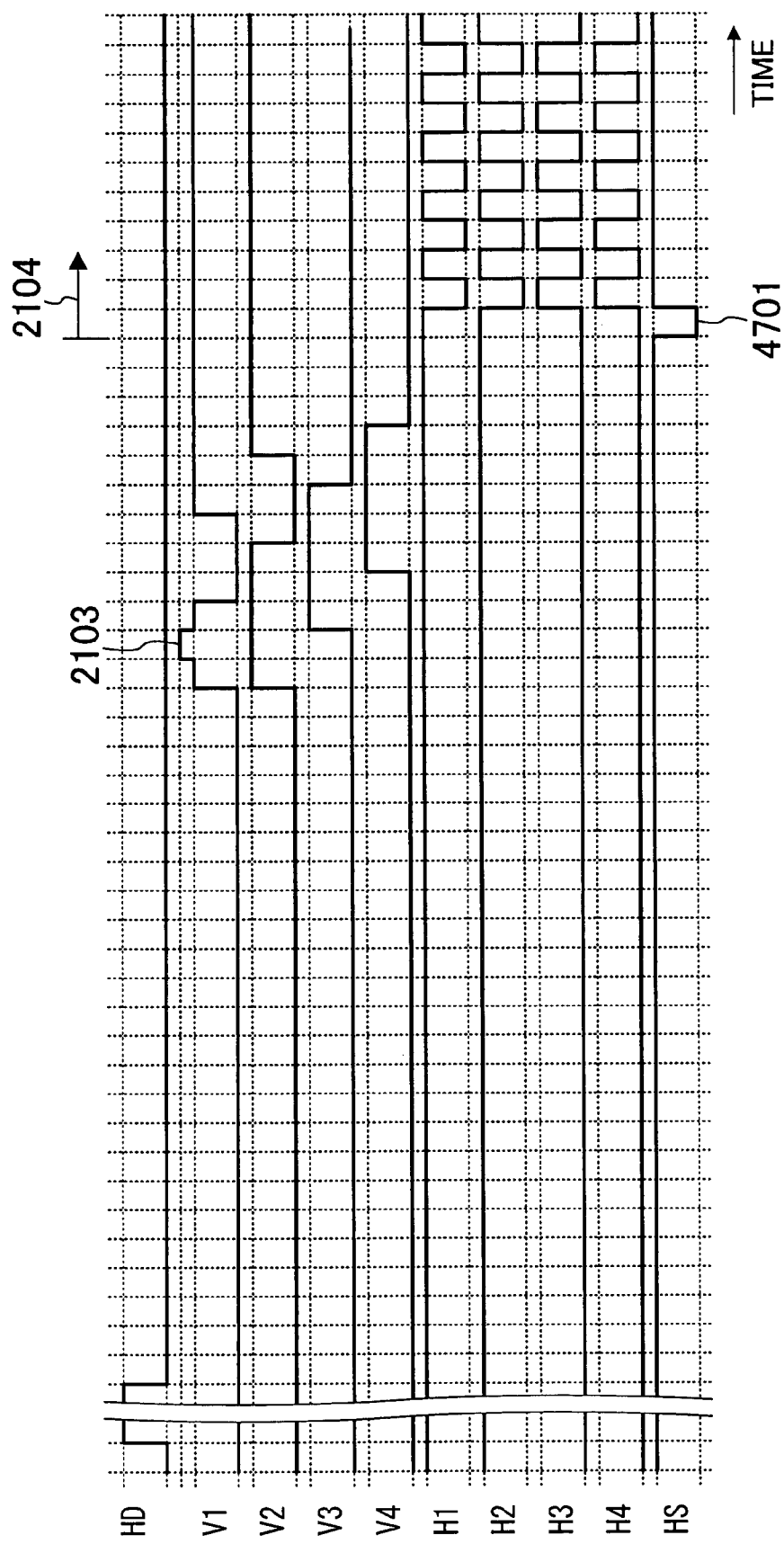
FIG. 48 shows the waveforms of image sensor driving pulses at the horizontal blanking interval rate, including retrieval of charges from the photoelectric converters, according to embodiment 8 of the present invention.

FIG. 48 is the enlarged illustration at the horizontal blanking interval rate of the first retrieval part 4601. At period 2103 of FIG. 48, the image capture signals accumulated in the photoelectric converters 301 are retrieved to the vertical transfer sections 302. Then, signals V1, V2, V3 and V4 are changed so that the charges are transferred over four stages of the vertical transfer sections 302. At period 4701 of FIG. 48, the voltage applied to the electrode (HS) 4501 decreases to a predetermined level, so that a predetermined reference charge is generated in the reference charge generator 4401 and transferred to the adjacent electrode H1 of the horizontal transfer section 303. Then, pulses H1, H2, H3 and H4 for horizontal transfer are applied to the horizontal transfer section 303.

Figure 49:
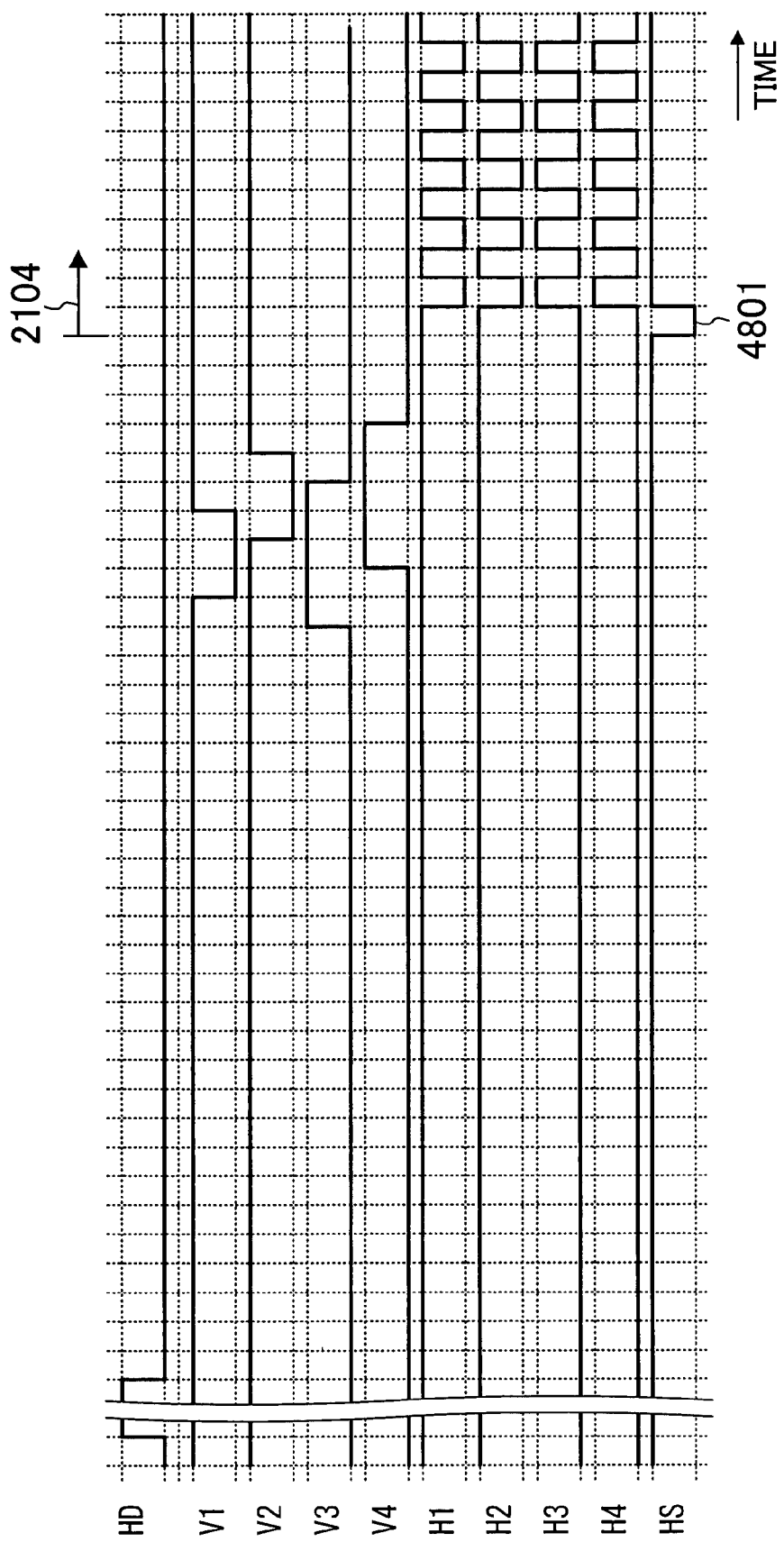
FIG. 49 shows the waveforms of image sensor driving pulses at the horizontal blanking interval rate, not including retrieval of charges from the photoelectric converters, according to embodiment 8 of the present invention.

FIG. 49 is the enlarged illustration at the horizontal blanking interval rate of part 4602 of the vertical blanking interval other than the first retrieval part 4601. Part 4602 of FIG. 49 is different from the first retrieval part 4601 of FIG. 48 in that, although signal charge is retrieved from the photoelectric converter 301 to the vertical transfer section 302 according to pulse 2103 in FIG. 48, FIG. 49 does not include this retrieval operation. It should be noted that reference numeral 4801 refers to a reference charge generation pulse.

Application of the driving pulses shown in FIG. 48 and FIG. 49 enables, in the present vertical blanking interval, retrieval of the signal charge of light which has reached the image sensor 103 in the immediately previous vertical blanking interval and retrieval of the reference charge produced by application of a pulse to the electrode (HS) 4501.

The above-described operations enable output of the reference signal and image capture signal at every horizontal blanking interval.

With the above features, the reference charge can be generated at every horizontal blanking interval. Optimization information for the driving pulses can be obtained in short cycles. Accordingly, optimization of the driving pulses can be realized within a short period of time.

The reference charge is generated at every horizontal blanking interval in the above-described example of this embodiment but may be generated intermittently or only in predetermined horizontal blanking intervals.

Figure 50:
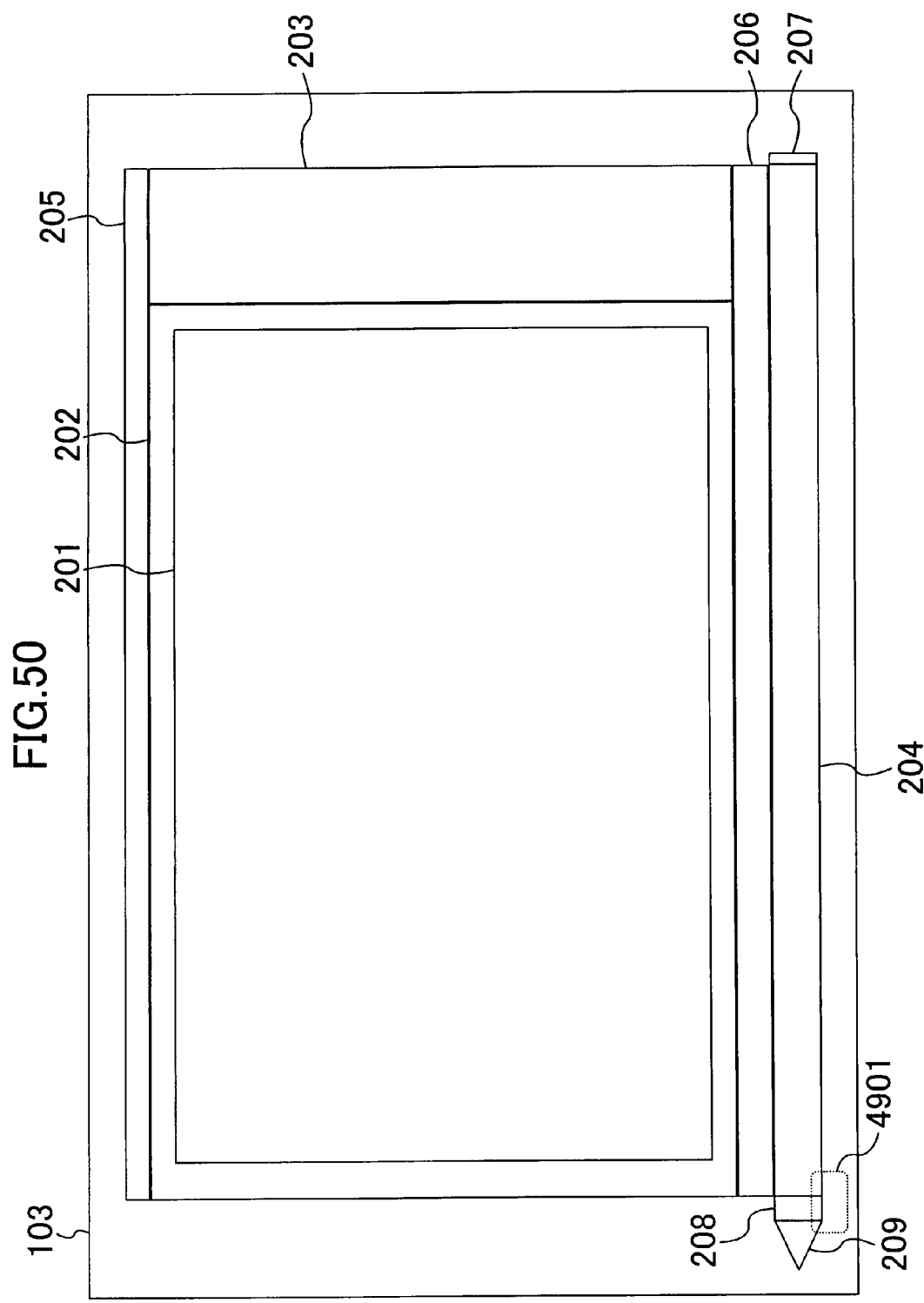
FIG. 50 is a plan view showing a variation of the image sensor according to embodiment 8 of the present invention.
Figure 51:
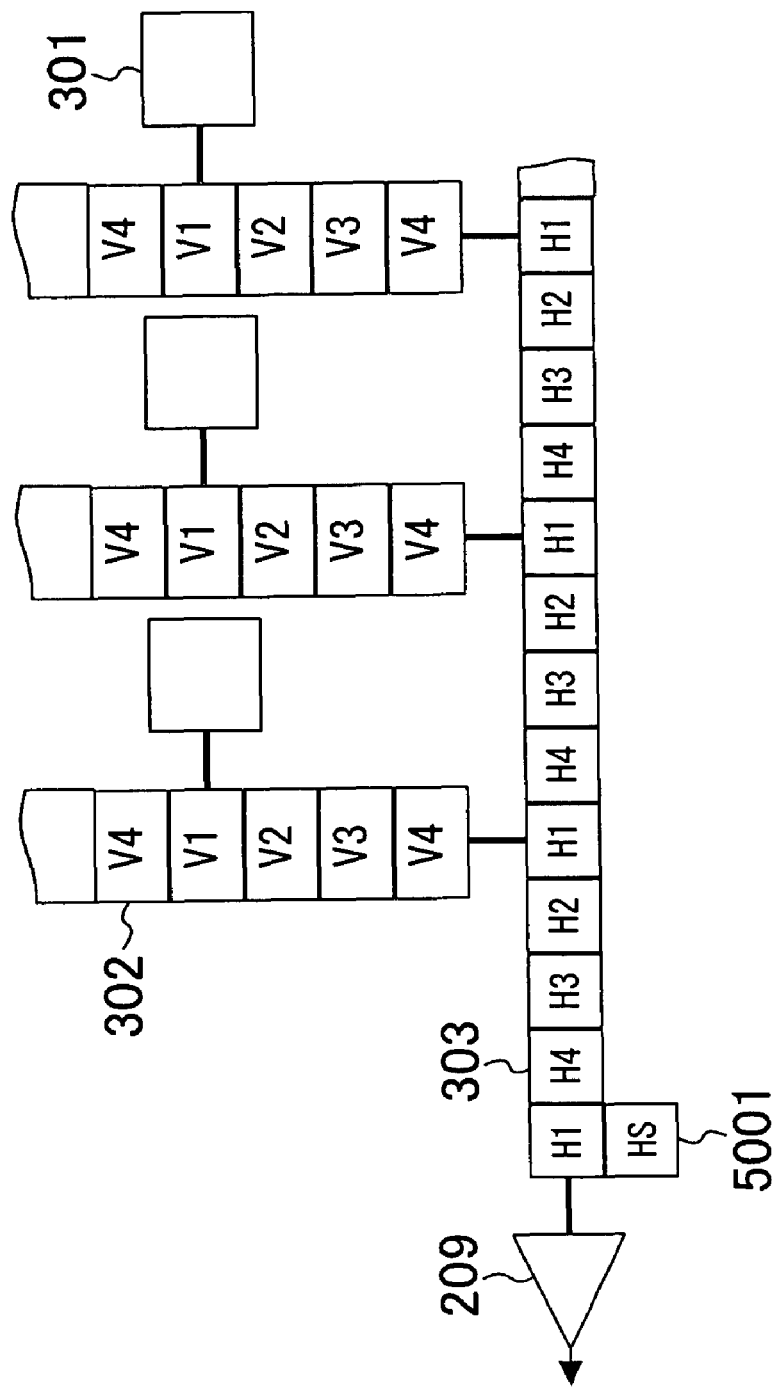
FIG. 51 is an enlarged plan view of a reference signal generator of the variation of the image sensor according to embodiment 8 of the present invention.

The reference charge generator 4401 is at the most distant position from the charge signal detector 209 of the horizontal transfer section 303 in the above-described example of this embodiment but may be provided at a position near the charge signal detector 209 as shown at a reference signal generator 4901 of FIG. 50. Specifically, a reference charge generator 5001 may be preferably provided at a position of 90° relative to the transfer direction at part of the horizontal transfer section 303 adjacent to the charge signal detector 209 as shown in FIG. 51 which is the enlarged illustration of the reference signal generator 4901.

Reset operation may be performed in the reference charge generator 4401 by periodically applying a predetermined voltage to the electrode (HS) 4501 of FIG. 46 in order to prevent excessive charge generated by a dark current from affecting the horizontal transfer section 303 even when the reference charge is not generated for a long period of time or even immediately after startup of the image sensor 103.

[9] Embodiment 9

An electronic still camera according to embodiment 9 of the present invention is now described. The electronic still camera of this embodiment has substantially the same structure as the electronic still camera 117 of embodiment 1 except that the method for driving the image sensor 103 is different. Hereinafter, the focus of the descriptions is this difference.

The image sensor 103 of this embodiment is driven in the first driving mode described in embodiment 1, a second driving mode, and a third driving mode. In the second driving mode, a signal containing noise which is accumulated in the vertical transfer sections 302 is retrieved as an image capture signal at every predetermined vertical blanking interval while none of an image capture signal and reference signal exists in the vertical transfer sections 302. In the third driving mode, a signal containing noise which is accumulated in the horizontal transfer section 303 is retrieved as an image capture signal at every predetermined vertical or horizontal blanking interval while none of an image capture signal and reference signal exists in the horizontal transfer section 303.

The first driving mode has previously been described in embodiment 1, and therefore, the descriptions thereof are herein omitted.

Figure 52:
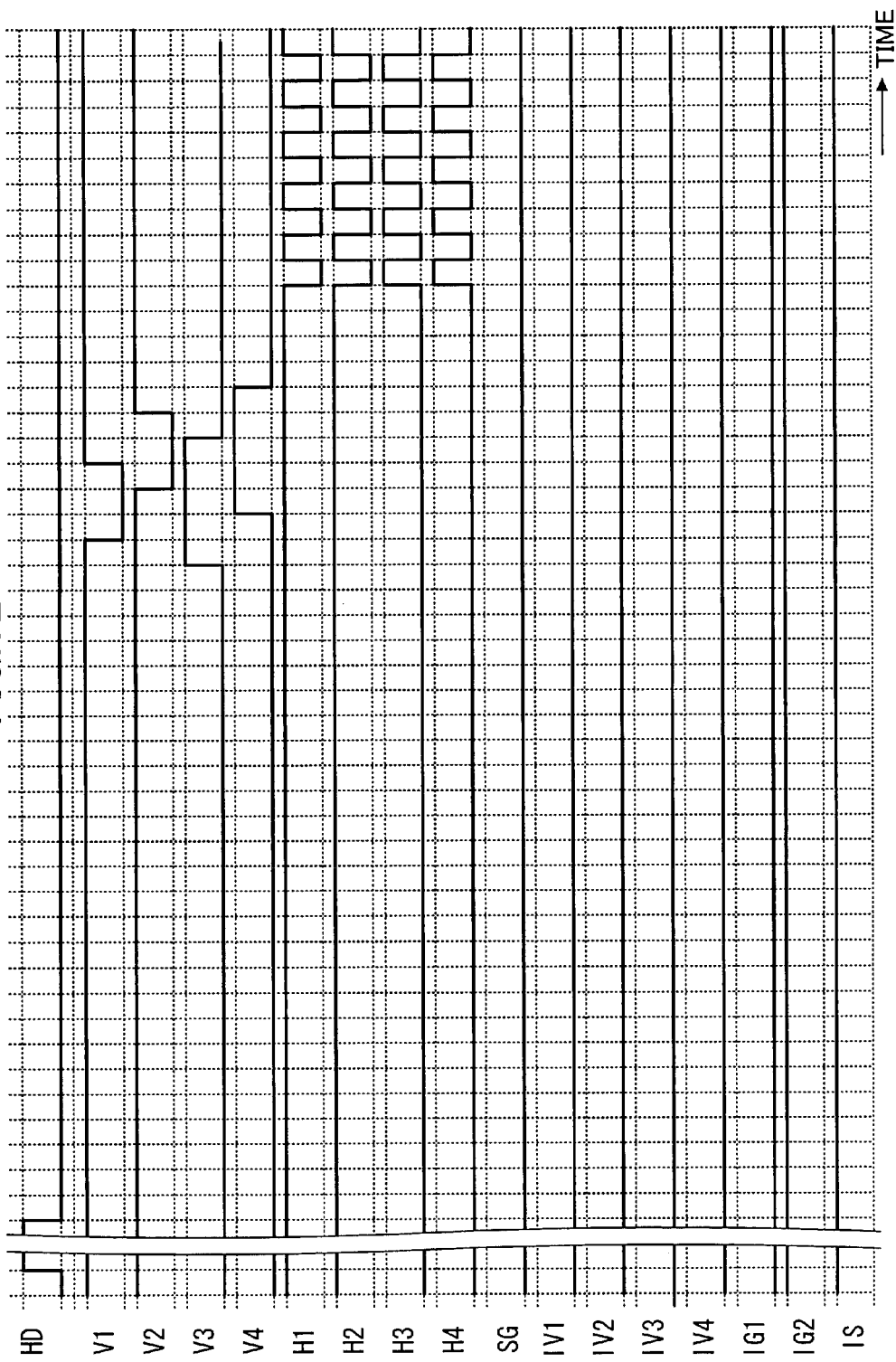
FIG. 52 shows the waveforms of image sensor driving pulses at the horizontal blanking interval rate, including transfer through the vertical transfer section, according to embodiment 9 of the present invention.

FIG. 52 shows one horizontal blanking interval of pulses applied in the second driving mode. In an actual case, this operation is carried out throughout one vertical blanking period to retrieve noise data resulting from a crystal structure defect in a CCD of the vertical transfer sections 302 (hereinafter, referred to as "V-defect").

Figure 53:
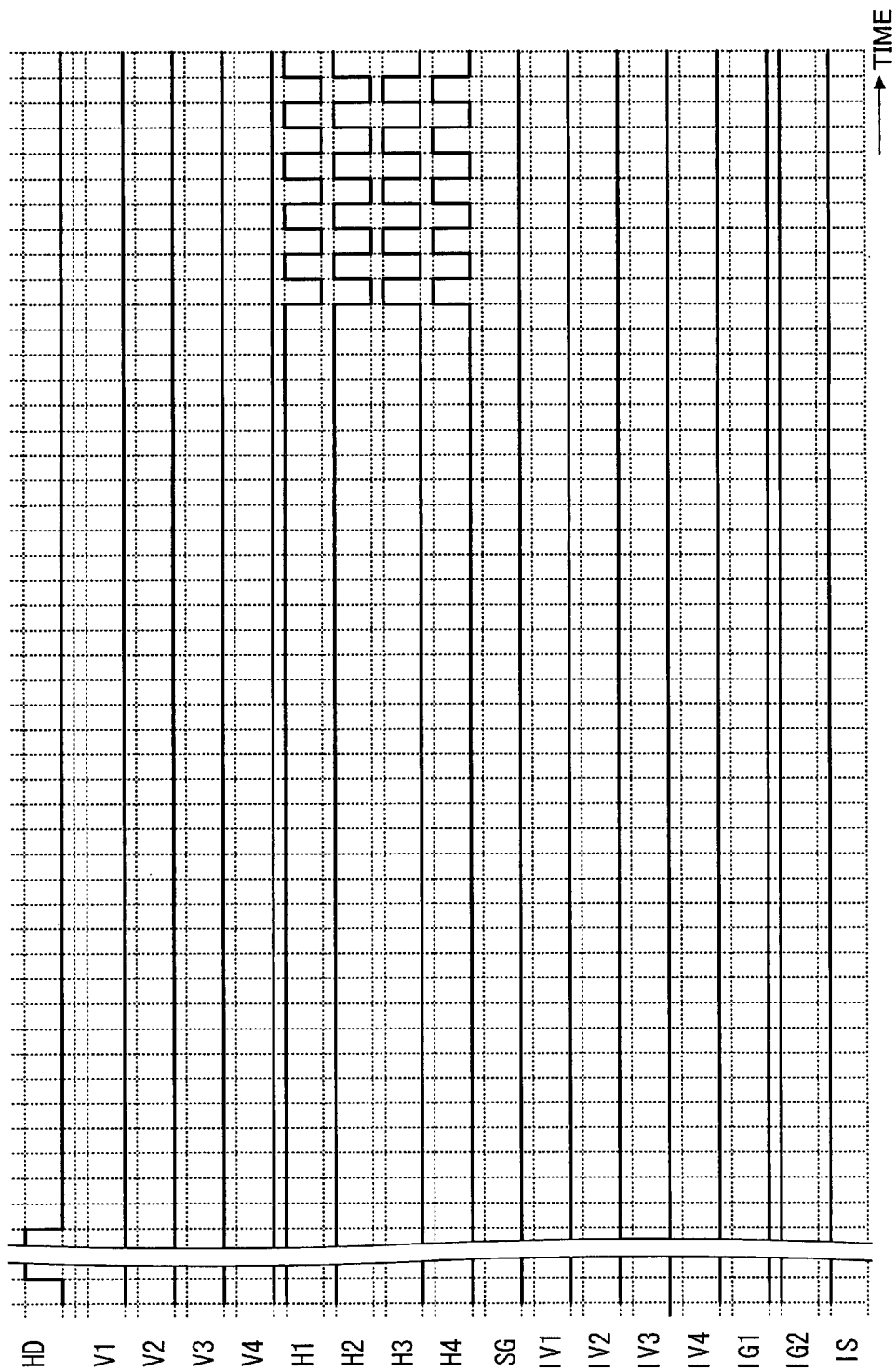
FIG. 53 shows the waveforms of image sensor driving pulses at the horizontal blanking interval rate, not including transfer through the vertical transfer section, according to embodiment 9 of the present invention.

FIG. 53 shows one horizontal blanking interval of pulses applied in the third driving mode. The operation in the third driving mode may be carried out at every horizontal blanking interval or at a predetermined timing. By performing this operation, noise data resulting from a crystal structure defect in a CCD of the horizontal transfer section 303 (hereinafter, referred to as "H-defect") is retrieved.

The noise data retrieved in the second driving mode operation is output via the horizontal transfer section 303 and therefore contains a noise component resulting from a H-defect. Therefore, by subtracting noise data retrieved in the third driving mode operation from the noise data of the second driving mode operation, the level of V-defect can be estimated.

With the above, offset external disturbance caused by H-defect and V-defect, which affects the pulse optimization when performed in the scale of transfer efficiency, can be removed. Therefore, optimization can be performed with higher accuracy.

Although in the above-described example of this embodiment the optimization is performed in combination with the second and third driving modes, only any one of these modes may be used.

Before retrieval of noise data, unnecessary charges may be discharged from the vertical transfer sections 302 and horizontal transfer section 303 in advance by quick transfer (not shown).

[10] Embodiment 10

An electronic still camera according to embodiment 10 of the present invention is now described. The electronic still camera of this embodiment has substantially the same structure as the electronic still camera of embodiment 7 except that the method for driving the image sensor 103 is different. Hereinafter, the focus of the descriptions is this difference.

Figure 54:
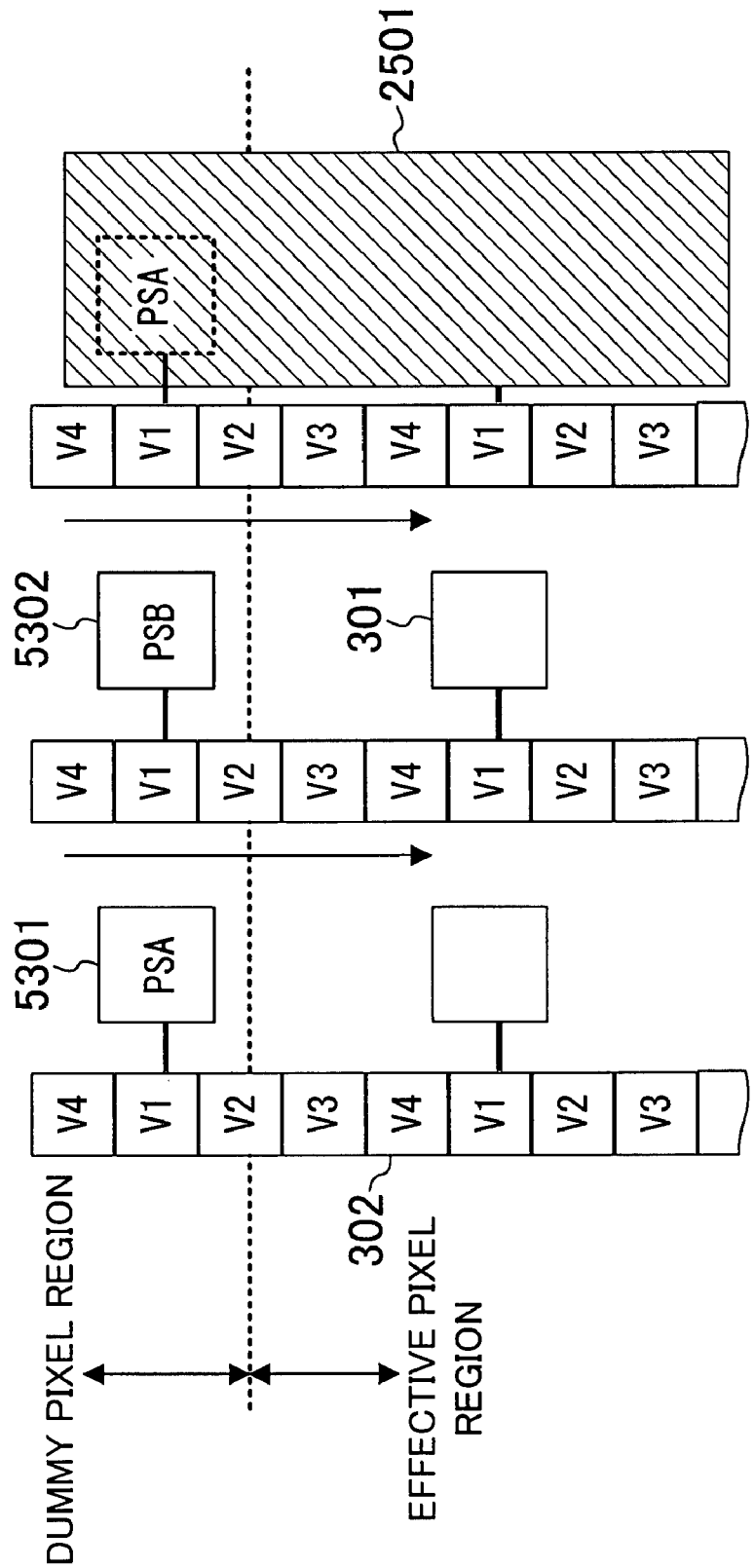
FIG. 54 is an enlarged plan view of a reference signal generator of an image sensor according to embodiment 10 of the present invention.

FIG. 54 is the enlarged illustration of the reference charge generators 5301 and 5302 provided on the image sensor 103 according to this embodiment. Herein, the descriptions as to the cross-sectional structure are not provided, but only differences from the descriptions of embodiment 7 in FIG. 39 are described. As shown in FIG. 54, the reference charge generators 5301 and 5302 have two types of electrodes (PSA and PSB). Although the timing for generating the reference charge is also the same as that described in embodiment 7, the voltages applied to the electrode (PSA) 5301 and the electrode (PSB) 5302 for generation of reference charge are different.

The pulse for determining the reset timing of the charge signal detector 209 (hereinafter, referred to as "R-pulse") is optimized as described below.

First, pulses R, DS1 and DS2 are set to arbitrary timings while the reference charge generators 5301 and 5302 are generating reference charges. Then, under these conditions, the timing of pulse DS2 is gradually changed until the timing at which the digital value output is maximized. Then, the timing of pulse DS1 is also gradually changed until the timing at which the digital value output is maximized. At this point in time, pulse DS1 is set to the timing at which the charge signal detector 209 is reset to a reset level by R-pulse where the reset level is maximum.

Thereafter, every time the timing is changed while the relationship of the duty and phase of R-pulse to the phase of pulse DS1 is maintained, the setting of the phase of pulse DS2 is changed to plot the level of a signal output. This operation results in that the differential value of the plotted value is sufficiently small and that a point at which the output signal CDS-processed by pulses DS1 and DS2 is sufficiently large occurs at two points, the feed-through level and the reference signal level generated from the reference charge. One that the respective points are held for a time period necessary for sampling of pulses DS1 and DS2 is selected as a point optimum for R-pulse.

Pulses DS1 and DS2 are set to arbitrary positions while the reference charge generators 5301 and 5302 are generating reference charges. Under these conditions, the maximum signal value, which is obtained by gradually changing the settings of pulse DS2, is selected. Then, the phase of pulse DS 1 is slightly shifted forward or backward. According to the shifted phase, the point of maximum value which is obtained by gradually changing the settings of pulse DS2 is again searched for. A resultant point is selected as the point of pulse DS2.

Then, the phase of pulse DS1 is changed while pulse DS2 is fixed, and the level of a signal output is plotted. A point at which the differential value of the plotted value is sufficiently small and the signal output does not exceed the saturation level of the image sensor 103 is selected as the point of pulse DS1.

Then, the electrode (PSA) 5301 and the electrode (PSB) 5302 are caused to generate different reference charges at the reference charge generation timing, and the outputs of these electrodes are observed. In this case, the reference charges generated by the electrode (PSA) 5301 and the electrode (PSB) 5302 have frequency-modulated components. Thus, optimization of the timing of clock signal ADCLK is performed by detecting the absolute value of the difference between the digital data of the reference charges generated by the electrode (PSA) 5301 and the electrode (PSB) 5302.

Namely, in the case where A/D conversion is carried out while clock signal ADCLK is in an undesirable state, the digital value obtained by the A/D conversion is closer to the average value of the digital data of the reference charges generated by the electrode (PSA) 5301 and the electrode (PSB) 5302. Thus, optimization of the timing of clock signal ADCLK can be achieved by searching for the absolute value of the difference between the digital data values of the reference charges generated by the electrode (PSA) 5301 and the electrode (PSB) 5302.

After the above-described optimization, the gain for A/D conversion and the offset level for A/D conversion are optimized to complete the whole optimization process.

In performance of the above-described optimization process, in the case where the level of the CDS-processed signal exceeds the range of A/D conversion, the range is preferably corrected by decreasing the gain for A/D conversion.

The above-described operations enable optimization of a pulse for controlling horizontal transfer, a pulse for controlling vertical transfer, R-pulse for controlling the reset gate, pulse DS1 for sampling the feed-through level, pulse DS2 for sampling the level of a photoelectrically-converted image capture signal, reference pulse ADCLK for A/D conversion, the gain for A/D conversion, and the offset level for A/D conversion.

[11] Variations

The present invention has been described above according to the embodiments of the present invention but, as a matter of course, is not limited to the above-described specific examples of the embodiments. For example, any combinations of the embodiments are within the extent of the present invention.

As described above, an automatic adjuster for image capture circuit according to the present invention is capable of automatic timing adjustment for the image capture circuit and is therefore useful for an image capture circuit with a replaceable image capture element.

What is claimed is:

1. An automatic adjuster for image capture circuit, comprising:
    a photoelectric converter provided on an image capture element so as to generate an effective image signal according to an amount of incident light;
    a reference signal generator provided on the image capture element for generating a reference signal different from the effective image signal; and
    an adjuster for adjusting the phase or duty of a pulse used for image capture based on a digital reference signal which is obtained by converting a reference signal output from the image capture element to a digital value;
    wherein:
    the image capture element includes, in addition to the reference signal generator,
    a plurality of photoelectric converters arranged in a two-dimensional layout,
    a vertical transfer section provided to each column of the photoelectric converters for vertically transferring an image capture signal output from the photoelectric converters,
    a horizontal transfer section provided to the vertical transfer section for horizontally transferring the image capture signal output from the vertical transfer section,
    a signal converter for converting the image capture signal output from the horizontal transfer section to a signal voltage or signal current, a reference signal holder for holding the reference signal output from the reference signal generator, and a reference signal retriever for retrieving the reference signal from the reference signal holder; and the reference signal is output to the vertical transfer section, the horizontal transfer section, or the photoelectric converters.

2. The automatic adjuster of claim 1, wherein the reference signal generator includes two reference signal generators capable of simultaneously generating reference signals at different levels.

3. The automatic adjuster of claim 1, wherein the reference signal generator includes at least one reference signal generator capable of generating reference signals of different levels at predetermined timings.

4. The automatic adjuster of claim 1, wherein the reference signal is output only to the photoelectric converters.

5. The automatic adjuster of claim 1, wherein the reference signal is output only to the horizontal transfer section.

6. The automatic adjuster of claim 1, wherein the reference signal is output only to the vertical transfer section.

7. The automatic adjuster of claim 1, wherein the reference signal generator includes at least one reference signal generator which outputs the reference signal to a shaded one of the photoelectric converters.

8. The automatic adjuster of claim 1, wherein the reference signal is output to part of the horizontal transfer section which is most distant from the signal converter.

9. The automatic adjuster of claim 1, wherein the reference signal is output to part of the horizontal transfer section which is closest to the signal converter.

10. The automatic adjuster of claim 1, wherein the reference signal is output to part of the vertical transfer section which is most distant from the horizontal transfer section.

11. The automatic adjuster of claim 10, wherein the reference signal generator includes a plurality of reference signal generators.

12. The automatic adjuster of claim 10, wherein the reference signal generator includes at least one reference signal generator which outputs the reference signal to a vertical transfer section for vertically transferring an image capture signal of a shaded one of the photoelectric converters.

13. The automatic adjuster of claim 1, wherein the reference signal generator includes an electrode for generating a reference signal.

14. The automatic adjuster of claim 1, wherein the reference signal generator includes no electrode for generating a reference signal.

15. The automatic adjuster of claim 1, wherein the reference signal is output during a vertical blanking interval or horizontal blanking interval of an image capture signal retrieved from the image capture element.

16. The automatic adjuster of claim 1 capable of operating in at least two signal retrieval modes, wherein:

in the first signal retrieval mode, a photoelectrically-converted image capture signal is retrieved from the image capture element; and in the second signal retrieval mode, the reference signal is retrieved from the image capture element.

17. The automatic adjuster of claim 16 wherein, during a vertical blanking interval in which the operation is in the second signal retrieval mode, an image capture signal retrieved in the first signal retrieval mode before retrieval in the second signal retrieval mode is subjected to a signal process as an image capture signal output which is output from the image capture element.

18. The automatic adjuster of claim 1, wherein the reference signal is output with predetermined intervals.

19. The automatic adjuster of claim 1, wherein the reference signal is output according to an external command.

20. The automatic adjuster of claim 1, wherein the reference signal is output at startup of the automatic adjuster.

21. The automatic adjuster of claim 1, wherein the reference signal is output during a period in which the image capture element is shaded from light.

22. The automatic adjuster of claim 1, wherein the reference signal is output during a period in which a signal output from the image capture element has a value equal to or smaller than a predetermined value.

23. The automatic adjuster of claim 22, wherein:

the reference signal is restricted in amount of light by a light amount adjuster provided in an optical path of the image capture element during a period in which it is output from the image capture element; and a video signal is generated using an image capture signal whose level is corrected according to the restricted amount of light or using an immediately-preceding image capture signal with unrestricted light amount.

24. The automatic adjuster of claim 1, wherein the level of the reference signal holder is reset at a predetermined timing.

25. The automatic adjuster of claim 1, wherein the level of the reference signal holder is reset according to an external command.

26. The automatic adjuster of claim 1, wherein the level of the reference signal holder is reset at startup of the automatic adjuster.

27. The automatic adjuster of claim 1, wherein the image capture element is a CCD (Charge Coupled Device), and at least one of subjects of adjustment performed based on the reference signal is a pulse for controlling horizontal transfer, a pulse for controlling vertical transfer, a pulse for controlling a reset gate, a pulse for sampling a feed-through level, a pulse for sampling the level of a photoelectrically-converted image capture signal, a reference pulse for A/D (Analog/Digital) conversion, a gain for A/D conversion, or an offset level for A/D conversion.

28. The automatic adjuster of claim 27, wherein:

the reference signal is output to the horizontal transfer section; and the efficiency of horizontal transfer in the horizontal transfer section is calculated from a digital reference signal level which is obtained from a reference signal output from the image capture element and the number of transfer stages of the horizontal transfer section between a position at which the reference signal is input and the signal converter, and the pulse for controlling horizontal transfer is adjusted based on the calculated efficiency of horizontal transfer.

29. The automatic adjuster of claim 27, wherein:

the vertical transfer section vertically transfers the reference signal; and the efficiency of horizontal transfer in the horizontal transfer section is calculated from a digital reference signal level which is obtained from a reference signal output from the image capture element and the number of transfer stages of the horizontal transfer section between a position at which the reference signal is input and the signal converter, and the pulse for controlling horizontal transfer is adjusted based on the calculated efficiency of horizontal transfer.

30. The automatic adjuster of claim 27 capable of a first transfer operation where the vertical transfer section vertically transfers the reference signal and a second transfer operation where the horizontal transfer section horizontally transfers the reference signal, wherein a transfer operation is carried out during a period in which none of an image capture signal and reference signal exists in the vertical transfer section or horizontal transfer section to obtain a defect signal, and the pulse is adjusted without using part of the vertical transfer section and horizontal transfer section corresponding to the defect signal.

31. The automatic adjuster of claim 27, wherein:

the reference signal is output to the vertical transfer section; and the efficiency of vertical transfer in the vertical transfer section is calculated from a digital reference signal level which is obtained from a reference signal output from the image capture element and the number of transfer stages of the vertical transfer section between a position at which the reference signal is input and the horizontal transfer section, and the pulse for controlling vertical transfer is adjusted based on the calculated efficiency of vertical transfer.

32. The automatic adjuster of claim 27, wherein:

the vertical transfer section vertically transfers the reference signal; and the efficiency of vertical transfer in the vertical transfer section is calculated from a digital reference signal level which is obtained from a reference signal output from the image capture element and the number of transfer stages of the vertical transfer section between a position at which the reference signal is input and the horizontal transfer section, and the pulse for controlling vertical transfer is adjusted based on the calculated efficiency of vertical transfer.

33. The automatic adjuster of claim 27 capable of a first transfer operation where the vertical transfer section vertically transfers the reference signal and a second transfer operation where the horizontal transfer section horizontally transfers the reference signal, wherein:

the automatic adjuster includes a first transfer efficiency calculator for calculating the efficiency of vertical transfer in the vertical transfer section from a digital reference signal level which is obtained from a reference signal output from the image capture element and the number of transfer stages of the vertical transfer section between a position at which the reference signal is input and the horizontal transfer section, and a second transfer efficiency calculator for calculating the efficiency of horizontal transfer in the horizontal transfer section from the digital reference signal level and the number of transfer stages of the horizontal transfer section between a position at which the reference signal is input and the signal converter; and the pulse for controlling vertical transfer and the pulse for controlling horizontal transfer are adjusted based on both the first transfer efficiency calculated by the first transfer efficiency calculator and the second transfer efficiency calculated by the second transfer efficiency calculator.

34. The automatic adjuster of claim 33, wherein the adjustment of the pulse for controlling horizontal transfer is absent during the adjustment of the pulse for controlling vertical transfer.

35. The automatic adjuster of claim 1, wherein the image capture element is a MOS (Metal Oxide Semiconductor) sensor, and at least one of subjects of adjustment performed based on the reference signal is a pulse for controlling a horizontal scan shift register, a pulse for controlling a vertical scan shift register, a pulse for controlling a reset timing of a photodiode, a pulse for sampling a feed-through level, a pulse for sampling the level of a photoelectrically-converted image capture signal, a reference pulse for A/D (Analog/Digital) conversion, a gain for A/D conversion, and an offset level for A/D conversion.

36. An image capture module, comprising a solid-state image sensing device, a lens, and the automatic adjuster of claim 1.

37. An electronic still camera, comprising the image capture module of claim 36 and a digital signal processor, wherein the digital signal processor includes at least one of a recorder for recording a video signal output from the image capture module and a display for displaying a video signal output from the image capture module.

* * * * *